US010254870B2

(12) United States Patent
Chawda et al.

(10) Patent No.: US 10,254,870 B2
(45) Date of Patent: Apr. 9, 2019

(54) FORCE SENSOR-BASED MOTION OR ORIENTATION DETERMINATION IN A DEVICE

(71) Applicant: Apple Inc., Cupertino, CA (US)

(72) Inventors: Vinay Chawda, Pasadena, CA (US); Vikrham Gowreesunker, San Francisco, CA (US); Alex Bijamov, Cupertino, CA (US)

(73) Assignee: APPLE INC., Cupertino, CA (US)

( * ) Notice: Subject to any disclaimer, the term of this patent is extended or adjusted under 35 U.S.C. 154(b) by 183 days.

(21) Appl. No.: 15/089,400

(22) Filed: Apr. 1, 2016

(65) Prior Publication Data

US 2017/0153737 A1 Jun. 1, 2017

Related U.S. Application Data

(60) Provisional application No. 62/261,835, filed on Dec. 1, 2015, provisional application No. 62/261,832, filed on Dec. 1, 2015.

(51) Int. Cl.
*G09G 5/00* (2006.01)
*G06F 3/041* (2006.01)
(Continued)

(52) U.S. Cl.
CPC ............ *G06F 3/0414* (2013.01); *G06F 3/002* (2013.01); *G06F 3/044* (2013.01)

(58) Field of Classification Search
CPC .......... G06F 3/002; G06F 3/038; G06F 3/041; G06F 3/0221; G01L 1/146
(Continued)

(56) References Cited

U.S. PATENT DOCUMENTS 5,483,261 A 1/1996 Yasutake
5,488,204 A 1/1996 Mead et al.
(Continued)

FOREIGN PATENT DOCUMENTS

JP 2000-163031 A 6/2000
JP 2002-342033 A 11/2002
(Continued)

OTHER PUBLICATIONS

Lee, S.K. et al. (Apr. 1985). "A Multi-Touch Three Dimensional Touch-Sensitive Tablet," *Proceedings of CHI: ACM Conference on Human Factors in Computing Systems*, pp. 21-25.
(Continued)

*Primary Examiner* — Abdul-Samad A Adediran
(74) *Attorney, Agent, or Firm* — Morrison & Foerster LLP

(57) ABSTRACT

An electronic device is disclosed. The electronic device comprises a touch sensor panel configured to detect an object touching the touch sensor panel and a plurality of force sensors coupled to the touch sensor panel and configured to detect an amount of force with which the object touches the touch sensor panel. A processor is coupled to the plurality of force sensors, the processor configured to: measure a first value from a first force sensor of the plurality of force sensors; measure a second value from a second force sensor of the plurality of force sensors, different from the first force sensor; and determine a motion characteristic of the electronic device based on the first value and the second value.

17 Claims, 20 Drawing Sheets

(51) Int. Cl.
*G06F 3/044* (2006.01)
*G06F 3/00* (2006.01)

(58) Field of Classification Search
USPC .......................... 345/156, 173–174; 700/73
See application file for complete search history.

(56) References Cited

U.S. PATENT DOCUMENTS

| | | | |
|---|---|---|---|
| 5,825,352 | A | 10/1998 | Bisset et al. |
| 5,835,079 | A | 11/1998 | Shieh |
| 5,880,411 | A | 3/1999 | Gillespie et al. |
| 6,188,391 | B1 | 2/2001 | Seely et al. |
| 6,310,610 | B1 | 10/2001 | Beaton et al. |
| 6,323,846 | B1 | 11/2001 | Westerman et al. |
| 6,489,944 | B2 | 12/2002 | Numaoka |
| 6,690,387 | B2 | 2/2004 | Zimmerman et al. |
| 7,015,894 | B2 | 3/2006 | Morohoshi |
| 7,102,621 | B2 | 9/2006 | Roberts |
| 7,184,064 | B2 | 2/2007 | Zimmerman et al. |
| 7,663,607 | B2 | 2/2010 | Hotelling et al. |
| 8,479,122 | B2 | 7/2013 | Hotelling et al. |
| 8,502,800 | B1 | 8/2013 | Vier |
| 8,866,796 | B2 | 10/2014 | Shepelev et al. |
| 8,947,372 | B2 | 2/2015 | Fergusson et al. |
| 9,612,680 | B2 | 4/2017 | Kies et al. |
| 2003/0210235 | A1 | 11/2003 | Roberts |
| 2006/0197753 | A1 | 9/2006 | Hotelling |
| 2006/0238494 | A1* | 10/2006 | Narayanaswami ..... G06F 3/002 345/156 |
| 2006/0293864 | A1 | 12/2006 | Soss |
| 2009/0243817 | A1 | 10/2009 | Son |
| 2010/0253645 | A1 | 10/2010 | Bolender |
| 2011/0012869 | A1 | 1/2011 | Klinghult |
| 2011/0084932 | A1 | 4/2011 | Simmons et al. |
| 2011/0216016 | A1 | 9/2011 | Rosener |
| 2011/0260983 | A1 | 10/2011 | Pertuit et al. |
| 2012/0256874 | A1 | 10/2012 | Jiyama et al. |
| 2012/0262396 | A1 | 10/2012 | Jiyama et al. |
| 2012/0319987 | A1 | 12/2012 | Woo |
| 2013/0018489 | A1* | 1/2013 | Grunthaner ............. G06F 3/041 700/73 |
| 2013/0029681 | A1 | 1/2013 | Grokop |
| 2013/0082973 | A1 | 4/2013 | Wurzel et al. |
| 2013/0162546 | A1* | 6/2013 | Yeh ....................... G06F 3/0221 345/173 |
| 2013/0176264 | A1* | 7/2013 | Alameh ................... G06F 3/038 345/174 |
| 2013/0234968 | A1 | 9/2013 | Yanagi et al. |
| 2013/0249869 | A1 | 9/2013 | Voss et al. |
| 2013/0328823 | A1 | 12/2013 | Liu et al. |
| 2014/0012531 | A1 | 1/2014 | Bhandari et al. |
| 2014/0132572 | A1 | 5/2014 | Rusanen et al. |
| 2014/0208848 | A1 | 7/2014 | Krylov et al. |
| 2014/0352400 | A1 | 12/2014 | Barrilando et al. |
| 2015/0169100 | A1 | 6/2015 | Tsuyuki et al. |
| 2015/0370385 | A1 | 12/2015 | Yamaguchi et al. |
| 2015/0370396 | A1 | 12/2015 | Hotelling et al. |
| 2015/0370597 | A1 | 12/2015 | Faaborg et al. |
| 2016/0069767 | A1 | 3/2016 | Ishiba et al. |
| 2016/0098131 | A1 | 4/2016 | Ogata et al. |
| 2016/0209984 | A1 | 7/2016 | Richards |
| 2016/0216824 | A1 | 7/2016 | Kies et al. |
| 2016/0216825 | A1 | 7/2016 | Forutanpour |
| 2016/0274720 | A1 | 9/2016 | Shin |
| 2016/0299628 | A1 | 10/2016 | Ribeiro |
| 2016/0378255 | A1* | 12/2016 | Butler ..................... G01L 1/146 345/174 |
| 2017/0017346 | A1 | 1/2017 | Gowreesunker et al. |
| 2017/0153760 | A1 | 6/2017 | Chawda et al. |

FOREIGN PATENT DOCUMENTS

| | | |
|---|---|---|
| WO | WO-2015/047357 A1 | 4/2015 |
| WO | WO-2015/080696 A1 | 6/2015 |

OTHER PUBLICATIONS

Rubine, D.H. (Dec. 1991). "The Automatic Recognition of Gestures," CMU-CS-91-202, Submitted in Partial Fulfillment of the Requirements for the Degree of Doctor of Philosophy in Computer Science at Carnegie Mellon University, 285 pages.

Rubine, D.H. (May 1992). "Combining Gestures and Direct Manipulation," CHI '92, pp. 659-660.

Westerman, W. (Spring 1999). "Hand Tracking, Finger Identification, and Chordic Manipulation on a Multi-Touch Surface," A Dissertation Submitted to the Faculty of the University of Delaware in Partial Fulfillment of the Requirements for the Degree of Doctor of Philosophy in Electrical Engineering, 364 pages.

Non-Final Office Action dated Jun. 1, 2017, for U.S. Appl. No. 15/089,415, filed Apr. 1, 2016, 22 pages.

Final Office Action dated Jan. 11, 2018, for U.S. Appl. No. 15/089,415, filed Apr. 1, 2016, 31 pages.

Final Office Action dated Apr. 27, 2018, for U.S. Appl. No. 15/089,415, filed Apr. 1, 2016, 30 pages.

Final Office Action dated Aug. 8, 2018, for U.S. Appl. No. 15/089,415, filed Apr. 1, 2016, 30 pages.

\* cited by examiner

FORCE SENSOR-BASED MOTION OR ORIENTATION DETERMINATION IN A DEVICE

CROSS-REFERENCE TO RELATED APPLICATIONS

This application claims benefit of U.S. Provisional Patent Application No. 62/261,832, filed Dec. 1, 2015 and U.S. Provisional Patent Application No. 62/261,835, filed Dec. 1, 2015, which are hereby incorporated by reference in their entirety.

FIELD OF THE DISCLOSURE

This relates generally to determining the motion and/or orientation of an electronic device, and more particularly, to doing so using one or more force sensors integrated in the electronic device.

BACKGROUND OF THE DISCLOSURE

Many types of input devices are presently available for performing operations in a computing system, such as buttons or keys, mice, trackballs, joysticks, touch electrode panels, touch screens and the like. Touch screens, in particular, are becoming increasingly popular because of their ease and versatility of operation as well as their declining price. Touch screens can include a touch electrode panel, which can be a clear panel with a touch-sensitive surface, and a display device such as a liquid crystal display (LCD) that can be positioned partially or fully behind the panel so that the touch-sensitive surface can cover at least a portion of the viewable area of the display device. Touch screens can allow a user to perform various functions by touching the touch electrode panel using a finger, stylus or other object at a location often dictated by a user interface (UI) being displayed by the display device. In general, touch screens can recognize a touch and the position of the touch on the touch electrode panel, and the computing system can then interpret the touch in accordance with the display appearing at the time of the touch, and thereafter can perform one or more actions based on the touch. In the case of some touch sensing systems, a physical touch on the display is not needed to detect a touch. For example, in some capacitive-type touch sensing systems, fringing electrical fields used to detect touch can extend beyond the surface of the display, and objects approaching near the surface may be detected near the surface without actually touching the surface.

In some examples, touch panels/touch screens may include force sensing capabilities—that is, they may be able to detect an amount of force with which an object is touching the touch panels/touch screens. These forces can constitute force inputs to electronic devices for performing various functions, for example. In some examples, the force sensing capabilities in the touch panels/touch screens may provide motion- or orientation-dependent outputs. It can be beneficial to use those outputs to determine the motion and/or orientation of the touch panels/touch screens, or the electronic devices in which they are integrated.

SUMMARY OF THE DISCLOSURE

Some electronic devices can include touch screens that may include force sensing capabilities—that is, they may be able to detect an amount of force with which an object is touching the touch screens. These forces can constitute force inputs to the electronic devices for performing various functions, for example. In some examples, the force sensing capabilities in the touch screens may provide motion- or orientation-dependent outputs. It can be beneficial to use those outputs to determine the motion and/or orientation of the touch screens, or the electronic devices in which they are integrated. In this way, discrete accelerometer and/or gyroscope circuitry may not be required to be included in the electronic devices, potentially saving cost and/or space in the device. In some examples, the above-mentioned force sensing capability in an electronic device can be provided by utilizing a flex layer that can be relatively free-moving, and thus can deflect to various degrees when the electronic device in which the touch screen is integrated is experiencing motion or changes in orientation. These deflections in the flex layer can be sensed to determine one or more characteristics of the motion and/or orientation of the electronic device. Various examples of the above are provided in this disclosure.

DETAILED DESCRIPTION

In the following description of examples, reference is made to the accompanying drawings which form a part hereof, and in which it is shown by way of illustration specific examples that can be practiced. It is to be understood that other examples can be used and structural changes can be made without departing from the scope of the disclosed examples.

Some electronic devices can include touch screens that may include force sensing capabilities—that is, they may be able to detect an amount of force with which an object is touching the touch screens. These forces can constitute force inputs to the electronic devices for performing various functions, for example. In some examples, the force sensing capabilities in the touch screens may provide motion- or orientation-dependent outputs. It can be beneficial to use those outputs to determine the motion and/or orientation of the touch screens, or the electronic devices in which they are integrated. In this way, discrete accelerometer and/or gyroscope circuitry may not be required to be included in the electronic devices, potentially saving cost and/or space in the device. In some examples, the above-mentioned force sensing capability in an electronic device can be provided by utilizing a flex layer that can be relatively free-moving, and thus can deflect to various degrees when the electronic device in which the touch screen is integrated is experiencing motion or changes in orientation. These deflections in the flex layer can be sensed to determine one or more characteristics of the motion and/or orientation of the electronic device. Various examples of the above are provided in this disclosure.

Figure 1C:
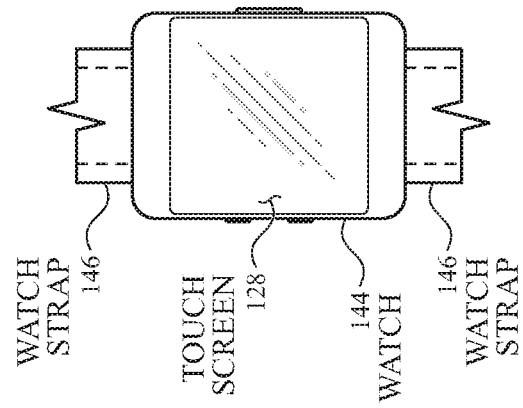
FIGS. 1A-1C show exemplary devices in which the force sensing and motion determination of the disclosure can be implemented according to examples of the disclosure.
Figure 1B:
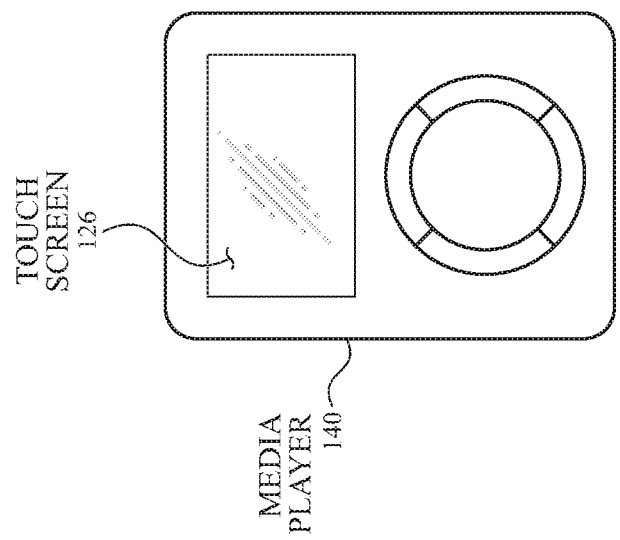
Figure 1A:
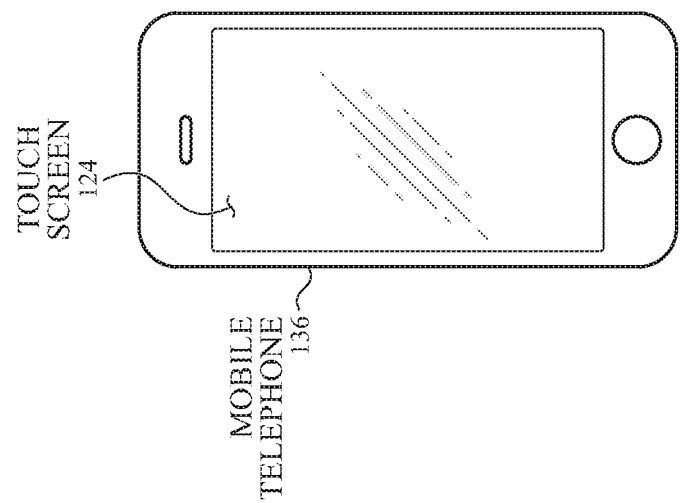

FIGS. 1A-1C show exemplary devices in which the force sensing and motion determination of the disclosure can be implemented according to examples of the disclosure. FIG. 1A illustrates an example mobile telephone 136 that includes a touch screen 124. FIG. 1B illustrates an example digital media player 140 that includes a touch screen 126. FIG. 1C illustrates an example watch 144 that includes a touch screen 128. It is understood that the above touch screens can be implemented in other devices as well, such as tablet computers. Further, though the examples of the disclosure are provided in the context of a touch screen, it is understood that the examples of the disclosure can similarly be implemented in a touch sensor panel without display functionality.

In some examples, touch screens 124, 126 and 128 can be based on self-capacitance. A self-capacitance based touch system can include a matrix of small, individual plates of conductive material that can be referred to as touch node electrodes. For example, a touch screen can include a plurality of individual touch node electrodes, each touch node electrode identifying or representing a unique location on the touch screen at which touch or proximity (i.e., a touch or proximity event) is to be sensed, and each touch node electrode being electrically isolated from the other touch node electrodes in the touch screen. Such a touch screen can be referred to as a pixelated self-capacitance touch screen, though it is understood that in some examples, the touch node electrodes on the touch screen can be used to perform scans other than self-capacitance scans on the touch screen (e.g., mutual capacitance scans). During operation, a touch node electrode can be stimulated with an AC waveform, and the self-capacitance to ground of the touch node electrode can be measured. As an object approaches the touch node electrode, the self-capacitance to ground of the touch node electrode can change. This change in the self-capacitance of the touch node electrode can be detected and measured by the touch sensing system to determine the positions of multiple objects when they touch, or come in proximity to, the touch screen. In some examples, the electrodes of a self-capacitance based touch system can be formed from rows and columns of conductive material, and changes in the self-capacitance to ground of the rows and columns can be detected, similar to above. In some examples, a touch screen can be multi-touch, single touch, projection scan, full-imaging multi-touch, capacitive touch, etc.

In some examples, touch screens 124, 126 and 128 can be based on mutual capacitance. A mutual capacitance based touch system can include drive and sense lines that may cross over each other on different layers, or may be adjacent to each other on the same layer. The crossing or adjacent locations can be referred to as touch nodes. During operation, the drive line can be stimulated with an AC waveform and the mutual capacitance of the touch node can be measured. As an object approaches the touch node, the mutual capacitance of the touch node can change. This change in the mutual capacitance of the touch node can be detected and measured by the touch sensing system to determine the positions of multiple objects when they touch, or come in proximity to, the touch screen.

Figure 2A:
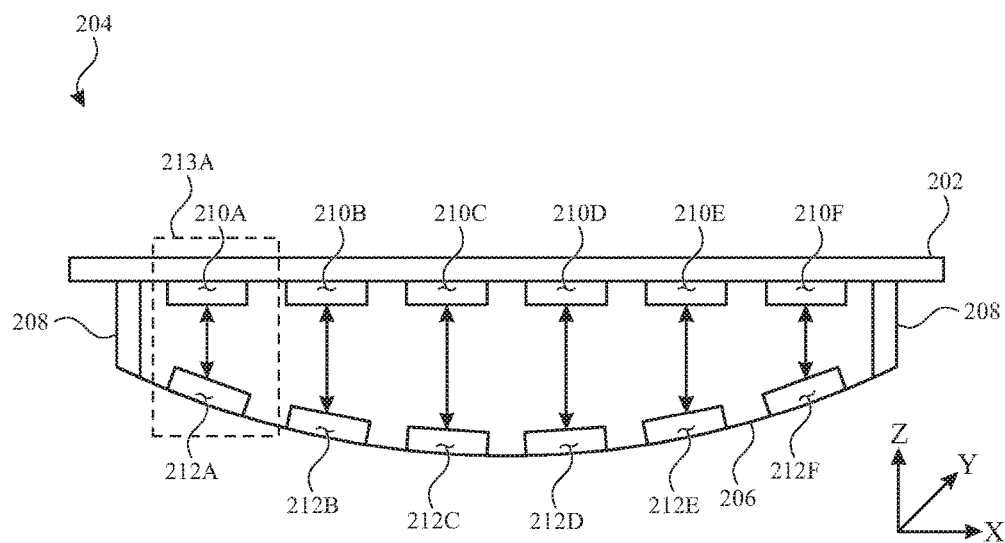
FIGS. 2A-2D illustrate an exemplary architecture for implementing force sensing and motion determination in the touch screen of the disclosure.

In some examples, the touch screen of the disclosure can include force sensing capability in addition to the touch sensing capability discussed above. In the context of this disclosure, touch sensing can refer to the touch screen's ability to determine the existence and/or location of an object touching the touch screen, and force sensing can refer to the touch screen's ability to determine a "depth" of the touch on the touch screen (e.g., the degree of force with which the object is touching the touch screen). In some examples, the touch screen can also determine a location of the force on the touch screen. FIGS. 2A-2D illustrate an exemplary architecture for implementing force sensing and motion determination in the touch screen of the disclosure. FIG. 2A illustrates a cross section of a portion of the structure of force sensing touch screen 204 according to examples of the disclosure. Touch screen 204 can correspond to one or more of touch screens 124, 126 and 128 in FIGS. 1A-1C. Touch screen 204 can include cover glass 202, which can be the surface of the touch screen on which a user touches the touch screen (e.g., with a finger, stylus, or other object). Touch screen 204 can also include flex layer 206, which can be a flexible material anchored to cover glass 202 at anchors 208. Anchors 208 can affix the edges of flex layer 206 to cover glass 202, such that the edges of the flex layer can be substantially stationary, but the remaining portions of the flex layer can be substantially free to move toward and away from the cover glass. In some examples, flex layer 206 may not be anchored or affixed to cover glass 202—in such examples, the edges of the flex layer can be affixed to another structure that maintains the edges of the flex layer substantially stationary while leaving the remaining portions of the flex layer substantially free to move toward and away from the cover glass. Cover glass 202 can also include display components (e.g., LCD layers and associated components, OLED layers and associated components, etc.), which are not illustrated for simplicity.

Cover glass 202 can include or be coupled to a plurality of cover glass electrodes 210a-210f (referred to collectively as cover glass electrodes 210). Cover glass electrodes 210 can be electrically conductive elements (e.g., indium tin oxide (ITO)) that can be electrically isolated from one another. Similarly, flex layer 206 can include or be coupled to a plurality of flex layer electrodes 212a-212f (referred to collectively as flex layer electrodes 212) that can correspond to cover glass electrodes 210. For example, flex layer electrode 212a can correspond to cover glass electrode 210a, flex layer electrode 212b can correspond to cover glass electrode 210b, and so on. Flex layer electrodes 212 can also be electrically conductive elements (e.g., ITO) that can be electrically isolated from one another. Pairs of corresponding cover glass electrodes 210 and flex layer electrodes 212 can form force sensors. For example, cover glass electrode 210a and corresponding flex layer electrode 212a can form force sensor 213a.

Touch screen 204 and/or the device in which the touch screen is integrated can be configured to detect changes in capacitance between corresponding pairs of cover glass electrodes 210 and flex layer electrodes 212. These changes in capacitance can be mapped to corresponding changes in distance (or gaps) between cover glass electrodes 210 and flex layer electrodes 212 and/or corresponding force values (e.g., newtons) of a touch on cover glass 202. In some examples, a table stored in memory, for example, can include a mapping of capacitance measurements to gap values. Such a table can be stored in the memory when the touch screen is manufactured. In some examples, a mathematical relationship between capacitance measurements and gap values can be used to determine gap values from the capacitance measurements. For example, if a user touches a location of cover glass 202 with sufficient force to cause the cover glass to deflect towards flex layer 206, touch screen 204 can detect a change in capacitance between the cover glass electrodes 210 and the flex layer electrodes 212 at that location (e.g., at the force sensor at that location), and can determine an amount of deflection of the cover glass and/or a corresponding amount of force of the touch. Because touch screen 204 can include a plurality of discrete force sensors, the touch screen can also determine a location of the force on cover glass 202.

Figure 2B:
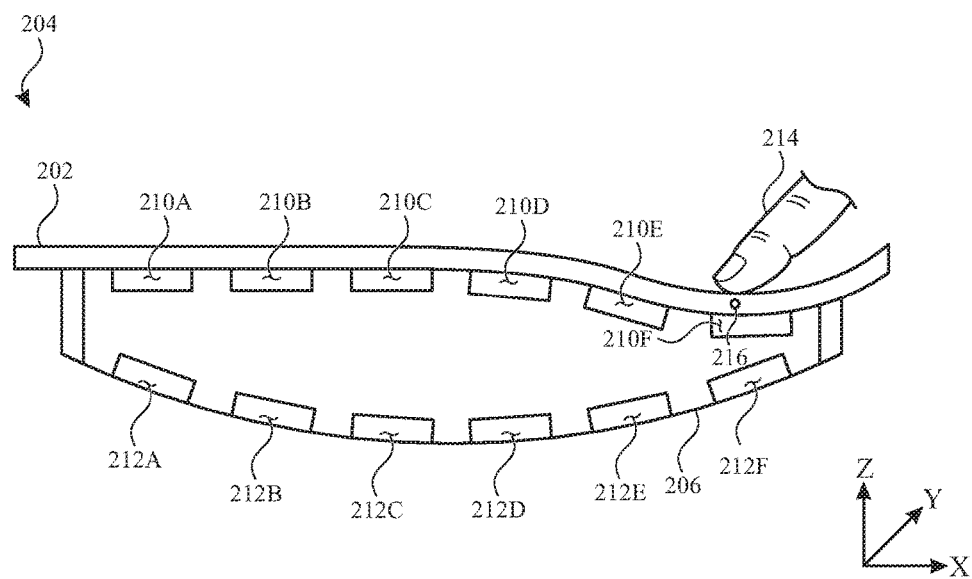

FIG. 2B illustrates finger 214 touching cover glass 202 at location 216 with sufficient force to deflect the cover glass according to examples of the disclosure. As a result of the deflection of cover glass 202 around location 216, cover glass electrodes 210d, 210e and 210f can be deflected towards flex layer 206 along the z-axis to varying degrees, and thus the distances (or gaps) between cover glass electrodes 210d, 210e and 210f and corresponding flex layer electrodes 212d, 212e and 212f can be reduced to varying degrees. Touch screen 204 can detect the changes in capacitance between the above pairs of cover glass electrodes 210 and flex layer electrodes 212 to determine the location of the deflection of cover glass 202, an amount of deflection of the cover glass, and/or an amount of force applied by finger 214 at location 216. In this way, touch screen 204 can use the above-described mechanism to detect force on cover glass 202.

Figure 2C:
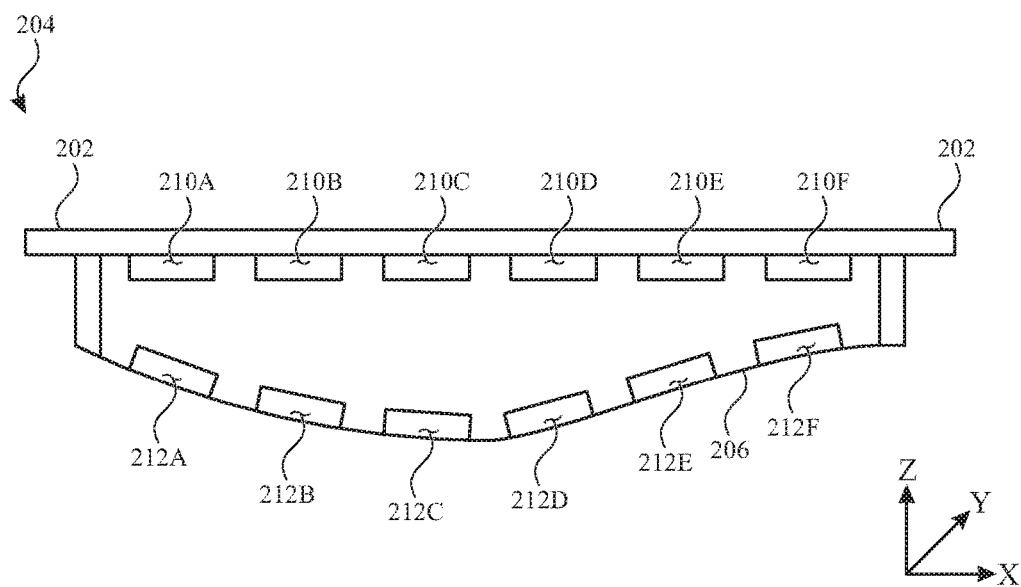

Because flex layer 206 can be substantially free to move except at its edges, as described above, the flex layer itself can deflect as a result of motions or orientations of the device in which touch screen 204 is integrated (e.g., rotations of the device, translations of the device, changes in orientation of the device that can cause gravity to change its effect on the flex layer, etc.). FIG. 2C illustrates deflection of flex layer 206 resulting from motion of touch screen 204 according to examples of the disclosure. Due to inertial effects on flex layer 206 and/or flex layer electrodes 212, movement of touch screen 204 can result in movement of the flex layer. For example, a given movement of touch screen 204 can cause flex layer electrodes 212c, 212d, 212e and 212f to be deflected towards cover glass 202 along the z-axis, as illustrated. As described above, touch screen 204 can sense such deflections as changes in capacitance between the respective cover glass and flex layer electrodes. However, in the circumstance of FIG. 2C, these changes in capacitance sensed by the touch screen can be caused by motion of touch screen 204 rather than by deflection of cover glass 202 due to touch activity on the cover glass (e.g., as described with reference to FIG. 2B). As such, it can be possible to sense deflections of flex layer 206 to determine one or more characteristics of the physical state (e.g., movement, orientation, etc.) of the device in which touch screen 204 is integrated, as will be described in more detail below.

Figure 2D:
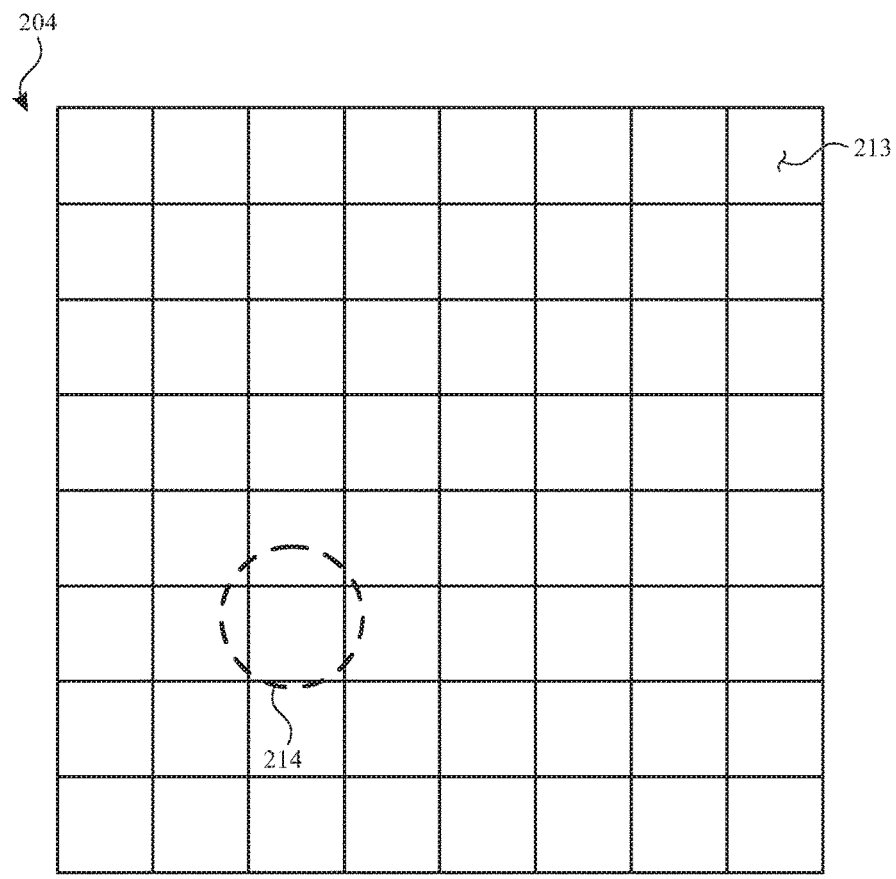

In some examples, touch screen 204 can include a two-dimensional array of force sensors that may be able to detect force at various locations on the touch screen (and consequently, deflections of the flex layer at various locations on the touch screen). FIG. 2D illustrates an exemplary two-dimensional arrangement of force sensors 213 on touch screen 204 according to examples of the disclosure. As described previously, force sensors 213 can comprise cover glass electrode-flex layer electrode pairs. In the illustrated example, touch screen 204 can include an eight-by-eight arrangement of force sensors 213, though other two-dimensional arrangements of force sensors are also within the scope of the disclosure. As described above, in some circumstances, a finger or other object 214 can touch the cover glass (not illustrated) with sufficient force to deflect the cover glass, and touch screen 204 can detect the location, deflection and/or force corresponding to the touch at various locations on the touch screen. In some examples, touch screen 204 can also detect the location, deflection and/or force of multiple fingers or objects touching the touch screen concurrently, and the deflection of the flex layer at various locations on the touch screen concurrently.

Figure 3A:
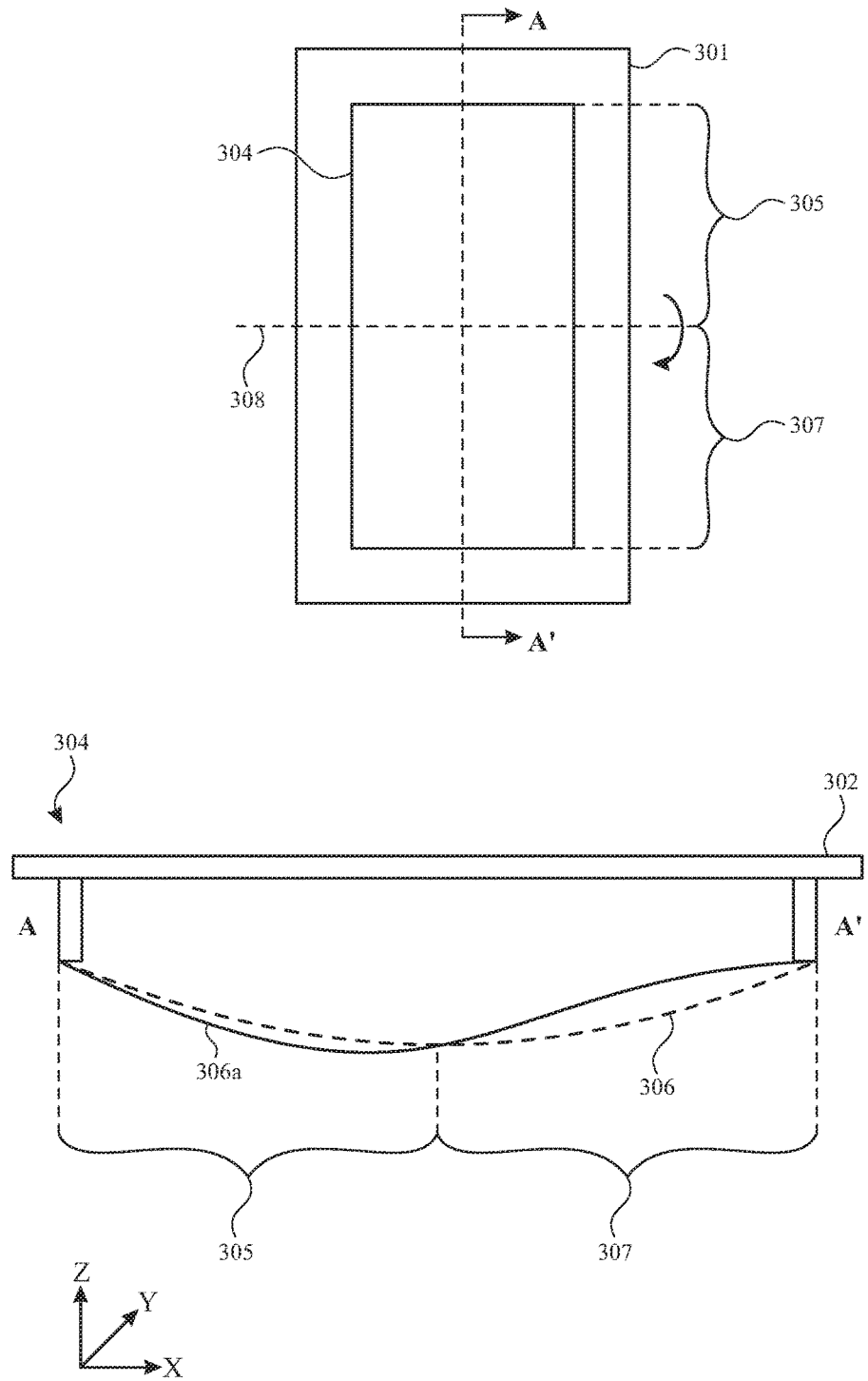
FIG. 3A illustrates an exemplary deflection of a flex layer as a result of rotation of a device about a center-axis according to examples of the disclosure.
Figure 3B:
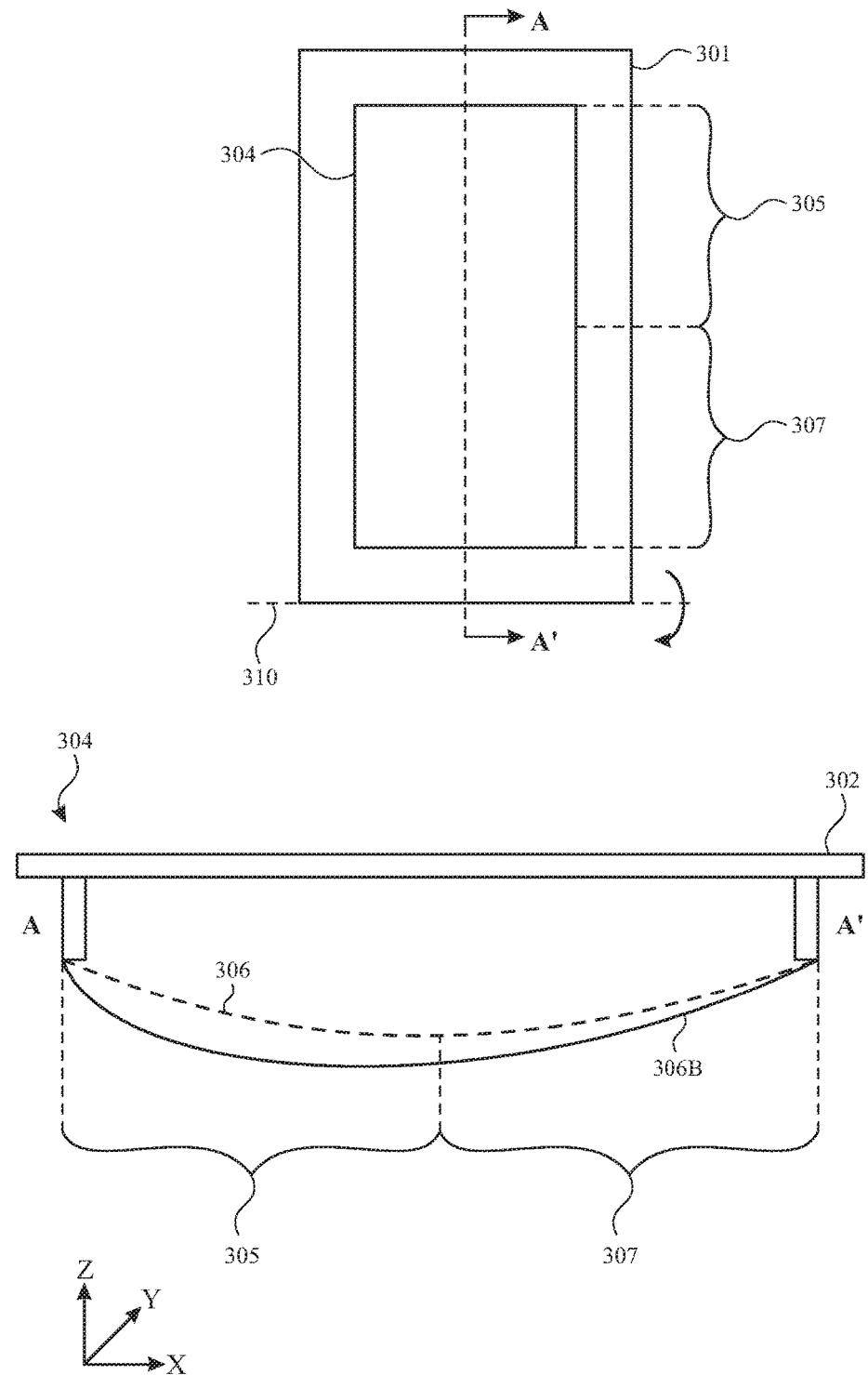
FIG. 3B illustrates an exemplary deflection of a flex layer as a result of rotation of a device about an edge-axis according to examples of the disclosure.
Figure 3C:
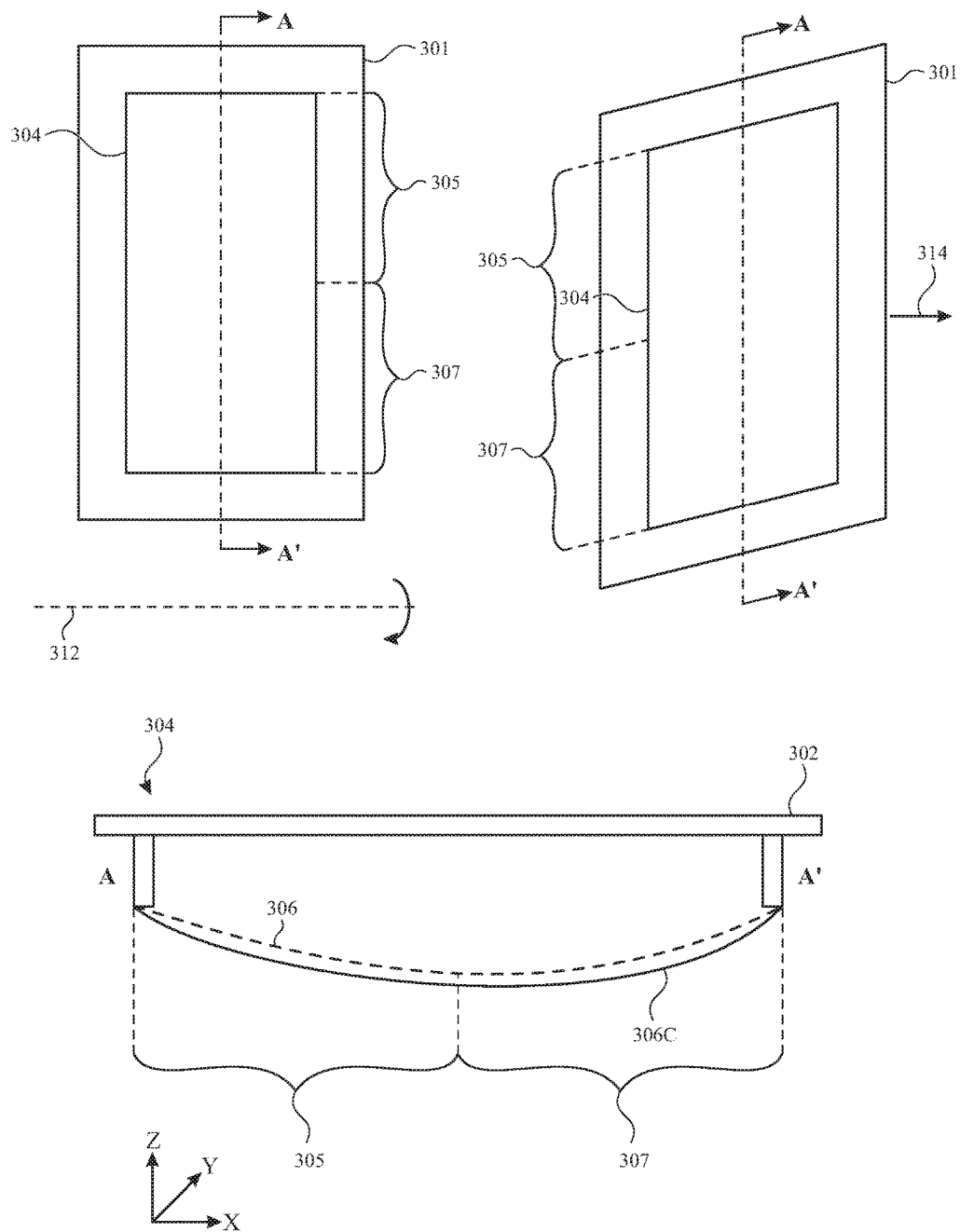
FIG. 3C illustrates an exemplary deflection of a flex layer as a result of rotation of a device about a remote-axis and/or translational movement of the device according to examples of the disclosure.

As discussed above, the flex layer in the touch screen of the disclosure can deflect as a result of movement and/or orientation of the device in which the touch screen can be integrated. FIGS. 3A-3C illustrate exemplary deflection of flex layer 306a as a result of various motion characteristics of device 301, which can include touch screen 304 according to examples of the disclosure. FIG. 3A illustrates exemplary deflection of flex layer 306 as a result of rotation of device 301 about center-axis 308 according to examples of the disclosure. Axis 308 can be horizontally disposed through substantially the center of device 301, as illustrated. Thus, the top portion 305 of touch screen 304 can rotate around axis 308 out of the page, and the bottom portion 307 of the touch screen can rotate around axis 308 into the page.

FIG. 3A includes a cross-section of touch screen 304 along axis A-A' during the above-described rotation. Axis A-A' can be substantially perpendicular to axis 308, as shown. The structure of the cross-section of touch screen 304 can correspond to that illustrated in FIGS. 2A-2C, though cover glass electrodes and flex layer electrodes have been omitted for simplicity of discussion. Flex layer profile 306 can reflect a neutral (e.g., non-deflected) state of the flex layer, and flex layer 306a can reflect the deflected state of the flex layer due to rotation of device 301 about axis 308. Specifically, flex layer 306a in portion 305 of touch screen 304 can experience inertial force in the negative-z direction (e.g., in response to the movement of portion 305 of the touch screen in the positive-z direction), and flex layer 306a in portion 307 of the touch screen can experience inertial force in the positive-z direction (e.g., in response to the movement of portion 307 of the touch screen in the negative-z direction). As a result, flex layer 306a can deflect in the negative-z direction with respect to neutral flex layer profile 306 in portion 305 of touch screen 304, and flex layer 306a can deflect in the positive-z direction with respect to neutral flex layer profile 306 in portion 307 of the touch screen. These deflections in flex layer 306a can be sensed by the touch screen to identify rotation about axis 308, as will be described in more detail with reference to FIGS. 4A-4B. Thus, the device in which touch screen 304 is integrated may not require discrete accelerometer and/or gyroscope circuitry to identify such rotation about axis 308, potentially saving cost and/or space in the device.

FIG. 3B illustrates exemplary deflection of flex layer 306b as a result of rotation of device 301 about edge-axis 310 according to examples of the disclosure. Axis 310 can be horizontally disposed at substantially an edge of device 301 (e.g., the bottom edge), as illustrated. Thus, both the top portion 305 of touch screen 304 and the bottom portion 307 of the touch screen can rotate out of the page around axis 310.

FIG. 3B includes a cross-section of touch screen 304 along axis A-A' during the above-described rotation. Axis A-A' can be substantially perpendicular to axis 310, as shown. The structure of the cross-section of touch screen 304 can correspond to that illustrated in FIGS. 2A-2C, though cover glass electrodes and flex layer electrodes have been omitted for simplicity of discussion. Flex layer profile 306 can reflect a neutral (e.g., non-deflected) state of the flex layer, and flex layer 306b can reflect the deflected state of the flex layer due to rotation of device 301 about axis 310. Specifically, both flex layer 306b in portion 305 of touch screen 304 and flex layer 306b in portion 307 of the touch screen can experience inertial force in the negative-z direction. However, flex layer 306b in portion 305 of touch screen 304 can experience greater inertial force in the negative-z direction than can flex layer 306b in portion 307 of the touch screen, because portion 305 can be further away from axis 310 than portion 307. As a result, flex layer 306b in portion 305 of touch screen 304 can deflect more in the negative-z direction with respect to neutral flex layer profile 306 than flex layer 306b in portion 307 of the touch screen. These deflections in flex layer 306b can be sensed by the touch screen to identify rotation about axis 310, as will be described in more detail with reference to FIGS. 4A-4B. Thus, as previously stated, the device in which touch screen 304 is integrated may not require discrete accelerometer and/or gyroscope circuitry to identify such rotation about axis 310, potentially saving cost and/or space in the device.

FIG. 3C illustrates exemplary deflection of flex layer 306c as a result of rotation of device 301 about remote-axis 312 and/or translational movement of the device according to examples of the disclosure. In the case of rotational movement in FIG. 3C, axis 312 can be horizontally disposed remote (e.g., relatively far) from device 301, as illustrated. Thus, both the top portion 305 of touch screen 304 and the bottom portion 307 of the touch screen can rotate out of the page around axis 312. In the case of translational movement in FIG. 3C, device 301 can move in direction 314 substantially normal to the surface of the device and/or touch screen 304, as illustrated.

FIG. 3C includes a cross-section of touch screen 304 along axis A-A' during the above-described rotation and/or translational movement. Axis A-A' can be substantially perpendicular to axis 312 and direction 314, as shown. The structure of the cross-section of touch screen 304 can correspond to that illustrated in FIGS. 2A-2C, though cover glass electrodes and flex layer electrodes have been omitted for simplicity of discussion. Because axis 312 can be relatively far from device 301, the acceleration and/or force experienced by the device when rotating about axis 312 can be substantially the same as the acceleration and/or force experienced by the device when undergoing translational movement along direction 314, thus exemplary behavior of flex layer 306c for both scenarios will be described collectively. Flex layer profile 306 can reflect a neutral (e.g., non-deflected) state of the flex layer, and flex layer 306c can reflect the deflected state of the flex layer due to rotation of device 301 about axis 312 and/or translation of the device along direction 314. Specifically, flex layer 306c in portion 305 of touch screen 304 and flex layer 306c in portion 307 of the touch screen can experience substantially the same inertial force in the negative-z direction. As a result, flex layer 306c in portion 305 of touch screen 304 and flex layer 306c in portion 307 of the touch screen can deflect by substantially the same amount with respect to neutral flex layer profile 306. These deflections in flex layer 306c can be sensed by the touch screen to identify rotation about axis 312 and/or translation along direction 314, as will be described in more detail with reference to FIGS. 4A-4B. Thus, as previously stated, the device in which touch screen 304 is integrated may not require discrete accelerometer and/or gyroscope circuitry to identify such rotation about axis 312 and/or translation along direction 314, potentially saving cost and/or space in the device.

Figure 4A:
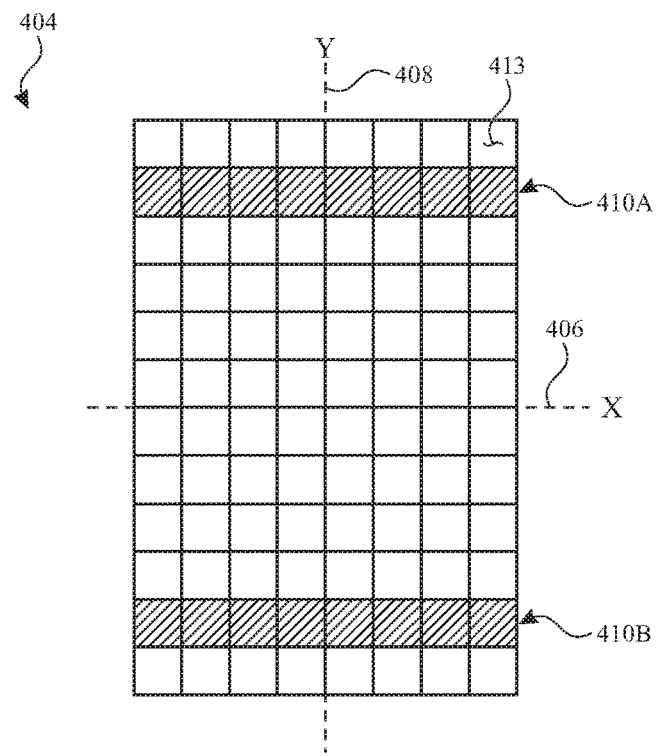
FIGS. 4A-4B illustrate exemplary sensing schemes for identifying one or more motion characteristics of the touch screen of the disclosure, such as those described with reference to FIGS. 3A-3C.
Figure 4B:
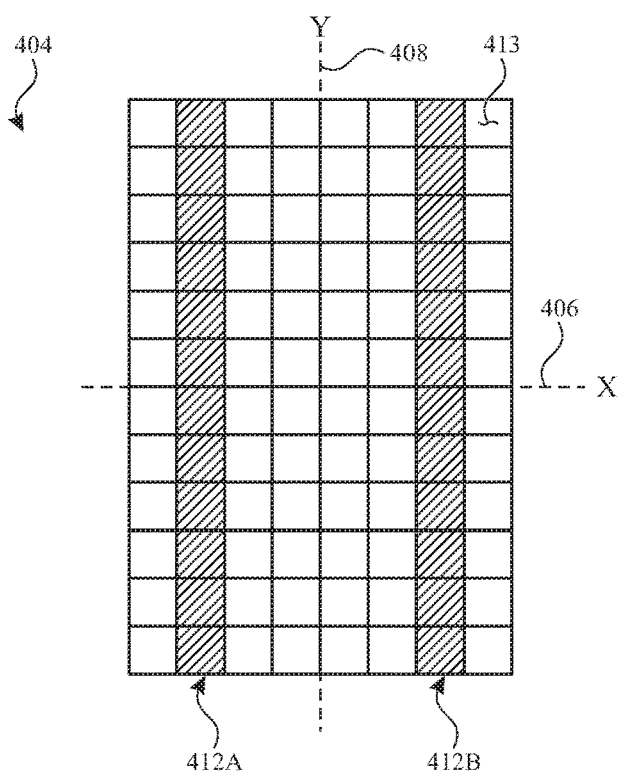

FIGS. 4A-4B illustrate exemplary sensing schemes for identifying one or more motion characteristics of the touch screen of the disclosure, such as those described with reference to FIGS. 3A-3C. In particular, FIG. 4A illustrates a first phase of a force sensor sensing scheme for identifying rotation and/or translation of the touch screen, and FIG. 4B illustrates a second phase of the force sensor sensing scheme for identifying rotation and/or translation of the touch screen according to examples of the disclosure. In some examples, the force sensor sensing schemes of the disclosure may be performed only when no touch is detected on the touch screen (e.g., as determined by touch circuitry in the touch screen described with reference to FIGS. 1A-1C). Touch screen 404 can include a twelve-by-eight array of force sensors 413, though other arrangements of force sensors are similarly within the scope of the disclosure. Axis X 406 can represent an axis that passes horizontally through the center of touch screen 404, and axis Y 408 can represent an axis that passes vertically through the center of the touch screen, perpendicular to axis X.

During the first phase of the force sensor sensing scheme, illustrated in FIG. 4A, one or more force sensors 413 on opposite sides of axis X 406 can be sensed (e.g., concurrently sensed or sequentially sensed, perhaps in relatively quick succession). In the example of FIG. 4A, these force sensors 413 can be rows 410*a* and 410*b* of force sensors, for example, though other configurations in which at least one force sensor above axis X 406 and at least one force sensor below axis X are sensed are within the scope of the disclosure. In some examples, force sensors 413 at the edges of touch screen 404 may not be sensed, because the flex layer at those force sensors can be relatively-noncompliant as a result of being anchored at those locations—thus, the signal-to-noise ratio of the force sensor readings at the edges of the touch screen can be relatively low. Sensing rows 410*a* and 410*b* of force sensors 413 can indicate the degree of rotation of touch screen 404 about axis X 406 and/or the degree of translation of the touch screen. For example, if the force sensors 413 in row 410*a* indicate increased gaps with respect to a neutral state, and the force sensors in row 410*b* indicate decreased gaps with respect to the neutral state, touch screen 404 can determine that it is experiencing motion that has at least a rotational component about axis X 406 (e.g., as described with reference to FIG. 3A). The amounts of the above-mentioned gap changes can indicate the magnitude of the rotational component of the motion (e.g., larger gap changes can indicate faster rotation). As another example, if the force sensors 413 in row 410*a* indicate increased gaps with respect to a neutral state, and the force sensors in row 410*b* also indicate increased gaps with respect to the neutral state, touch screen 404 can determine that it is experiencing motion that has at least a translational component with respect to axis X 406 (e.g., with the top side of the touch screen rotating about axis X out of the page, and the bottom side of the touch screen rotating about axis X into the page, as described with reference to FIG. 3C). One of skill in the art will understand other variations of the above-described scenarios, as well as those described with reference to FIGS. 3A-3C, to determine motion of touch screen 404 with respect to axis X 406 according to examples of the disclosure.

During the second phase of the force sensor sensing scheme, illustrated in FIG. 4B, one or more force sensors 413 on opposite sides of axis Y 408 can be sensed (e.g., concurrently sensed or sequentially sensed, perhaps in relatively quick succession). In some examples, the second phase of the force sensor sensing scheme can be performed concurrently with the first phase of the force sensor sensing scheme described with reference to FIG. 4A; in some examples, the second phase can be performed subsequent to the first phase. In the example of FIG. 4B, the sensed force sensors 413 can be columns 412*a* and 412*b* of force sensors, for example, though other configurations in which at least one force sensor to the left of axis Y 408 and at least one force sensor to the right of axis Y are sensed are within the scope of the disclosure. In some examples, force sensors 413 at the edges of touch screen 404 may not be sensed, because the flex layer at those force sensors can be relatively-noncompliant as a result of being anchored at those locations—thus, the signal-to-noise ratio of the force sensor readings at the edges of the touch screen can be relatively low. Sensing columns 412*a* and 412*b* of force sensors 413 can indicate the degree of rotation of touch screen 404 about axis Y 408 and/or the degree of translation of the touch screen. For example, if the force sensors 413 in column 412*a* indicate increased gaps with respect to a neutral state, and the force sensors in column 412*b* indicate decreased gaps with respect to the neutral state, touch screen 404 can determine that it is experiencing motion that has at least a rotational component about axis Y 408 (e.g., with the left side of the touch screen rotating about axis Y out of the page, and the right side of the touch screen rotating about axis Y into the page). The amounts of the above-mentioned gap changes can indicate the magnitude of the rotational component of the motion (e.g., larger gap changes can indicate faster rotation). As another example, if the force sensors 413 in column 412*a* indicate increased gaps with respect to a neutral state, and the force sensors in column 412*b* also indicate increased gaps with respect to the neutral state, touch screen 404 can determine that it is experiencing motion that has at least a translational component with respect to axis Y 408 (e.g., as described with reference to FIG. 3C). One of skill in the art will understand other variations of the above-described scenarios, as well as those described with reference to FIGS. 3A-3C, to determine motion of touch screen 404 with respect to axis Y 408 according to examples of the disclosure.

In some examples, the device in which touch screen 404 is integrated can include a memory that can store a mapping (e.g., a look-up table, or "LUT") of force sensor gap readings to rotational and/or translational motion characteristics. The device can utilize such a mapping to determine the motion of the device using the sensing schemes of this disclosure. In some examples, the device of the disclosure can perform the requisite motion determinations in real-time (e.g., using mathematical relationships) to determine motion of the device using the sensing schemes of this disclosure.

As stated above, in some examples, the above-described first and second phases of the force sensor sensing scheme can be performed concurrently. Further, in some examples, the force sensors used to perform the first and second phases can be: different force sensors (i.e., no force sensor that is part of the sensing scheme is used for both the first phase and the second phase); partially shared force sensors (i.e., at least one force sensor that is part of the sensing scheme is used for both the first phase and the second phase, and at least one force sensor that is part of the sensing scheme is not used for both the first phase and the second phase); or fully shared force sensors (i.e., all of the force sensors that are part of the sensing scheme are used for both the first phase and the second phase). For example, a force sensor sensing scheme in which a force sensor in the upper-left quadrant of touch screen 404 (e.g., above axis X 406, and to the left of axis Y 408) and a force sensor in the lower-right quadrant of the touch screen (e.g., below axis X, and to the right of axis Y) are sensed can provide sufficient information to determine motion of the touch screen with respect to both axis X and axis Y. Specifically, such a sensing scheme can include at least one force sensor above and below axis X 406, and at least one force sensor to the left and right of axis Y 408—as described above, this arrangement can be sufficient to determine motion with respect to axes X and Y.

In some examples, the exemplary force sensor sensing schemes of the disclosure can be used to determine, not only the existence of rotation and/or translation of the touch screen, but also the degree of such rotation and/or translation, as discussed above. In some examples, the exemplary force sensor sensing schemes of the disclosure can be used to determine the existence of rotation and/or translation of the touch screen, without determining the degree of such rotation and/or translation. For example, in such examples, the device can determine averages of baselined gaps (e.g., changes in force sensor gaps with respect to the gaps in a neutral state) of the groups of force sensors sensed during the first and/or second phases, and can use these averages in determining whether the device is experiencing primarily rotational motion or primarily translational motion (or no motion at all). Specifically, for the first phase described in FIG. 4A, the following equations can be utilized:

$$y_{row\ 410a} = \text{average baselined gap of force sensors in row 410a} \quad (1)$$

$$y_{row\ 410b} = \text{average baselined gap of force sensors in row 410b} \quad (2)$$

$$y_{horizontal} = \text{envelope of } (y_{row\ 410a} - y_{row\ 410b}) \quad (3)$$

Similarly, for the second phase described in FIG. 4B, the following equations can be utilized:

$$y_{col.\ 412a} = \text{average baselined gap of force sensors in col. 412a} \quad (4)$$

$$y_{col.\ 412b} = \text{average baselined gap of force sensors in col. 412b} \quad (5)$$

$$y_{vertical} = \text{envelope of } (y_{col.412a} - y_{col.412b}) \quad (6)$$

where the envelope function utilized in equations (3) and (6) can be any suitable envelope function as would be understood by one of ordinary skill in the art. The mean squared error (MSE) of $y_{horizontal}$ and $y_{vertical}$ can be determined as:

$$y_{squared} = \sqrt[2]{(y_{horizontal}^2 + y_{vertical}^2)} \quad (7)$$

If $y_{squared}$ is greater than a predetermined threshold—that is, if $y_{squared} > \delta_y$—the device can determine that the motion of the device is primarily rotational. In other words, $y_{squared} > \delta_y$ can indicate that the differences between the baselined gaps in rows 410a and 410b and/or columns 412a and 412b of force sensors are sufficiently great to determine that relatively high rotational motion of the touch screen about at least one axis exists. If, on the other hand, $y_{squared}$ is less than the predetermined threshold—that is, if $y_{squared} < \delta_y$— the device can determine that the motion of the device is primarily translational. Equations (1)-(7) are provided by way of example only, and it is understood that other equations and/or relationships can be utilized to determine whether motion of the device is primarily rotational or translational according to the examples of the disclosure.

Figure 5:
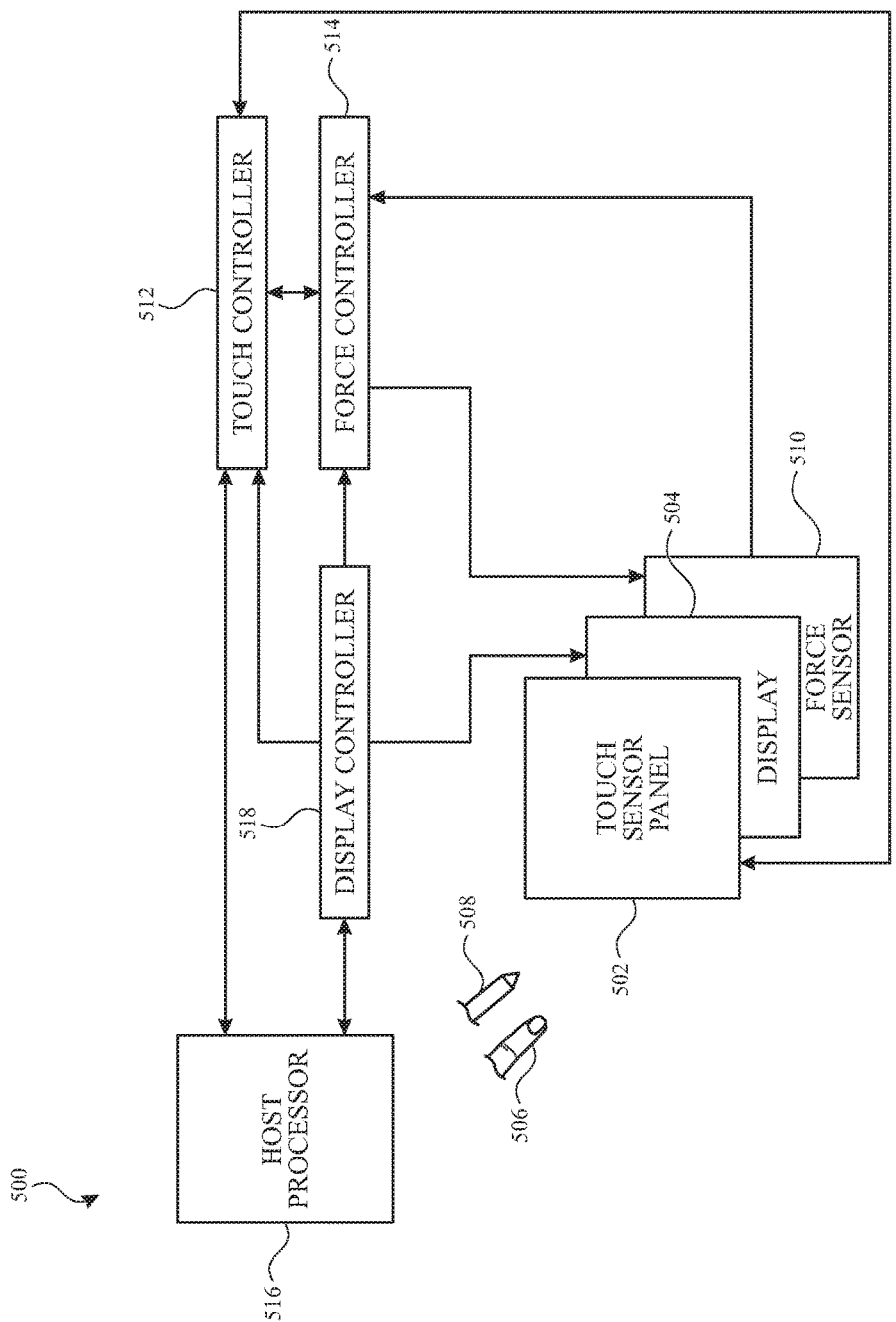
FIG. 5 illustrates an exemplary computing system capable of implementing force sensing and motion determination according to examples of the disclosure.

FIG. 5 illustrates exemplary computing system 500 capable of implementing force sensing and motion determination according to examples of the disclosure. Computing system 500 can include a touch sensor panel 502 to detect touch or proximity (e.g., hover) events from a finger 506 or stylus 508 at a device, such as a mobile phone, tablet, touchpad, portable or desktop computer, portable media player, wearable device or the like. Touch sensor panel 502 can include a pattern of electrodes to implement various touch and/or stylus sensing scans. The pattern of electrodes can be formed of transparent conductive medium such as Indium Tin Oxide (ITO) or Antimony Tin Oxide (ATO), although other transparent and non-transparent materials, such as copper, can also be used. For example, the touch sensor panel 502 can include an array of touch nodes that can be formed by a two-layer electrode structure (e.g., row and column electrodes) separated by a dielectric material, although in other examples the electrodes can be formed on the same layer. Touch sensor panel 502 can be based on self-capacitance or mutual capacitance or both, as previously described.

In addition to touch sensor panel 502, computing system 500 can include display 504 and force sensor circuitry 510 (e.g., cover glass electrodes 210, flex layer 206 and flex layer electrodes 212 in FIGS. 2A-2C) to create a touch and force sensitive display screen. Display 504 can use liquid crystal display (LCD) technology, light emitting polymer display (LPD) technology, organic LED (OLED) technology, or organic electro luminescence (OEL) technology, although other display technologies can be used in other examples. In some examples, the touch sensor panel 502, display 504 and/or force sensor circuitry 510 can be stacked on top of one another. For example, touch sensor panel 502 can cover a portion or substantially all of a surface of display 504. In other examples, the touch sensor panel 502, display 504 and/or force sensor circuitry 510 can be partially or wholly integrated with one another (e.g., share electronic components, such as in an in-cell touch screen). In some examples, force sensor circuitry 510 can measure mutual capacitance between electrodes mounted on the backplane of display 504 (e.g., cover glass electrodes 210 in FIGS. 2A-2C) and electrodes mounted on a proximate flex circuit (e.g., flex layer electrodes 212 in FIGS. 2A-2C).

Computing system 500 can include one or more processors, which can execute software or firmware implementing and synchronizing display functions and various touch, stylus and/or force sensing functions (e.g., force sensing and motion determination) according to examples of the disclosure. The one or more processors can include a touch processor in touch controller 512, a force processor in force controller 514 and a host processor 516. Force controller 514 can implement force sensing operations, for example, by controlling force sensor circuitry 510 (e.g., stimulating one or more electrodes of the force sensor circuitry 510) and receiving force sensing data (e.g., mutual capacitance information) from the force sensor circuitry 510 (e.g., from one or more electrodes mounted on a flex circuit). Additionally, in some examples, force controller 514 can receive accelerometer data from an internal or external accelerometer (not shown). In some examples, the force controller 514 can implement the force sensing and/or motion determination processes of the disclosure. In some examples, the force controller 514 can be coupled to the touch controller 512 (e.g., via an I2C bus) such that the touch controller can configure the force controller 514 and receive the force information from the force controller 514. The force controller 514 can include the force processor and can also include other peripherals (not shown) such as random access memory (RAM) or other types of memory or storage. In some examples, the force controller 514 can be implemented as a single application specific integrated circuit (ASIC) including the force processor and peripherals, though in other examples, the force controller can be divided into separate circuits.

Touch controller 512 can include the touch processor and can also include peripherals (not shown) such as random access memory (RAM) or other types of memory or storage, watchdog timers and the like. Additionally, touch controller 512 can include circuitry to drive (e.g., analog or digital scan logic) and sense (e.g., sense channels) the touch sensor panel 502, which in some examples can be configurable based on the scan event to be executed (e.g., mutual capacitance row-column scan, row self-capacitance scan, stylus scan, pixelated self-capacitance scan, etc.). The touch controller 512 can also include one or more scan plans (e.g., stored in memory) that can define a sequence of scan events to be performed at the touch sensor panel 502. In one example, during a mutual capacitance scan, drive circuitry can be coupled to each of the drive lines on the touch sensor panel 502 to stimulate the drive lines, and the sense circuitry can be coupled to each of the sense lines on the touch sensor panel to detect changes in capacitance at the touch nodes. The drive circuitry can be configured to generate stimulation signals to stimulate the touch sensor panel one drive line at a time, or to generate multiple stimulation signals at various frequencies, amplitudes and/or phases that can be simultaneously applied to drive lines of touch sensor panel 502 (i.e., multi-stimulation scanning). In some examples, the touch controller 512 can be implemented as a single application specific integrated circuit (ASIC) including the touch processor, drive and sense circuitry, and peripherals, though in other examples, the touch controller can be divided into separate circuits. The touch controller 512 can also include a spectral analyzer to determine low noise frequencies for touch and stylus scanning. The spectral analyzer can perform spectral analysis on the scan results from an unstimulated touch sensor panel 502.

Host processor 516 can receive outputs (e.g., touch information) from touch controller 512 and can perform actions based on the outputs that can include, but are not limited to, moving one or more objects such as a cursor or pointer, scrolling or panning, adjusting control settings, opening a file or document, viewing a menu, making a selection, executing instructions, operating a peripheral device coupled to the host device, answering a telephone call, placing a telephone call, terminating a telephone call, changing the volume or audio settings, storing information related to telephone communications such as addresses, frequently dialed numbers, received calls, missed calls, logging onto a computer or a computer network, permitting authorized individuals access to restricted areas of the computer or computer network, loading a user profile associated with a user's preferred arrangement of the computer desktop, permitting access to web content, launching a particular program, encrypting or decoding a message, or the like. Host processor 516 can receive outputs (e.g., force information) from force controller 514 and can perform actions based on the outputs that can include previewing the content of a user interface element on which the force has been provided, providing shortcuts into a user interface element on which the force has been provided, or the like. Host processor 516 can execute software or firmware implementing and synchronizing display functions and various touch, stylus and/or force sensing functions. Host processor 516 can also perform additional functions that may not be related to touch sensor panel processing, and can be coupled to program storage and display 504 for providing a user interface (UI) to a user of the device. Display 504 together with touch sensor panel 502, when located partially or entirely under the touch sensor panel 502, can form a touch screen. The computing system 500 can process the outputs from the touch sensor panel 502 to perform actions based on detected touch or hover events and the displayed graphical user interface on the touch screen.

Computing system 500 can also include a display controller 518. The display controller 518 can include hardware to process one or more still images and/or one or more video sequences for display on display 504. The display controller 518 can be configured to generate read memory operations to read the data representing the frame/video sequence from a memory (not shown) through a memory controller (not shown), for example. The display controller 518 can be configured to perform various processing on the image data (e.g., still images, video sequences, etc.). In some examples, the display controller 518 can be configured to scale still images and to dither, scale and/or perform color space conversion on the frames of a video sequence. The display controller 518 can be configured to blend the still image frames and the video sequence frames to produce output frames for display. The display controller 518 can also be more generally referred to as a display pipe, display control unit, or display pipeline. The display control unit can be generally any hardware and/or firmware configured to prepare a frame for display from one or more sources (e.g., still images and/or video sequences). More particularly, the display controller 518 can be configured to retrieve source frames from one or more source buffers stored in memory, composite frames from the source buffers, and display the resulting frames on the display 504. Accordingly, display controller 518 can be configured to read one or more source buffers and composite the image data to generate the output frame.

In some examples, the display controller and host processor can be integrated into an ASIC, though in other examples, the host processor 516 and display controller 518 can be separate circuits coupled together. The display controller 518 can provide various control and data signals to the display, including timing signals (e.g., one or more clock signals) and/or vertical blanking period and horizontal blanking interval controls. The timing signals can include a pixel clock that can indicate transmission of a pixel. The data signals can include color signals (e.g., red, green, blue). The display controller 518 can control the display 504 in real-time, providing the data indicating the pixels to be displayed as the display is displaying the image indicated by the frame. The interface to such a display 504 can be, for example, a video graphics array (VGA) interface, a high definition multimedia interface (HDMI), a digital video interface (DVI), a LCD interface, a plasma interface, or any other suitable interface.

Note that one or more of the functions described above can be performed by firmware stored in memory and executed by the touch processor in touch controller 512, or stored in program storage and executed by host processor 516. The firmware can also be stored and/or transported within any non-transitory computer-readable storage medium for use by or in connection with an instruction execution system, apparatus, or device, such as a computer-based system, processor-containing system, or other system that can fetch the instructions from the instruction execution system, apparatus, or device and execute the instructions. In the context of this document, a "non-transitory computer-readable storage medium" can be any medium (excluding a signal) that can contain or store the program for use by or in connection with the instruction execution system, apparatus, or device. The non-transitory computer readable medium storage can include, but is not limited to, an electronic, magnetic, optical, electromagnetic, infrared, or semiconductor system, apparatus or device, a portable computer diskette (magnetic), a random access memory (RAM) (magnetic), a read-only memory (ROM) (magnetic), an erasable programmable read-only memory (EPROM) (magnetic), a portable optical disc such a CD, CD-R, CD-RW, DVD, DVD-R, or DVD-RW, or flash memory such as compact flash cards, secured digital cards, USB memory devices, memory sticks, and the like.

The firmware can also be propagated within any transport medium for use by or in connection with an instruction execution system, apparatus, or device, such as a computer-based system, processor-containing system, or other system that can fetch the instructions from the instruction execution system, apparatus, or device and execute the instructions. In the context of this document, a "transport medium" can be any medium that can communicate, propagate or transport the program for use by or in connection with the instruction execution system, apparatus, or device. The transport readable medium can include, but is not limited to, an electronic, magnetic, optical, electromagnetic or infrared wired or wireless propagation medium.

It is to be understood that the computing system 500 is not limited to the components and configuration of FIG. 5, but can include other or additional components in multiple configurations according to various examples. Additionally, the components of computing system 500 can be included within a single device, or can be distributed between multiple devices.

Thus, the examples of the disclosure provide various ways to determine motion characteristics of a device by using force sensors on the device.

Dynamics-Based Error Tracking for Force Sensing

In some examples, the above-described motion characteristic determinations using the force sensors of the disclosure can be used as part of tracking the performance of the force sensing capabilities of touch screens. Specifically, in some examples, one or more characteristics of the force sensing capabilities in the touch screens may change over time. Therefore, it can be beneficial to track the performance of the force sensing capabilities of the touch screens over time to determine if adjustments should be made to the force sensing capabilities to maintain accurate force sensing. In some examples, error metric tracking can be used to track the performance of the force sensing capabilities of the touch screens. The error metric can reflect a difference between the expected force sensing behavior of the touch screen and the actual force sensing behavior of the touch screen while under certain dynamics- and touch-conditions (e.g., certain acceleration and/or orientation conditions, perhaps determined using the motion characteristic determinations described above, no-touch conditions, etc.). If the error metric reflects relatively high force sensing error, adjustments to the force sensing can be made to maintain accurate operation. Various examples of the above are provided in this disclosure.

Referring again to FIGS. 2C, which illustrates deflection of flex layer 206 resulting from motion of touch screen 204 according to examples of the disclosure, a given movement of touch screen 204 can cause flex layer electrodes 212c, 212d, 212e and 212f to be deflected towards cover glass 202 along the z-axis, as illustrated. As described above, touch screen 204 can sense such deflections as changes in capacitance between the respective cover glass and flex layer electrodes. However, in the circumstance of FIG. 2C, these changes in capacitance sensed by the touch screen can be caused by motion of touch screen 204 rather than by deflection of cover glass 202 due to touch activity on the cover glass (e.g., as described with reference to FIG. 2B). As such, it may be beneficial to not ascribe such deflections to a force on cover glass 202. To accomplish this, touch screen 204 can utilize an inertial model that can estimate deflections of flex layer 206 due to motion or orientation of the touch screen, and can utilize these estimates in its force sensing, as will be described in more detail below.

Figure 6A:
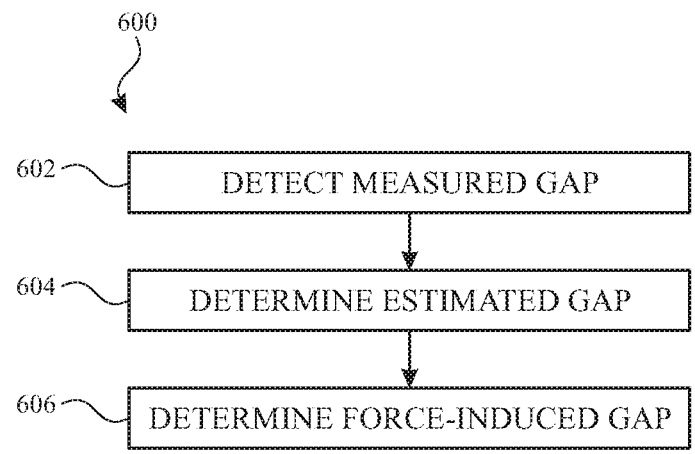
FIG. 6A illustrates an exemplary process for compensating for changes in flex layer position in force sensing according to examples of the disclosure.

As discussed above, the touch screen of the disclosure may be configured to compensate for or ignore changes in distance between the cover glass and the flex layer caused by movement of the flex layer (e.g., due to movement of the touch screen or changes in orientation of the touch screen), while retaining those portions of the changes in distance resulting from deflection of the cover glass (e.g., due to a touch on the cover glass). FIG. 6A illustrates an exemplary process 600 for compensating for changes in flex layer position in force sensing according to examples of the disclosure. At 602, the gap along the z-axis (as illustrated in FIGS. 2A-2C) between cover glass electrodes and flex layer electrodes (e.g., electrodes 210 and 212 in FIGS. 2A-2C) can be detected. Such detection can be accomplished by detecting the capacitance between the cover glass electrodes and the flex layer electrodes, as previously described.

At 604, an estimated gap along the z-axis (as illustrated in FIGS. 2A-2C) between the cover glass electrodes and the flex layer electrodes can be determined. This estimated gap can correspond to the expected gap between the cover glass electrodes and the flex layer electrodes resulting from an expected position of the flex layer based on an orientation and/or motion of the touch screen. In other words, the estimated gap can estimate the force sensor gaps caused, not by touches on the cover glass, but rather by acceleration experienced by the touch screen (e.g., gravity and/or other acceleration), as illustrated in FIG. 2C. Any suitable model can be utilized to estimate the positions of the flex layer electrodes (and thus, the corresponding gaps of the force sensors) as a function of motion and/or orientation of the touch screen. The details of an exemplary dynamic inertial model for estimating such gaps will be described with reference to FIG. 6B, below.

At 606, the estimated gap from 604 can be used to compensate the measured gap from 602 to determine a force-induced gap (e.g., gaps or changes in gaps due to force on the cover glass, rather than motion or orientation of the touch screen). In other words, the measured gap from 602 can include total changes in gaps resulting from force on the cover glass (if any) and changes in the position of the flex layer (if any). Estimated gap from 604 can estimate substantially only changes in gaps resulting from changes in the position of the flex layer (if any). At 606, the estimated changes in gaps resulting from changes in the position of the flex layer (from 604) can be removed from the total measured changes in gaps (from 602) to produce changes in gaps due substantially only to force on the cover glass. In some examples, the arithmetic difference (i.e., subtraction) between the measured gaps (from 602) and the estimated gaps (from 604) can correspond to the changes in gaps due to force on the cover glass.

Figure 6B:
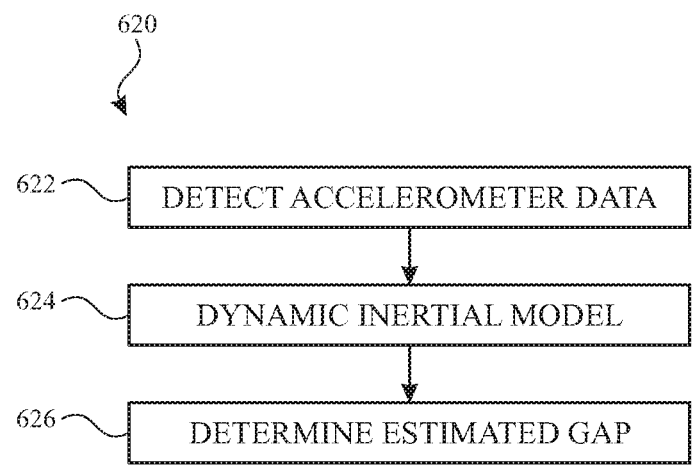
FIG. 6B illustrates an exemplary process for determining estimated gaps for the force sensors using a dynamic inertial model according to examples of the disclosure.

FIG. 6B illustrates an exemplary process 620 for determining estimated gaps for the force sensors using a dynamic inertial model according to examples of the disclosure. Process 620 in FIG. 6B can correspond to step 604 in FIG. 6A. In FIG. 6B, at 622, accelerometer data reflecting motion and/or orientation of the touch screen can be detected. In some examples, rather than using accelerometer data from an accelerometer, data from the force sensors can be utilized to determine motion characteristics for the electronic device, as described with reference to FIGS. 3A-3C and 4A-4B;

however, the examples below will be described with reference to an accelerometer for ease of description. In some examples, the accelerometer data can be gathered from an accelerometer included in a device in which the touch screen is integrated, which can detect quantities such as the motion and/or orientation of the device (and thus the touch screen). However, it is understood that the accelerometer data can be detected or received from any number of sources, including from sources external to the device that can determine the acceleration experienced by the device and/or its orientation.

At 624, the accelerometer data detected at 622 can be utilized by a dynamic inertial model to determine estimated force sensor gaps at 626. In particular, the dynamic inertial model can be a model that, given the acceleration under which the device (and thus the touch screen, and in particular, the flex layer) is operating, estimates the resulting positions of the flex layer electrodes in the touch screen. In some examples, the dynamic inertial model can be based on modeling each flex layer electrode (e.g., flex layer electrodes 212 in FIGS. 2A-2C) as a mass coupled to a fixed position via a spring and a damper, in parallel (i.e., a spring-mass-damper model), though other dynamic models could similarly be used. For example, a second-order model can be utilized to model the dynamics of each flex layer electrode, which, in the frequency domain (i.e., z-domain) can be expressed as:

$$\frac{Y(z)}{A(z)} = H(z) = \frac{\alpha_0 + \alpha_1 z^{-1} + \alpha_2 z^{-2}}{1 + \beta_1 z^{-1} + \beta_2 z^{-2}} \quad (8)$$

where $Y(z)$ can correspond to the estimated gap for a given force sensor, $A(z)$ can correspond to the acceleration (in some examples, the component of the acceleration along the z-axis illustrated in FIGS. 2A-2C) detected by the accelerometer at 622, and $\alpha_0$, $\alpha_1$, $\alpha_2$, $\beta_1$ and $\beta_2$ can correspond to coefficients that determine the modeled dynamics of the flex layer electrodes. In the discrete-time domain, the second-order model of equation (8) can be expressed as:

$$y_n = \alpha_0 a_n + \alpha_1 a_{n-1} + \alpha_2 a_{n-2} - \beta_1 y_{n-1} - \beta_2 y_{n-2} \quad (9)$$

where $y_n$ can correspond to the estimated gap for a given force sensor at time step n (e.g., at the n-th acceleration and/or gap sample period of the touch screen), $a_n$ can correspond to the acceleration (in some examples, the component of the acceleration along the z-axis illustrated in FIGS. 2A-2C) detected by the accelerometer at 622 at time step n (e.g., at the n-th acceleration and/or gap sample period of the touch screen), and, as above, $\alpha_0$, $\alpha_1$, $\alpha_2$, $\beta_1$ and $\beta_2$ can correspond to coefficients that determine the modeled dynamics of the flex layer electrodes.

Using equations (8) and/or (9) above, the touch screen of the disclosure can model the expected behavior of the flex layer electrodes under the acceleration experienced by the touch screen, and thus can determine the estimated gaps for each force sensor at 626.

In some examples, the dynamic inertial model used to determine the estimated gaps for the force sensors can be calibrated when the touch screen is manufactured. Thus, the dynamic inertial model (and the associated coefficients $\alpha_0$, $\alpha_1$, $\alpha_2$, $\beta_1$ and $\beta_2$) can relatively accurately model the behavior of the flex layer based on the properties of the flex layer at the time of calibration. However, the physical properties of the flex layer can change over time. For example, if the touch screen is dropped and impacts an object, the flex layer may be damaged, which may, in turn, change the behavior of the flex layer in a way that deviates from the expected behavior of the flex layer provided by the dynamic inertial model. Environmental factors, such as ambient temperature or ambient pressure changes, may also affect the behavior of the flex layer. As such, it may be beneficial for the device to recalibrate the dynamic inertial model over time to maintain accuracy in the gaps that it estimates. In some examples, such learning can be accomplished by determining updated coefficients $\alpha_0$, $\alpha_1$, $\alpha_2$, $\beta_1$ and $\beta_2$ for use in equations (8) and/or (9), above. In some examples, in addition or alternatively to updating the dynamic inertial model to account for changes in flex layer behavior, force thresholds used for various force inputs to the device can be adapted to avoid false force triggers or a lack of valid force triggers. It should be understood that if the dynamic inertial model for one or more force sensors is recalibrated (or "updated"), because the resulting estimated gaps determined for those force sensors can change, the outputs of those force sensors in response to a given amount of force can change. Thus, an object touching the touch screen with a given amount of force can be determined, by the touch screen, to have been touching the touch screen with a first amount of force before the recalibration, and can be determined, by the touch screen, to have been touching the touch screen with a second amount of force, different from the first amount of force, after the recalibration. In some examples, the determined first amount of force can be less accurate than the determined second amount of force (e.g., the determined first amount of force can deviate from the given amount of force more than does the determined second amount of force).

Figure 6C:
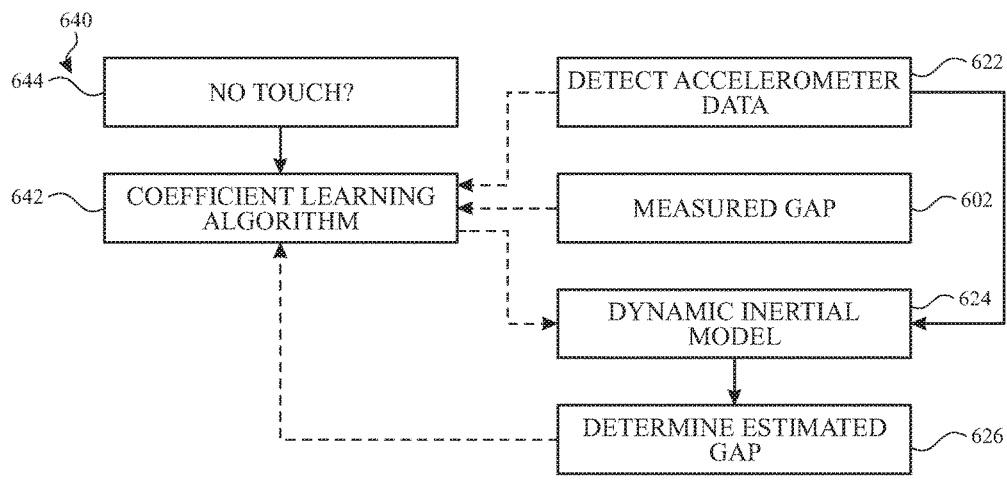
FIG. 6C illustrates an exemplary process for determining estimated gaps using a dynamic inertial model with coefficient learning according to examples of the disclosure.

FIG. 6C illustrates an exemplary process 640 for determining estimated gaps using a dynamic inertial model with coefficient learning according to examples of the disclosure. Process 640 can include steps 622, 624 and 626 as discussed above with respect to FIG. 6B. However, process 640 can additionally include a coefficient learning algorithm step 642, during which one or more of the coefficients used by the dynamic inertial model (e.g., at step 624) can be updated to account for changes in flex layer behavior that may have occurred since the coefficients were last determined. Specifically, at 644, the device can determine that no touch is occurring on the touch screen (and thus the cover glass). This no-touch condition can be determined independently from the force sensing discussed in this disclosure. Specifically, this no-touch condition can be determined using the self and/or mutual capacitance touch sensing schemes discussed with respect to FIGS. 1A-1C. If no touch is occurring on the cover glass at 644, the coefficient learning algorithm can be performed at 642; otherwise, the coefficient learning algorithm can be delayed until a no-touch condition is satisfied. By limiting performance of the coefficient learning algorithm to conditions during which no touch is present on the cover glass, the touch screen can ensure that gaps detected between the cover glass electrodes and the flex layer electrodes during the learning algorithm can be substantially free of effects from deflection(s) of the cover glass (i.e., the device can assume that the cover glass electrodes are located at their initial/neutral/non-deflected positions). The coefficient learning algorithm performed at 642 can utilize one or more of the accelerometer data detected at 622, the measured gaps detected at 602 and the estimated gaps determined at 626 to determine updated coefficients $\alpha_0$, $\alpha_1$, $\alpha_2$, $\beta_1$ and $\beta_2$ for use in the dynamic inertial model at 624. Any suitable learning algorithm can be utilized at 642 to achieve the above. For example, the coefficient learning algorithm at 642 can iteratively modify one or more of coefficients $\alpha_0$, $\alpha_1$, $\alpha_2$, $\beta_1$ and $\beta_2$ of the dynamic inertial model until the estimated gaps determined by the dynamic inertial model are within a predetermined threshold amount of the measured gaps. In some examples, all of the coefficients $\alpha_0$, $\alpha_1$, $\alpha_2$, $\beta_1$ and $\beta_2$ are updated by coefficient learning algorithm as described herein. In some examples, fewer than all of the coefficients $\alpha_0$, $\alpha_1$, $\alpha_2$, $\beta_1$ and $\beta_2$ are updated. In some examples, only the alpha coefficients ($\alpha_0$, $\alpha_1$ and $\alpha_2$) are updated by the coefficient learning algorithm. In some examples, only the beta coefficients ($\alpha_1$ and $\beta_2$) are updated by the coefficient learning algorithm. In some examples, the coefficient learning algorithm at 642 can be performed continually (as long as no touch is present on the touch screen); in some examples, the coefficient learning algorithm can be performed periodically (e.g., once per day, once per month, etc.).

Figure 6D:
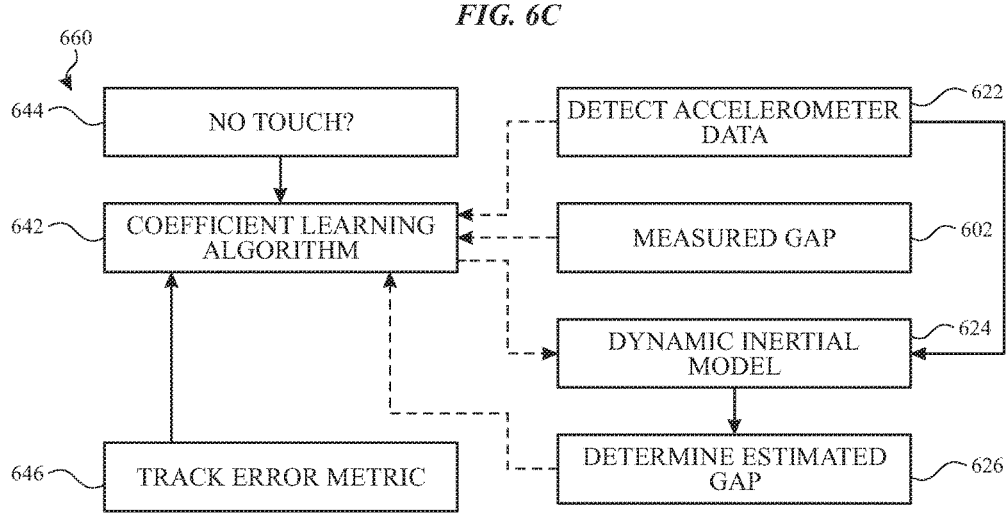
FIG. 6D illustrates an exemplary process for determining estimated gaps using a dynamic inertial model with coefficient learning and error metric tracking according to examples of the disclosure.

In some examples, a triggering metric can be utilized to trigger initiation of the coefficient learning algorithm at 642 substantially only in circumstances in which the dynamic inertial model appears to be inaccurately modeling the behavior of the flex layer. Such a triggering metric can save power, because it can avoid initiating the coefficient learning algorithm, which can be relatively power-intensive, when learning is not necessary. Coefficient learning can be relative-power intensive, because it may require an increased force sensor scanning rate (i.e., the frequency with which the force sensors are measured) as compared with normal touch screen operation, as will be discussed in more detail with respect to FIG. 7C. In some examples, the triggering metric can be an error metric that reflects the amount by which the estimated gaps between the cover glass electrodes and the flex layer electrodes deviate from the actual gaps (or measured gaps) between the electrodes. FIG. 6D illustrates an exemplary process 660 for determining estimated gaps using a dynamic inertial model with coefficient learning and error metric tracking according to examples of the disclosure. Process 660 can be the same as process 640 in FIG. 6C, except that process 660 can include an additional error metric tracking step 646. Coefficient learning at 642 can be triggered only when a no-touch condition is determined at 644, and the error metric determined at 646 reflects sufficient inaccuracy in the dynamic inertial model. In this way, the coefficient learning algorithm at 642 can be initiated only when needed. The error metric tracking performed at 646 will be described in more detail below. In some examples, tracking of the error metric at 646 can be performed continually; in some examples, tracking of the error metric at 646 can be performed periodically (e.g., once per hour, once per day, once per month, etc.). When tracking the error metric at 646, in some examples, the force sensor scanning rate can be increased as compared with times during which the error metric is not tracked to provide for a higher temporal-resolution error metric tracking result.

Figure 7A:
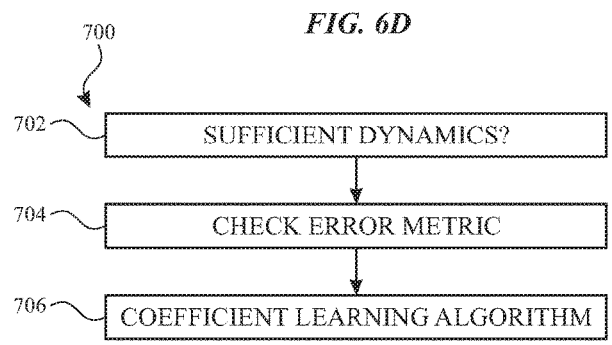
FIG. 7A illustrates an exemplary process for tracking an error metric according to examples of the disclosure.

FIGS. 7A-7D illustrate various features of error metric tracking according to examples of the disclosure. FIG. 7A illustrates an exemplary process 700 for tracking an error metric according to examples of the disclosure. Process 700 can correspond to steps 642 and 646 in FIG. 6D. In some examples, the error metric of the disclosure can be checked or determined only when the touch screen has a sufficient acceleration characteristic, such as acceleration greater than a certain threshold. Thus, at 702, whether sufficient acceleration (or sufficient "dynamics") is present can be determined. In some examples, a sufficient-dynamics condition can be identified when the change in acceleration experienced by the touch screen is greater than a threshold amount (i.e., the change in acceleration can be the acceleration characteristic of interest). In some examples, a sufficient-dynamics condition can, instead, be identified by tracking an acceleration envelope function (i.e., the acceleration envelope function can be the acceleration characteristic of interest), which can be expressed as:

$$a_{range}(n)=a_{max}(n)-a_{min}(n) \quad (10)$$

where:

$$a_{max}(n)=a_{max}(n)\alpha+(1-\alpha)a_{min}(n) \quad (11)$$

$$a_{min}(n)=a_{min}(n)\alpha+(1-\alpha)a_{max}(n) \quad (12)$$

subject to the conditions that if $a_{max}(n)<a(n)$, then $a_{max}(n)=a(n)$, and if $a_{min}(n)>a(n)$, then $a_{min}(n)=a(n)$. In the above equations, $\alpha$ can correspond to an envelope function weighting factor between 0 and 1 (e.g., 0.9), and $a(n)$ can correspond to the acceleration (in some examples, the component of the acceleration along the z-axis illustrated in FIGS. 2A-2C) detected by the accelerometer in the device at time step n (e.g., at the n-th acceleration and/or gap sample period of the touch screen). If the difference between $a_{max}(n)$ and $a_{min}(n)$ is sufficiently great—that is, if $a_{range}(n)>\delta_a$—then the device can determine, at 702 in process 700, that sufficient dynamics are present for error metric tracking. In some examples, $\delta_a$ can be 0.125 g, where g can correspond to acceleration due to gravity, though other threshold values can similarly be used for $\delta_a$.

If sufficient dynamics are detected at 702, the error metric can be determined at 704. The error metric can be any error metric that can reflect the amount by which the estimated gaps (e.g., as determined by the dynamic inertial model) differ from the actual or measured gaps (e.g., as determined by measuring the capacitances between cover glass electrodes and flex layer electrodes). In some examples, the error metric determined at 704 may only be determined in a no-touch condition on the touch screen. Further, in some examples, the error metric can be determined for one or more force sensors in the touch screen, individually (e.g., an error metric for each force sensor on the touch screen can be determined). In some examples, the error metric at time step n—e(n)—can be expressed as:

$$e(n)=\text{Estimated gap}-\text{Measured gap} \quad (13)$$

If the error metric in equation (13) reflects sufficient error between the estimated gaps and the measured gaps, the coefficient learning algorithm can be initiated at 706 (in some examples, only if no touch is detected on the touch screen, as described with reference to FIG. 6D). In some examples, sufficient error can be determined when the error metric, e(n), is greater than a threshold. However, in some examples, sufficient error can be determined by tracking an error metric envelope function—similar to the acceleration envelope function discussed above—which can be expressed as:

$$e_{range}(n)=e_{max}(n)-e_{min}(n) \quad (14)$$

where:

$$e_{max}(n)=e_{max}(n)\alpha+(1-\alpha)e_{min}(n) \quad (15)$$

$$e_{min}(n)=e_{min}(n)\alpha+(1-\alpha)e_{max}(n) \quad (16)$$

subject to the conditions that if $e_{max}(n)<e(n)$, then $e_{max}(n)=e(n)$, and if $e_{min}(n)>e(n)$, then $e_{min}(n)=e(n)$. In the above equations, $\alpha$ can correspond to an envelope function weighting factor between 0 and 1 (e.g., 0.9, sometimes different from a used in the acceleration envelope function), and e(n) can correspond to the error metric determined at time step n (e.g., at the n-th acceleration and/or gap sample period of the touch screen). If the difference between $e_{max}(n)$ and $e_{min}(n)$ is sufficiently great—that is, if $e_{range}(n) > \delta_e$—then the device can determine, at 704 in process 700, that the error metric is sufficiently great for coefficient learning to proceed.

In some examples, $\delta_e$ can be constant across the touch screen (i.e., the error metric threshold can be the same for every force sensor in the touch screen). However, in some examples, the flex layer can behave differently at different locations across the touch screen. For example, areas around the edges of the flex layer that are relatively fixedly anchored can have relatively little compliance, whereas areas in the center regions of the flex layer that are relatively freely moving can have relatively great compliance. As such, different error metric thresholds for different locations across the touch screen can be utilized. For example, error metric thresholds for force sensors at the edges of the touch screen can be smaller than error metric thresholds for force sensors at the center of the touch screen. In some examples, each force sensor can be associated with its own—not necessarily unique—error metric threshold. In some examples, the error metric thresholds across the touch screen can vary based on a linear model, whereby the error metric thresholds are low at the edges of the touch screen, and increase linearly to a higher value at the center of the touch screen. Another exemplary position-dependent error metric threshold at a position (x,y) on the touch screen—$\delta(x,y)$—can be expressed as:

$$\delta(x,y) = \delta_0 + \lambda_s \zeta(x,y) \quad (17)$$

where $\delta_0$ can be a constant (e.g., 5), and $\lambda_s$ can be a constant (e.g., 15). In some examples, the constants $\delta_0$ and $\lambda_s$ can be determined, for example, at factory calibration for each device. In some examples, constants $\delta_0$ and $\lambda_s$ can be the same for all devices having the same touch screen. $\zeta(x,y)$ can be a position-dependent quantity, and can be expressed as:

$$\zeta(x, y) = 1 - \frac{(2x - (n_x - 1))^2 + (2y - (n_y - 1))^2}{(n_x - 1)^2 + (n_y - 1)^2} \quad (18)$$

where $n_x$ can correspond to the number of force sensors in a row of force sensors on the touch screen, $n_y$ can correspond to the number of force sensors in a column of force sensors on the touch screen, x can correspond to a force sensor index in a row of force sensors (e.g., starting from 0), and y can correspond to a force sensor index in a column of force sensors (e.g., starting from 0). For a given force sensor at position (x,y) on the touch screen, if $e_{range}(n) > \delta(x,y)$, then the coefficient learning algorithm can be initiated at 706 for that given force sensor. Thus, in some examples, one force sensor on the touch screen may have its corresponding coefficients updated (e.g., because the error metric for that force sensor exceeds the error metric threshold for that force sensor), while the remaining force sensors may not (e.g., because the error metrics for those force sensors do not exceed the error metric threshold for those force sensors). In some examples, more than one force sensor on the touch screen (e.g., multiple or all force sensors on the touch screen) may have their corresponding coefficients updated.

Figure 7B:
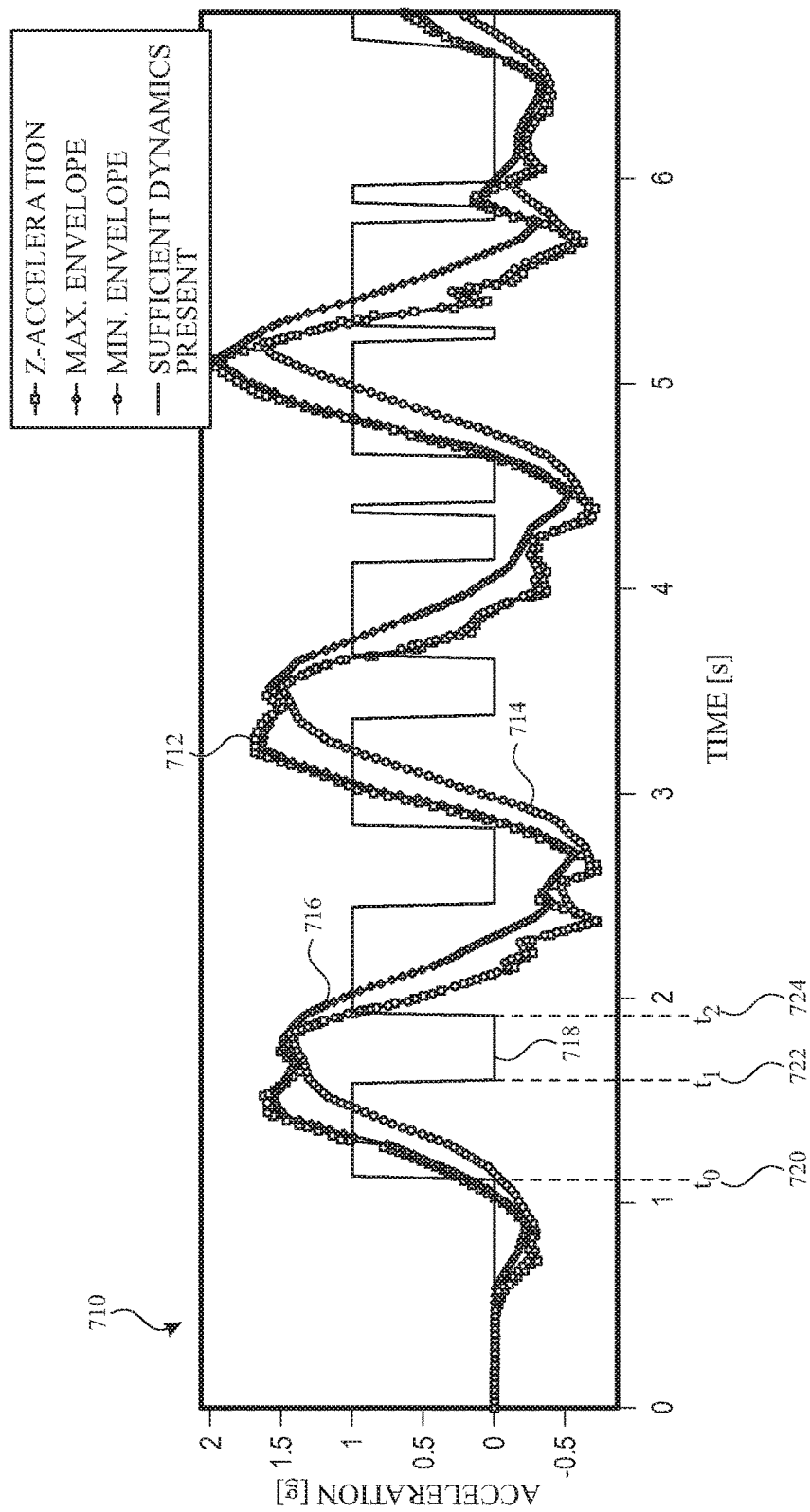
FIG. 7B illustrates an exemplary dynamics plot including representations of acceleration data, minimum acceleration envelope, maximum acceleration envelope, and sufficient-dynamics determination according to examples of the disclosure.

FIG. 7B illustrates an exemplary dynamics plot 710 including representations of acceleration data 712, minimum acceleration envelope 714, maximum acceleration envelope 716, and sufficient-dynamics determination 718 according to examples of the disclosure. Plot 710 can display acceleration along the vertical axis, and can display time along the horizontal axis. Acceleration data 712 can be a representation of the acceleration experienced by the touch screen as a function of time (in some examples, the component of the acceleration along the z-axis illustrated in FIGS. 2A-2C). For example, acceleration data 712 can be acceleration detected by the accelerometer at 702 in FIG. 7A.

According to equations (11) and (12), above, minimum acceleration envelope 714 and maximum acceleration envelope 716 can follow from acceleration data 712, as illustrated in FIG. 7B. Further, in some examples, sufficient dynamics for error metric tracking (e.g., as discussed with reference to step 702 in FIG. 7A) can be found when the difference between minimum acceleration envelope 714 and maximum acceleration envelope 716 is sufficiently great—in other words, greater than a threshold—as previously discussed with respect to equations (10)-(12). In plot 710, a high value for sufficient dynamics determination 718 (a value of "1" on the vertical axis) can indicate that that sufficient dynamics for error metric tracking were found, and a low value for sufficient dynamics determination (a value of "0" on the vertical axis) can indicate that sufficient dynamics for error metric tracking were not found. For example, from time $t_0$ 720 to $t_1$ 722, the device could have found sufficient dynamics for error metric tracking, and from $t_1$ to $t_2$ 724, the device could have found insufficient dynamics for error metric tracking.

Figure 7C:
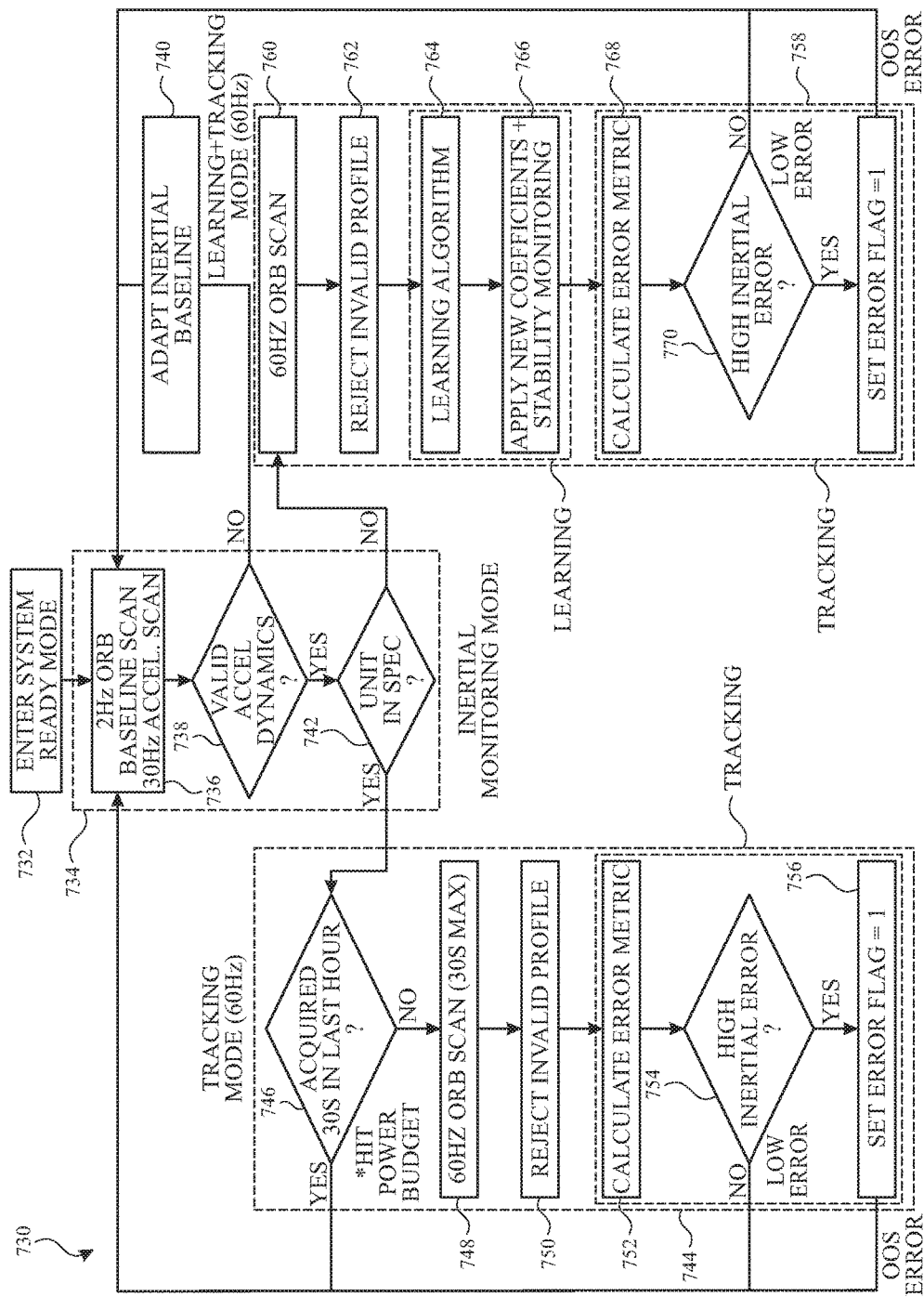
FIG. 7C illustrates an exemplary error metric tracking and coefficient learning process for a touch screen device according to examples of the disclosure.

FIG. 7C illustrates an exemplary error metric tracking and coefficient learning process 730 for a touch screen device according to examples of the disclosure. At 732, the device can enter a ready mode after being turned on or after the device's touch screen has been turned on, for example. From the ready mode at 732, periodically, the device can transition to inertial monitoring mode 734. For example, every 30 minutes or 1 hour, the device can transition from ready mode at 732 to inertial monitoring mode at 734. During inertial monitoring mode 734, at 736, the device can scan force sensors in the touch screen and an accelerometer that can be integrated in the device, for example. In some examples, the device can scan the force sensors with a different frequency than the accelerometer (e.g., with a frequency of 2 Hz for the force sensors, and with a frequency of 30 Hz for the accelerometer). In some examples, the device can scan the force sensors and the accelerometer with the same frequency. At 738, the device can determine whether the device (and thus the flex layer) is experiencing sufficient dynamics for error metric tracking (e.g., as discussed with respect to step 702 in FIG. 7A). In some examples, sufficient dynamics can be found when the device is experiencing substantially translational motion and not when the device is experiencing substantially axial motion (e.g., so that the flex layer electrodes are experiencing substantially the same acceleration). The existence of this translational motion can be determined as discussed with reference to FIG. 3C, for example, or by using an accelerometer, or both. If the device is experiencing sufficient dynamics at 738, the device can check whether the device's force sensors are operating within specifications at 742. This check at 742 can include checking a flag or other indication in a memory or storage of the device that can indicate that the performance of the force sensors is in- or out-of-specification (e.g., a "1" for out-of-specification, and a "0" for in-specification). This flag or indication can be set by the device in one or both of two different operation modes, as will be described below: tracking mode 744 and learning-and-tracking mode 758. If, at 742, the flag indicates that the performance of the force sensors is out-of-specification, the device can transition to learning-and-tracking mode 758, and if the flag indicates that the performance of the force sensors is in-specification, the device can transition to tracking mode 744.

In tracking mode 744, the device can track the error metric, and can set the above-discussed flag or indication to an out-of-specification state if the error metric indicates as much. Specifically, at 746, the device can determine whether it has tracked the error metric for longer than a predetermined time period (e.g., 30 seconds) within a last predetermined time period (e.g., the last hour). In other words, the device can track the error metric for a maximum amount of time per interval of time to conserve power, because in some examples, tracking the error metric can be a relatively power-intensive process. If the device has already reached its maximum error metric tracking time at 746, the device can return to inertial monitoring mode 734 without tracking the error metric in tracking mode 744. If the device has not reached its maximum error metric tracking time at 746, the device can, at 748, increase the scan rate of the force sensors as compared with the scan rate of the force sensors in inertial monitoring mode 734. For example, the device can begin scanning the force sensors at 60 Hz at 748. At 750, the device can reject invalid force profiles detected from the force sensors, so that such force profiles are not used for error metric tracking. In some examples, force profiles can be determined to be invalid when the force profiles satisfy one or more invalidity criteria (e.g., a difference between the maximum force sensor gap change and the minimum force sensor gap change is greater than a threshold, neighboring force sensor gap changes differ from each other by more than a threshold, etc.).

At 752, the device can determine the error metric for one or more force sensors, as discussed previously with respect to step 704 in FIG. 7A. At 754, if the error metric indicates there is little or no error in the operation of the force sensors (e.g., the error metric is below a threshold), the device can return to inertial monitoring mode 734 without changing the above-discussed flag or indication. If, at 754, the error metric indicates there is high error in the operation of the force sensors (e.g., the error metric is greater than a threshold), the device can set the above-discussed flag or indication to an out-of-specification state (e.g., "1"), and the device can return to inertial monitoring mode 734. Subsequently, when making another determination at step 742, the out-of-specification flag can cause the device to transition to learning-and-tracking mode 758 rather than tracking mode 744. In some examples, each force sensor on the touch screen can have a corresponding flag or indication that indicates whether that force sensor is in- or out-of-specification, and the device can analyze and/or modify such flags, accordingly.

In learning-and-tracking mode 758, the device can track the error metric, can learn new coefficients for the dynamic inertial model (e.g., as described with reference to step 642 in FIGS. 6C-6D), and can set the above-discussed flag or indication to an out-of-specification state or an in-specification state in accordance with the determined error metric. Specifically, at 760, the device can increase the scan rate of the force sensors as compared with the scan rate of the force sensors in inertial monitoring mode 734. For example, the device can begin scanning the force sensors at 60 Hz at 760. At 762, the device can reject invalid force profiles detected from the force sensors, so that such force profiles are not used for error metric tracking. In some examples, force profiles can be determined to be invalid when the force profiles satisfy one or more invalidity criteria (e.g., a difference between the maximum force sensor gap change and the minimum force sensor gap change is greater than a threshold, neighboring force sensor gap changes differ from each other by more than a threshold, etc.).

At 764 and 766, because the device can be out-of-specification as determined at 742, the device can learn and apply, respectively, new coefficients to the dynamic inertial model for those force sensors that are out-of-specification, as described with reference to step 642 in FIGS. 6C-6D. In some examples, applying the new coefficients to the dynamic inertial model at 766 can include monitoring the dynamic inertial model with the new coefficients applied to determine whether the new coefficients produce acceptable results for the updated force sensors. If the new coefficients do not produce acceptable results, the new coefficients can continue to be iteratively updated at 764 and 766 until acceptable results are achieved.

After new coefficients are learned and applied to the dynamic inertial model for given force sensors, the device can determine the error metric at 768 for the given force sensors with the new coefficients having been applied, as discussed previously with respect to step 704 in FIG. 7A. At 770, if the error metric indicates there is little or no error in the operation of the given force sensors (e.g., the error metric is below a threshold), the device can set the above-discussed flag or indication for the given force sensors to an in-specification state (e.g., "0") and return to inertial monitoring mode 734. Thus, subsequently, when making another determination at step 742, the in-specification flag can cause the device to transition to tracking mode 744 rather than learning-and-tracking mode 758. If, at 770, the error metric indicates there continues to be high error in the operation of the given force sensors (e.g., the error metric continues to be greater than a threshold), the device can set the above-discussed flag or indication for the given force sensors to an out-of-specification state (e.g., "1"), and the device can return to inertial monitoring mode 734. Subsequently, when making another determination at step 742, the out-of-specification flag can cause the device to transition to learning-and-tracking mode 758 rather than tracking mode 744.

As discussed above, in some examples, error metric calculation and inertial model learning can be performed independently for each force sensor of the touch screen. However, in some examples, an individual force sensor may improperly trigger an out-of-specification flag and/or coefficient learning process for that force sensor, even though that force sensor may, indeed, be in-specification. For example, noise in a particular force sensor's output may erroneously trigger an out-of-specification flag and/or coefficient learning process for that force sensor. Unnecessary coefficient learning processes can consume power unnecessarily, which can be especially detrimental in battery-operated devices. In order to avoid erroneous triggering of coefficient learning processes, in some examples, error metric tracking can be performed on groups of force sensors on the touch screen rather than on individual force sensors.

Figure 7D:
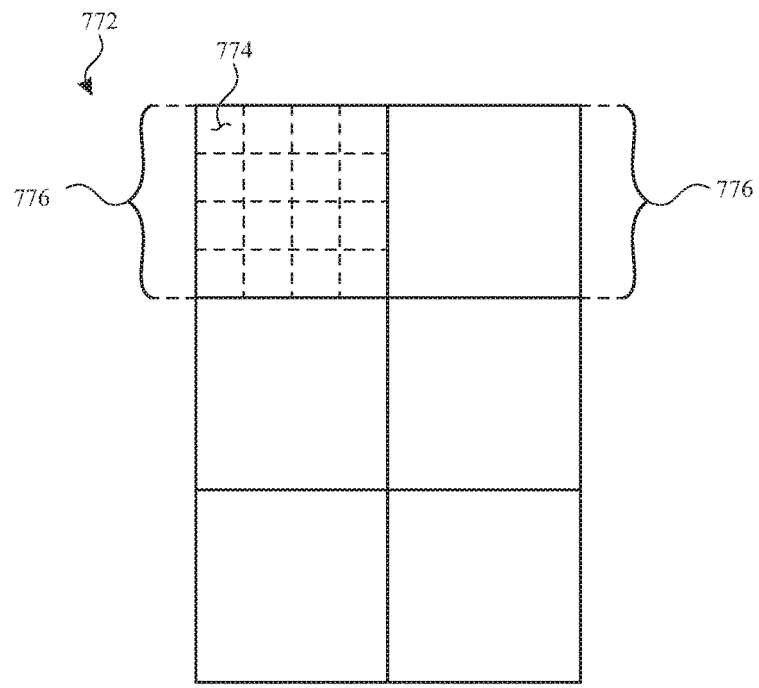
FIG. 7D illustrates an exemplary force sensor grouping configuration according to examples of the disclosure.

FIG. 7D illustrates an exemplary force sensor grouping configuration according to examples of the disclosure. Touch screen 772 can include force sensors 774, as previously described. In some examples, force sensors 774 can be organized into 4×4 force sensor groupings 776. In the example of FIG. 7D, touch screen 772 can include 12×8 force sensors 774 (only illustrated in the top-left force sensor grouping 776), and thus can include 3×2 force sensor groupings. It is understood that other grouping configurations in which at least two force sensors are grouped together are similarly within the scope of the disclosure.

When tracking the error metric in touch screen 772 of FIG. 7D, rather than determining an individual error metric for each force sensor 774 on the touch screen, a group error metric can be determined for each grouping 776 of force sensors. The error metric for a grouping 776 of force sensors 774 can be determined in a manner similar to as described with reference to FIG. 7A and equation (13), except that the estimated gap and the measured gap in equation (13) can be replaced with an average estimated gap for all of the force sensors in the grouping, and an average measured gap for all of the force sensors in the grouping, respectively. In particular, the estimated gap for each force sensor 774 in the grouping 776 can be determined individually and then averaged, and the average estimated gap can be used in equation (13). Similarly, the measured gap for each force sensor 774 in the grouping 776 can be determined individually and then averaged, and the average measured gap can be used in equation (13). Once the error metric for the grouping 776 has been determined using the average estimated gap and the average measured gap in equation (13), that error metric can be compared to an error metric threshold for the grouping. In some examples, different groupings 776 can have different error metric thresholds, similar to as described above with respect to individual force sensors. In some examples, different groupings 776 can have the same error metric thresholds. If the error metric for the grouping 776 exceeds the grouping's error metric threshold, coefficient learning can be triggered for all of the force sensors 774 in the grouping, and if the error metric for the grouping does not exceed the grouping's error metric threshold, coefficient learning may not be triggered for the force sensors in the grouping. The above determination can be performed for each grouping 776 of force sensors 774 on the touch screen. Because the error metric can be tracked for groups of force sensors 774 rather than individual force sensors, erroneous or outlier error metric determinations for any single force sensor on the touch screen may not unnecessarily trigger coefficient learning.

Figure 7E:
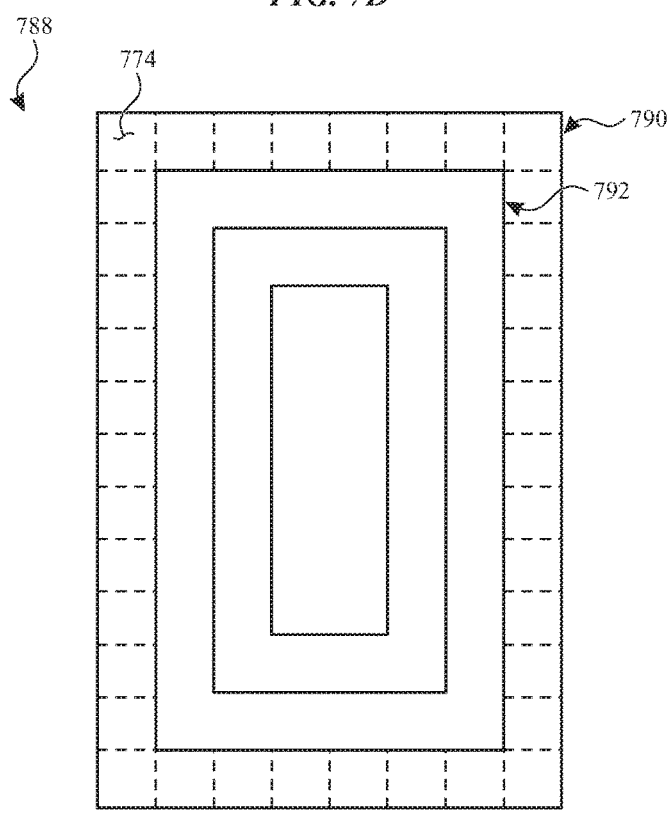
FIG. 7E illustrates another exemplary force sensor grouping configuration according to examples of the disclosure.

FIG. 7E illustrates another exemplary force sensor grouping configuration according to examples of the disclosure. In FIG. 7E, rather than being grouped into 4×4 force sensor groupings as in FIG. 7D, force sensors 774 can be grouped into concentric regions/rings on touch screen 788, as illustrated. In particular, force sensors 774 in an outermost region of touch screen 788 can be grouped into grouping 790, force sensors in the next inner region of the touch screen can be grouped into grouping 792, and so on. The force sensor 774 grouping configuration of FIG. 7E can be advantageous in that the groupings can be composed of similarly-situated force sensors (e.g., force sensors at the edge of touch screen 788 can be grouped together, force sensors at the center of the touch screen can be grouped together, etc.). Because similarly-situated force sensors 774 on the touch screen can behave similarly, collectively tracking the error metric of such similarly-situated force sensors can provide improved error metric tracking performance.

In some examples, the force sensing and error metric tracking discussed above can be implemented by computing system 500 in FIG. 5. Specifically, in some examples, force controller 514 can implement the force sensing, error metric tracking and/or coefficient learning processes of the disclosure.

Gain-Based Error Tracking for Force Sensing

As described above, it can be beneficial to track the performance of the force sensing capabilities of the touch screens over time to determine if adjustments should be made to the force sensing capabilities to maintain accurate force sensing. In some examples, error metric tracking can be used to track the performance of the force sensing capabilities of the touch screens. In some examples, gain-based error metric tracking can be used rather than dynamics-based error metric tracking. The error metric can reflect a difference between the expected force sensing behavior of the touch screen and the actual force sensing behavior of the touch screen while under certain steady-state conditions (e.g., little or no acceleration, no-touch, etc.). If the error metric reflects relatively high force sensing error, adjustments to the force sensing can be made to maintain accurate operation. Various examples of the above are provided in this disclosure.

Referring again to FIGS. 2C, which illustrates deflection of flex layer 206 resulting from motion of touch screen 204 according to examples of the disclosure, a given movement of touch screen 204 can cause flex layer electrodes 212c, 212d, 212e and 212f to be deflected towards cover glass 202 along the z-axis, as illustrated. As described above, touch screen 204 can sense such deflections as changes in capacitance between the respective cover glass and flex layer electrodes. However, in the circumstance of FIG. 2C, these changes in capacitance sensed by the touch screen can be caused by motion of touch screen 204 rather than by deflection of cover glass 202 due to touch activity on the cover glass (e.g., as described with reference to FIG. 2B). As such, it may be beneficial to not ascribe such deflections to a force on cover glass 202. To accomplish this, touch screen 204 can utilize an inertial model that can estimate deflections of flex layer 206 due to motion or orientation of the touch screen, and can utilize these estimates in its force sensing, as will be described in more detail below.

As discussed above, the touch screen of the disclosure may be configured to compensate for or ignore changes in distance between the cover glass and the flex layer caused by movement of the flex layer (e.g., due to movement of the touch screen or changes in orientation of the touch screen), while retaining those portions of the changes in distance resulting from deflection of the cover glass (e.g., due to a touch on the cover glass). As described herein, FIG. 6A illustrates an exemplary process 600 for compensating for changes in flex layer position in force sensing according to examples of the disclosure. At 602, the gap along the z-axis (as illustrated in FIGS. 2A-2C) between cover glass electrodes and flex layer electrodes (e.g., electrodes 210 and 212 in FIGS. 2A-2C) can be detected. Such detection can be accomplished by detecting the capacitance between the cover glass electrodes and the flex layer electrodes, as previously described.

At 604, an estimated gap along the z-axis (as illustrated in FIGS. 2A-2C) between the cover glass electrodes and the flex layer electrodes can be determined. This estimated gap can correspond to the expected gap between the cover glass electrodes and the flex layer electrodes resulting from an expected position of the flex layer based on an orientation and/or motion of the touch screen. In other words, the estimated gap can estimate the force sensor gaps caused, not by touches on the cover glass, but rather by acceleration experienced by the touch screen (e.g., gravity and/or other acceleration), as illustrated in FIG. 2C. Any suitable model can be utilized to estimate the positions of the flex layer electrodes (and thus, the corresponding gaps of the force sensors) as a function of motion and/or orientation of the touch screen. The details of an exemplary dynamic inertial model for estimating such gaps will be described with reference to FIG. 6B, below.

At 606, the estimated gap from 604 can be used to compensate the measured gap from 602 to determine a force-induced gap (e.g., gaps or changes in gaps due to force on the cover glass, rather than motion or orientation of the touch screen). In other words, the measured gap from 602 can include total changes in gaps resulting from force on the cover glass (if any) and changes in the position of the flex layer (if any). Estimated gap from 604 can estimate substantially only changes in gaps resulting from changes in the position of the flex layer (if any). At 606, the estimated changes in gaps resulting from changes in the position of the flex layer (from 604) can be removed from the total measured changes in gaps (from 602) to produce changes in gaps due substantially only to force on the cover glass. In some examples, the arithmetic difference (i.e., subtraction) between the measured gaps (from 602) and the estimated gaps (from 604) can correspond to the changes in gaps due to force on the cover glass.

As described herein, FIG. 6B illustrates an exemplary process 620 for determining estimated gaps for the force sensors using a dynamic inertial model according to examples of the disclosure. Process 620 in FIG. 6B can correspond to step 604 in FIG. 6A. In FIG. 6B, at 622, accelerometer data reflecting motion and/or orientation of the touch screen can be detected. In some examples, the accelerometer data can be gathered from an accelerometer included in a device in which the touch screen is integrated, which can detect quantities such as the motion and/or orientation of the device (and thus the touch screen). However, it is understood that the accelerometer data can be detected or received from any number of sources, including from sources external to the device that can determine the acceleration experienced by the device and/or its orientation.

At 624, the accelerometer data detected at 622 can be utilized by a dynamic inertial model to determine estimated force sensor gaps at 626. In particular, the dynamic inertial model can be a model that, given the acceleration under which the device (and thus the touch screen, and in particular, the flex layer) is operating, estimates the resulting positions of the flex layer electrodes in the touch screen. In some examples, the dynamic inertial model can be based on modeling each flex layer electrode (e.g., flex layer electrodes 212 in FIGS. 2A-2C) as a mass coupled to a fixed position via a spring and a damper, in parallel (i.e., a spring-mass-damper model), though other dynamic models could similarly be used. For example, a second-order model can be utilized to model the dynamics of each flex layer electrode, which, in the frequency domain (i.e., z-domain) can be expressed as:

$$\frac{Y(z)}{A(z)} = H(z) = \frac{\alpha_0 + \alpha_1 z^{-1} + \alpha_2 z^{-2}}{1 + \beta_1 z^{-1} + \beta_2 z^{-2}} \quad (19)$$

where Y(z) can correspond to the estimated gap for a given force sensor, A(z) can correspond to the acceleration (in some examples, the component of the acceleration along the z-axis illustrated in FIGS. 2A-2C) detected by the accelerometer at 622, and $\alpha_0$, $\alpha_1$, $\alpha_2$, $\beta_1$ and $\beta_2$ can correspond to coefficients that determine the modeled dynamics of the flex layer electrodes. In the discrete-time domain, the second-order model of equation (19) can be expressed as:

$$y_n = \alpha_0 a_n + \alpha_1 a_{n-1} + \alpha_2 a_{n-2} - \beta_1 y_{n-1} - \beta_2 y_{n-2} \quad (20)$$

where $y_n$ can correspond to the estimated gap for a given force sensor at time step n (e.g., at the n-th acceleration and/or gap sample period of the touch screen), $a_n$ can correspond to the acceleration (in some examples, the component of the acceleration along the z-axis illustrated in FIGS. 2A-2C) detected by the accelerometer at 622 at time step n (e.g., at the n-th acceleration and/or gap sample period of the touch screen), and, as above, $\alpha_0$, $\alpha_1$, $\alpha_2$, $\beta_1$ and $\beta_2$ can correspond to coefficients that determine the modeled dynamics of the flex layer electrodes.

Using equations (19) and/or (20) above, the touch screen of the disclosure can model the expected behavior of the flex layer electrodes under the acceleration experienced by the touch screen, and thus can determine the estimated gaps for each force sensor at 626.

In some examples, the dynamic inertial model used to determine the estimated gaps for the force sensors can be calibrated when the touch screen is manufactured. Thus, the dynamic inertial model (and the associated coefficients $\alpha_0$, $\alpha_1$, $\alpha_2$, $\beta_1$ and $\beta_2$) can relatively accurately model the behavior of the flex layer based on the properties of the flex layer at the time of calibration. However, the physical properties of the flex layer can change over time. For example, if the touch screen is dropped and impacts an object, the flex layer may be damaged, which may, in turn, change the behavior of the flex layer in a way that deviates from the expected behavior of the flex layer provided by the stored coefficients of the dynamic inertial model. Environmental factors, such as ambient temperature or ambient pressure changes, may also affect the behavior of the flex layer. As such, it may be beneficial for the device to recalibrate the dynamic inertial model over time to maintain accuracy in force sensing. In some examples, such learning can be accomplished by determining updated coefficients $\alpha_0$, $\alpha_1$, $\alpha_2$, $\beta_1$ and $\beta_2$ for use in equations (19) and/or (20), above. In some examples, in addition or alternatively to updating the dynamic inertial model to account for changes in flex layer behavior, force thresholds used for various force inputs to the device can be adapted to avoid false force triggers or a lack of valid force triggers. It should be understood that if the dynamic inertial model for one or more force sensors is recalibrated (or "updated"), because the resulting estimated gaps determined for those force sensors can change, the outputs of those force sensors in response to a given amount of force can change. Thus, an object touching the touch screen with a given amount of force can be determined, by the touch screen, to have been touching the touch screen with a first amount of force before the recalibration, and can be determined, by the touch screen, to have been touching the touch screen with a second amount of force, different from the first amount of force, after the recalibration. In some examples, the determined first amount of force can be less accurate than the determined second amount of force (e.g., the determined first amount of force can deviate from the given amount of force more than does the determined second amount of force).

As described herein, FIG. 6C illustrates an exemplary process 640 for determining estimated gaps using a dynamic inertial model with coefficient learning according to examples of the disclosure. Process 640 can include steps 622, 624 and 626 as discussed above with respect to FIG. 6B. However, process 640 can additionally include a coefficient learning algorithm step 642, during which one or more of the coefficients used by the dynamic inertial model (e.g., at step 624) can be updated to account for changes in flex layer behavior that may have occurred since the coefficients were last determined. Specifically, at 644, the device can determine that no touch is occurring on the touch screen (and thus the cover glass). This no-touch condition can be determined independently from the force sensing discussed in this disclosure. Specifically, this no-touch condition can be determined using the self and/or mutual capacitance touch sensing schemes discussed with respect to FIGS. 1A-1C. If no touch is occurring on the cover glass at 644, the coefficient learning algorithm can be performed at 642; otherwise, the coefficient learning algorithm can be delayed until a no-touch condition is satisfied. By limiting performance of the coefficient learning algorithm to conditions during which no touch is present on the cover glass, the touch screen can ensure that gaps detected between the cover glass electrodes and the flex layer electrodes during the coefficient learning algorithm can be substantially free of effects from deflection(s) of the cover glass (i.e., the device can assume that the cover glass electrodes are located at their initial/neutral/non-deflected positions). The coefficient learning algorithm performed at 642 can utilize one or more of the accelerometer data detected at 622, the measured gaps detected at 602 and the estimated gaps determined at 626 to determine updated coefficients $\alpha_0$, $\alpha_1$, $\alpha_2$, $\beta_1$ and $\beta_2$ for use in the dynamic inertial model at 624. Any suitable learning algorithm can be utilized at 642 to achieve the above. For example, the coefficient learning algorithm at 642 can iteratively modify one or more of coefficients $\alpha_0$, $\alpha_1$, $\alpha_2$, $\beta_1$ and $\beta_2$ of the dynamic inertial model until the estimated gaps determined by the dynamic inertial model are within a predetermined threshold amount of the measured gaps. In some examples, the coefficient learning algorithm at 642 can iteratively modify one or more of coefficients $\alpha_0$, $\alpha_1$, $\alpha_2$, $\beta_1$ and $\beta_2$ of the dynamic inertial model until the estimated gain determined in accordance with the coefficients of the dynamic inertial model are within a predetermined threshold amount of the measured gain. In some examples, all of the coefficients $\alpha_0$, $\alpha_1$, $\alpha_2$, $\beta_1$ and $\beta_2$ are updated by coefficient learning algorithm as described herein. In some examples, fewer than all of the coefficients $\alpha_0$, $\alpha_1$, $\alpha_2$, $\beta_1$ and $\beta_2$ are updated. In some examples, only the alpha coefficients ($\alpha_0$, $\alpha_1$ and $\alpha_2$) are updated by the coefficient learning algorithm. In some examples, only the beta coefficients ($\beta_1$ and $\beta_2$) are updated by the coefficient learning algorithm. In some examples, the coefficient learning algorithm at 642 can be performed continually (as long as no touch is present on the touch screen); in some examples, the coefficient learning algorithm can be performed periodically (e.g., once per day, once per month, etc.).

In some examples, a triggering metric can be utilized to trigger initiation of the coefficient learning algorithm at 642 substantially only in circumstances in which the dynamic inertial model appears to be inaccurately modeling the behavior of the flex layer. Such a triggering metric can save power, because it can avoid initiating the coefficient learning algorithm, which can be relatively power-intensive, when learning is not necessary. Coefficient learning can be relative-power intensive, because it may require an increased force sensor scanning rate (i.e., the frequency with which the force sensors are measured) as compared with normal touch screen operation. In some examples, the triggering metric can be an error metric ("EM") that reflects the amount by which the estimated gaps between the cover glass electrodes and the flex layer electrodes deviate from the actual gaps (or measured gaps) between the electrodes. In some examples, the triggering metric can be an error metric that reflects the amount by which the estimated gain for the force sensors deviate from the measured gains for the force sensors. As described herein, FIG. 6D illustrates an exemplary process 660 for determining estimated gaps using a dynamic inertial model with coefficient learning and error metric tracking according to examples of the disclosure. Process 660 can be the same as process 640 in FIG. 6C, except that process 660 can include an additional error metric tracking step 646. Coefficient learning at 642 can be triggered only when a no-touch condition is determined at 644, and the error metric determined at 646 reflects sufficient inaccuracy in the dynamic inertial model. In this way, the coefficient learning algorithm at 642 can be initiated only when needed. The error metric tracking performed at 646 will be described in more detail below. In some examples, tracking of the error metric at 646 can be performed continually; in some examples, tracking of the error metric at 646 can be performed periodically (e.g., once per hour, once per day, once per month, etc.). When tracking the error metric at 646, in some examples, the force sensor scanning rate can be increased as compared with times during which the error metric is not tracked to provide for a higher temporal-resolution error metric tracking result.

Figure 8A:
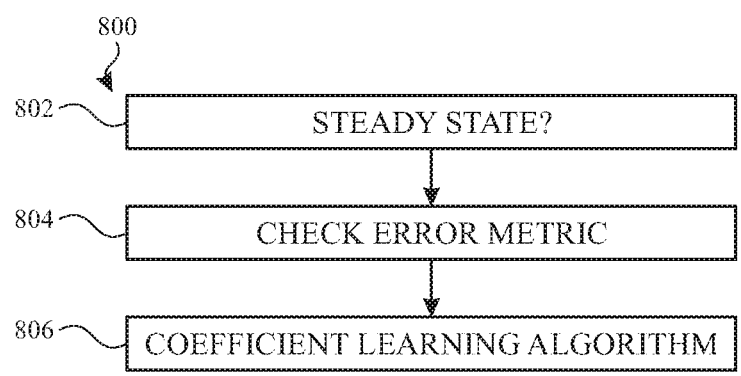
FIG. 8A illustrates an exemplary process for tracking an error metric according to examples of the disclosure.

FIGS. 8A-8J illustrate various features of error metric tracking and/or of a coefficient learning algorithm according to examples of the disclosure. FIG. 8A illustrates an exemplary process 800 for tracking an error metric according to examples of the disclosure. Process 800 can correspond to steps 642 and 646 in FIG. 6D. In some examples, the error metric of the disclosure can be checked or determined only when the device including the force sensors is experiencing a steady-state condition (e.g., acceleration below a certain threshold). Thus, at 802, whether the device is in a steady-state condition can be determined. In some examples, a steady-state condition can be identified when the change in acceleration experienced by the device is below than a threshold amount. In some examples, a steady-state condition can, instead, be identified by tracking an acceleration envelope function, which can be expressed as:

$$a_{range}(n)=a_{max}(n)-a_{min}(n) \tag{21}$$

where:

$$a_{max}(n)=a_{max}(n)\alpha+(1-\alpha)a_{min}(n) \tag{22}$$

$$a_{min}(n)=a_{min}(n)\alpha+(1-\alpha)a_{max}(n) \tag{23}$$

subject to the conditions that if $a_{max}(n)<a(n)$, then $a_{max}(n)=a(n)$, and if $a_{min}(n)>a(n)$, then $a_{min}(n)=a(n)$. In the above equations, $\alpha$ can correspond to an envelope function weighting factor or decay constant between 0 and 1 (e.g., 0.9), and $a(n)$ can correspond to the acceleration (in some examples, the component of the acceleration along the z-axis illustrated in FIGS. 2A-2C) detected by the accelerometer in the device at time step n (e.g., at the n-th acceleration and/or gap sample period of the touch screen). If the difference between $a_{max}(n)$ and $a_{min}(n)$ is sufficiently small—that is, if $a_{range}(n)<\delta_a$—then the device can determine, at 802 in process 800, that the device is experiencing a steady-state condition for error metric tracking. In some examples, $\delta_a$ can be 0.125 g, where g can correspond to acceleration due to gravity, though other threshold values can similarly be used for $\delta_a$. If the difference between $a_{max}(n)$ and $a_{min}(n)$ is not sufficiently small—that is, if $a_{range}(n)>\delta_a$—then the system can determine, at 802 in process 800, that the device is not experiencing in a steady-state condition for error metric tracking.

In some examples, the acceleration signal can be filtered before envelope detection to avoid falsely detecting a steady-state condition due to noise from coexistent perturbations of the device by other components of the device (e.g., speakers, haptic mechanisms, etc.). Additionally or alternatively, additional conditions can be imposed on the acceleration envelope tracking function. In some examples, $a_{max}(n)$ and $a_{min}(n)$ can be bounded by a maximum acceleration value and a minimum acceleration value to prevent undue influence on envelope detection from extreme acceleration measurements. For example, if $a_{max}(n) > \zeta_a$, then $a_{max}(n) = \zeta_a$, where $\zeta_a$ represents the maximum acceleration threshold, and if $a_{min}(n) < -\zeta_a$, then $a_{min}(n) = -\zeta_a$, where $-\zeta_a$ represents the minimum acceleration threshold. In some examples, if $a_{range}(n) < 0$, then $a_{range} = 0$ (i.e., non-negative envelope).

If a steady-state condition is detected at 802, the error metric can be determined at 804. The error metric can be any error metric that can reflect the amount by which the estimated gaps (e.g., as determined by the dynamic inertial model) differ from the actual or measured gaps (e.g., as determined by measuring the capacitances between cover glass electrodes and flex layer electrodes). In some examples, the error metric determined at 804 may only be determined during a no-touch condition on the touch screen. Further, in some examples, the error metric can be determined for one or more force sensors in the touch screen, individually (e.g., an error metric for each force sensor on the touch screen can be determined). In some examples, the error metric at time step n—$e(n)$—can be expressed as:

$$e(n) = |\text{Estimated gain} - \text{Measured gain}| \tag{24}$$

If the error metric in equation (24) reflects sufficient error between the estimated gain and the measured gain (indicative of the force sensor being out of specification), the coefficient learning algorithm can be initiated at 806 (in some examples, only if no touch is detected on the touch screen, as described with reference to FIG. 6D). In some examples, sufficient error can be determined when the error metric, $e(n)$, is greater than a threshold (i.e., an error metric threshold).

The estimated gain and measured gain of equation (24) can refer to the transfer function for the force sensor system. For example, the steady-state measured gain can be expressed as:

$$\gamma_{m,i} = \frac{|s_i|_{a=a_0} - s_i|_{a=a_1}|}{|a_0 - a_1|} \tag{25}$$

where $a_0$ and $a_1$ can represent accelerations measured during a first and a second steady-state condition period (corresponding to first and second orientations of the device), $s_i|_{a=a_0}$ can represent the measured gap for the $i^{th}$ force sensor evaluated at an acceleration $a_0$, and $s_i|_{a=a_1}$ can represent the measured gap for the $i^{th}$ force sensor evaluated at an acceleration $a_1$. Equation (25) can be further subject to the conditions that accelerations $a_0$ and $a_1$ are taken for sufficiently different orientations of the device at steady state such that $a_0 \neq a_1$. In some examples, the system can determine that the change in orientation between the first and second steady-state measurement is greater than a minimum threshold, i.e., $|a_0 - a_1| > \delta_{a,min}$, before computing the measured gain.

The estimated or theoretical gain can be expressed as a function of the dynamic inertial model coefficients for the force sensor as:

$$\gamma_{t,i} = \frac{\sum \alpha}{\sum \beta} = \frac{\alpha_{0,i} + \alpha_{1,i} + \alpha_{2,i}}{1 + \beta_{1,i} + \beta_{2,i}} \tag{26}$$

where $\alpha$ and $\beta$ can correspond to the second order dynamic inertial model coefficients for the $i^{th}$ force sensor. In some examples, the theoretical gain can be calculated and stored in memory for use in error metric calculations. The theoretical gain stored in memory can be updated when the dynamic inertial model coefficients are updated through the coefficient learning algorithm. In some examples, the theoretical gain can be computed, for each error metric calculation, from dynamic inertial model coefficients stored in memory.

As described herein, in some examples, sufficient error between the estimated gain and the measured gain (indicative of the force sensor being out of specification) can be determined when the error metric is greater than the error metric threshold. Additionally or alternatively, as described herein in some examples, the system can require that other conditions be satisfied to trigger the coefficient learning algorithm in order to reduce the number of instances in which the coefficient learning algorithm is triggered. In some examples, sufficient error can be determined by tracking an error metric envelope function—similar to the acceleration envelope function discussed above—which can be expressed as:

$$e_{range}(n) = e_{max}(n) - e_{min}(n) \tag{27}$$

where:

$$e_{max}(n) = e_{max}(n)\alpha + (1-\alpha)e_{min}(n) \tag{28}$$

$$e_{min}(n) = e_{min}(n)\alpha + (1-\alpha)e_{max}(n) \tag{29}$$

subject to the conditions that if $e_{max}(n) < e(n)$, then $e_{max}(n) = e(n)$, and if $e_{max}(n) > e(n)$, then $e_{max}(n) = e(n)$. In the above equations, $\alpha$ can correspond to an envelope function weighting factor between 0 and 1 (e.g., 0.9, sometimes different from $\alpha$ used in the acceleration envelope function), and $e(n)$ can correspond to the error metric determined at time step n (e.g., at the n-th acceleration and/or gap sample period of the touch screen). If the difference between $e_{max}(n)$ and $e_{min}(n)$ is sufficiently great—that is, $e_{range}(n) > \delta_e$—then the device can determine, at 804 in process 800, that the error metric is sufficiently great for coefficient learning to proceed (i.e., determine that the error metric condition for triggering the coefficient learning algorithm is satisfied).

In some examples, sufficient error can be determined by determining that the error metric exceeds the error metric threshold for a threshold number of times. For example, the error metric calculation of 804 can be performed when the steady-state conditions are satisfied. Each instance of the error metric calculation of 804 can result in a determination of whether the error metric exceeds the error metric threshold. When the error metric exceeds the error metric threshold, a counter can be incremented. Once the counter reaches a threshold number, the force sensor can be determined to have sufficient error to trigger to coefficient learning algorithm.

Figure 8B:
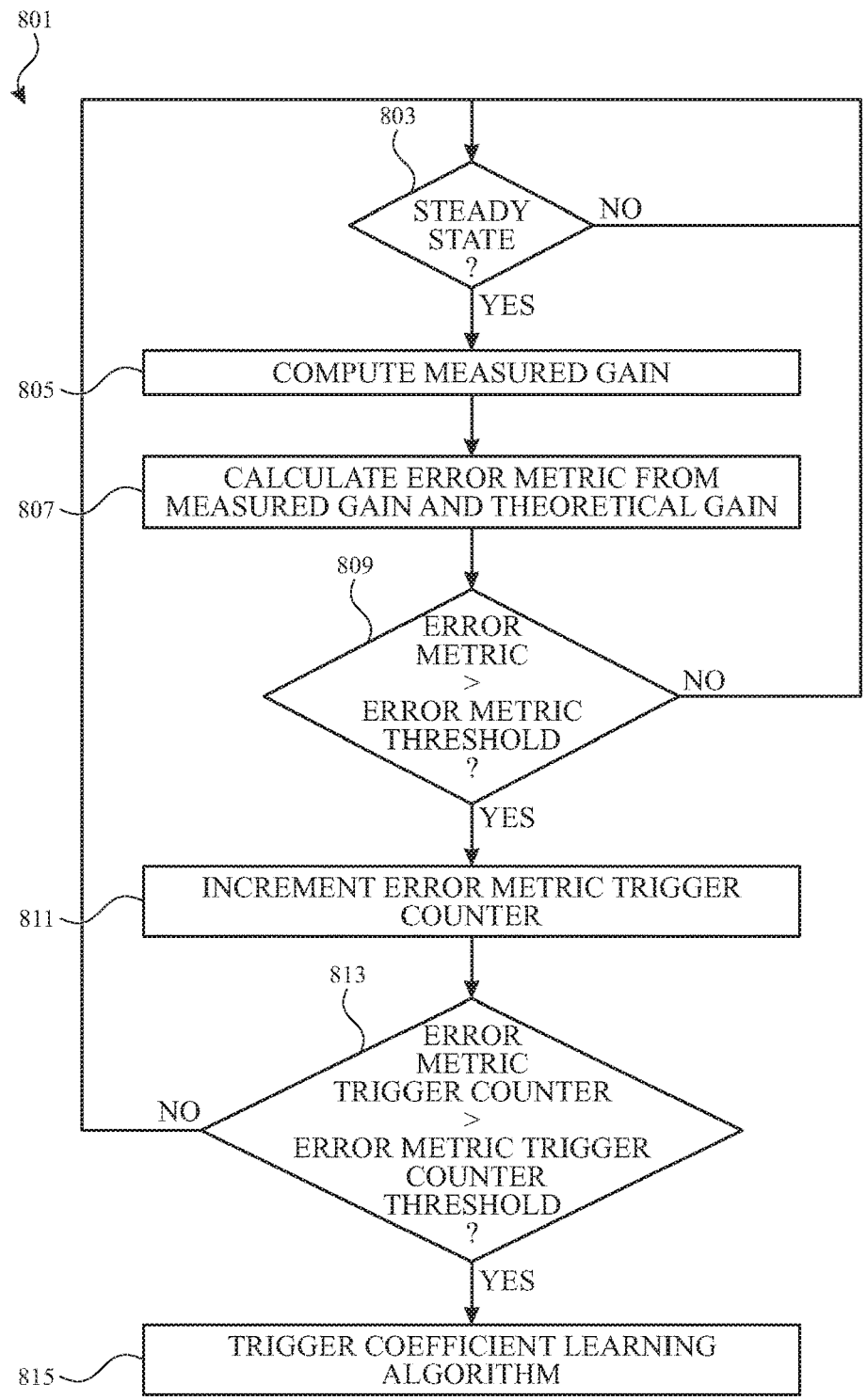
FIG. 8B illustrates another exemplary process for tracking an error metric according to examples of the disclosure.

FIG. 8B illustrates another exemplary process 801 for tracking an error metric according to examples of the disclosure. Process 801 can correspond to steps 802, 804 and 806 in FIG. 8A. At 803, the system can determine whether the device is in a steady-state condition for error metric tracking. When a steady-state condition is determined, the system can determine the error metric. Thus, at 805, the system can compute a measured gain according to equation (25), for example. At 807, an error metric can be calculated based on the measured gain and the estimated/theoretical gain according to equations (24) and (26), for example. At 809, the error metric can be compared with the error metric threshold for the force sensor. When the error metric exceeds the error metric threshold, an error metric trigger counter can be incremented at 811. At 813, the error metric trigger counter can be compared with an error metric trigger counter threshold. When the error metric trigger counter exceeds the error metric trigger counter threshold, the force sensor can be determined to have sufficient error to trigger to coefficient learning algorithm at 815.

In some examples, the sufficient error can be determined by determining that the error metric exceeds the error metric threshold for a threshold number of times within a threshold period of time. As described above, the error metric can be calculated, for example, each time the device returns to steady state conditions, and a counter can be incremented each time the error metric exceeds the error metric threshold. The counter can be decremented or reset based on timing or other conditions, such that the counter cannot reach the threshold number unless the counter is incremented to the threshold number within the threshold period of time. For example, the counter could be decremented at regular intervals. Alternatively, a timestamp associated with each incrementing of the counter can be used to decrement the counter after the threshold period of time from the timestamp. In other examples, the counter can be reset when a threshold number of continuous determinations that the error metric does not exceed the error metric threshold are made. Although some of the above examples are described as using a counter that can be incremented and decremented (or reset), the implementation is not so limited. For example, a leaky-accumulator can be used to implement the above features without a counter.

In some examples, the error metric threshold can be constant across the touch screen (i.e., the error metric threshold can be the same for every force sensor in the touch screen). In other examples, the error metric threshold can be different for different force sensors in the touch screen. The different error metric thresholds can account for different conditions of the force sensors in the touch screen. For example, in some examples, the flex layer can behave differently at different locations across the touch screen. For example, areas around the edges of the flex layer that are relatively fixedly anchored can have relatively little compliance, whereas areas in the center regions of the flex layer that are relatively freely moving can have relatively great compliance. As such, different error metric thresholds for different locations across the touch screen can be utilized. For example, error metric thresholds for force sensors at the edges of the touch screen (e.g., proximate to the anchors) can be smaller than error metric thresholds for force sensors at the center of the touch screen. In some examples, each force sensor can be associated with its own—not necessarily unique—error metric threshold. In some examples, the error metric threshold associated with a force sensor can be determined as a function of the position of the force sensor in the touch screen. In some examples, the error metric thresholds across the touch screen can vary based on a linear model, whereby the error metric thresholds are low at the edges of the touch screen, and increase linearly to a higher value at the center of the touch screen. In other examples, the error metric threshold can vary based on a non-linear model from a low threshold at the edges to a high threshold at the center.

Figure 8C:
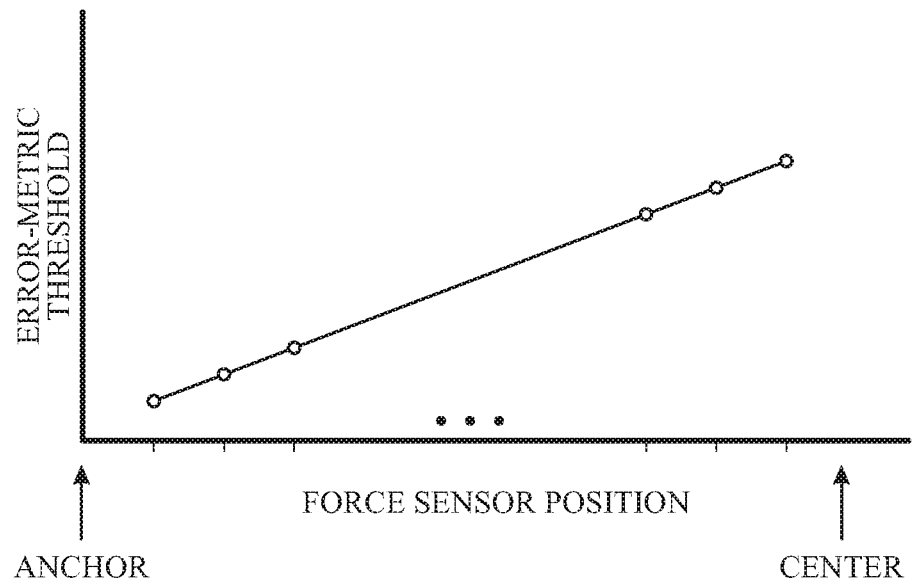
FIG. 8C illustrates an exemplary plot of a linear position-based error metric threshold according to examples of the disclosure.

FIG. 8C illustrates an exemplary plot of a linear position-based error metric threshold according to examples of the disclosure. The x-axis of the plot can represent the position of the force sensor. The y-axis of the plot can represent the error metric threshold as a function of the position of the force sensor. For example, the origin of the x-axis can correspond to positions on the flex layer between the anchor and the center of the flex layer. Each mark along the axis can correspond to a force sensor therebetween. The force sensor closest to the anchor can have the lowest error metric threshold, and the force sensor closest to the center to the flex layer can have the highest error metric threshold for the force sensors. The error metric threshold can increase linearly between the force sensor closest to the anchor and the force sensor closest to the center of the flex layer, which can correspond to the increase in compliance of the flex layer. The error metric threshold behavior can be mirrored across the center of the flex layer such that the error metric threshold decreases for force sensors moving from the center of the flex layer to the anchor on the opposite edge of the flex layer.

Figure 8D:
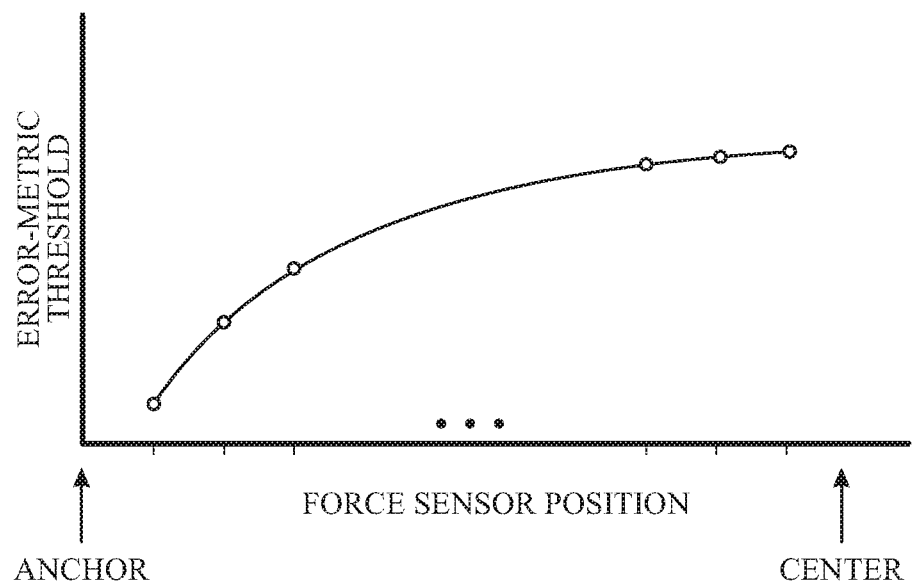
FIG. 8D illustrates an exemplary plot of a non-linear position-based error metric threshold according to examples of the disclosure.

FIG. 8D illustrates an exemplary plot of a non-linear position-based error metric threshold according to examples of the disclosure. For brevity of description, the plot of FIG. 8D can correspond to that of FIG. 8C, but instead of a linear relationship between the error metric threshold and position, the error metric threshold varies non-linearly with position (e.g., according to the square root of position).

Another exemplary position-dependent error metric threshold at a position (x,y) on the touch screen—$\delta(x,y)$—can be expressed as:

$$\delta(x,y) = \delta_0 + \lambda_s \zeta(x,y) \tag{30}$$

where $\delta_0$ can be a constant (e.g., 5), and $\lambda_s$ can be a constant (e.g., 15). In some examples, the constants $\delta_0$ and $\lambda_s$ can be determined, for example, at factory calibration for each device. In some examples, constants $\delta_0$ and $\lambda_s$ can be the same for all devices having the same touch screen. $\zeta(x,y)$ can be a position-dependent quantity, and can be expressed as:

$$\zeta(x, y) = 1 - \frac{(2x - (n_x - 1))^2 + (2y - (n_y - 1))^2}{(n_x - 1)^2 + (n_y - 1)^2} \tag{31}$$

where $n_x$ can correspond to the number of force sensors in a row of force sensors on the touch screen, $n_y$ can correspond to the number of force sensors in a column of force sensors on the touch screen, x can correspond to a force sensor index in a row of force sensors (e.g., starting from 0), and y can correspond to a force sensor index in a column of force sensors (e.g., starting from 0). For a given force sensor at position (x,y) on the touch screen, if the error metric is greater than $\delta(x,y)$, then the coefficient learning algorithm can be initiated at 406 for that given force sensor. Thus, in some examples, one force sensor on the touch screen may have its corresponding coefficients updated (e.g., because the error metric for that force sensor exceeds the error metric threshold for that force sensor), while the remaining force sensors may not (e.g., because the error metrics for those force sensors do not exceed the error metric threshold for those force sensors). In some examples, more than one force sensor on the touch screen (e.g., multiple or all force sensors on the touch screen) may have their corresponding coefficients updated. Although described as triggering the coefficient learning algorithm for an error metric greater than $\delta(x,y)$, a determination that the device is out of specification to trigger the coefficient learning algorithm can require a sufficient error be determined as described above (e.g., threshold number of times and/or within a threshold period of time).

Figure 8E:
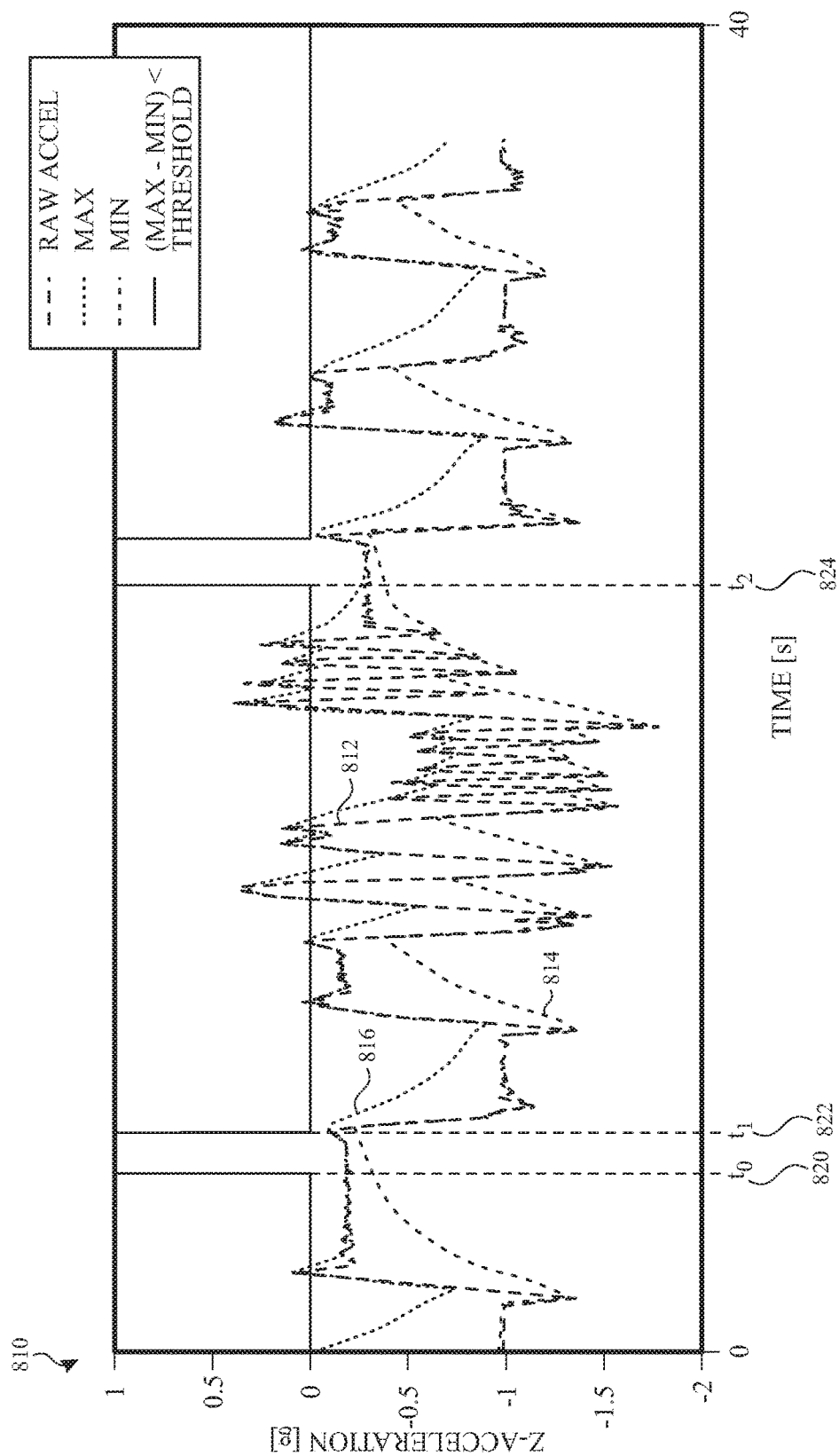
FIG. 8E illustrates an exemplary plot of acceleration envelope detection according to examples of the disclosure.

FIG. 8E illustrates an exemplary plot of acceleration envelope detection according to examples of the disclosure. Plot 810 of FIG. 8E includes representations of acceleration data 812, minimum acceleration 814, maximum acceleration 816, and steady-state determination 818. Plot 810 can display acceleration along the vertical axis, and can display time along the horizontal axis. Acceleration data 812 can be a representation of the acceleration experienced by the touch screen as a function of time (in some examples, the component of the acceleration along the z-axis illustrated in FIGS. 2A-2C). For example, acceleration data 412 can be acceleration detected by the accelerometer at 802 in FIG. 8A.

According to equations (22) and (23), above, minimum acceleration 814 and maximum acceleration 816 can follow from acceleration data 812, as illustrated in FIG. 8E. Further, in some examples, a steady-state condition for error metric tracking (e.g., as discussed with reference to step 802 in FIG. 8A) can be found when the difference between minimum acceleration 814 and maximum acceleration 816 is sufficiently small—in other words, smaller than a threshold—as previously discussed with respect to equations (21)-(23). In plot 810, a high value for steady-state determination 818 (a value of "1" on the vertical axis) can indicate that that a steady-state condition for error metric tracking was found, and a low value for the steady-state determination 818 (a value of "0" on the vertical axis) can indicate that a steady-state condition for error metric tracking was not found. For example, from time $t_0$ 820 to $t_1$ 822, the device could have found a steady-state condition for error metric tracking, and from $t_1$ to $t_2$ 824, the device could have found no steady-state condition for error metric tracking.

As discussed herein, triggering the coefficient learning algorithm can require other conditions be satisfied in addition to the error metric conditions (alternatively referred to as the error metric trigger). In some examples, once the coefficient learning algorithm has been triggered at least once, the coefficient learning algorithm can be triggered again only when the error metric conditions are satisfied (i.e., sufficient error) and a significant change is detected in one or both of the theoretical gain and measured gain from error metric tracking. Hysteresis can be applied to the theoretical gain and measured gain. For example, the system can look at a history of one or more theoretical gain values and determine if the change in theoretical gain exceeds a threshold (e.g., threshold difference, threshold rate of change, etc.). Similarly, the system can look at a history of one or more measured gain values and determine if the change in measured gain exceeds a threshold (e.g., threshold difference, threshold rate of change, etc.). Applying hysteresis to the theoretical and/or measured gains can prevent the system from continuously triggering the coefficient learning algorithm when device is continuously falsely triggering the coefficient learning algorithm (e.g., due to an offset in the measured gain with respect to the theoretical gain).

Figure 8F:
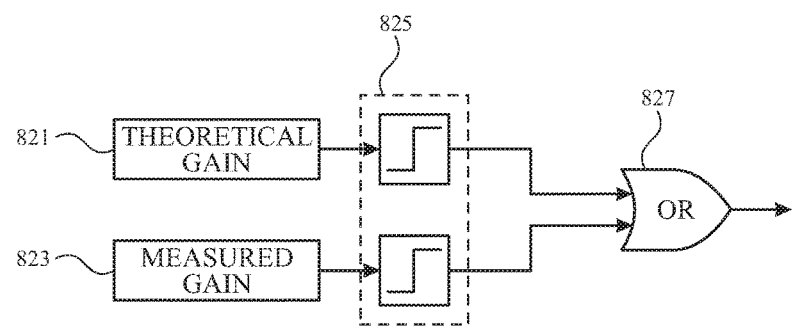
FIG. 8F illustrates an exemplary process for using hysteresis to determine a significant change in gain for triggering a coefficient learning algorithm according to examples of the disclosure.

FIG. 8F illustrates an exemplary process for using hysteresis to determine a significant change in gain for triggering a coefficient learning algorithm according to examples of the disclosure. The system can track a history of one or more values of the theoretical gain 821 and can track a history of one or more values of the measured gain 823. Hysteresis 825 can be applied to the histories of theoretical gain and measured gain to determine whether the theoretical gain and/or measured gain significantly change. A significant change can refer to a threshold rate of change or a threshold amount of change, for example. In some examples, the measures of significant change (e.g., the threshold type or threshold level) can be different for the theoretical gain and for the measured gain. In some examples, the measures of significant change (e.g., the threshold type or threshold level) can be the same for the theoretical gain and for the measured gain. When significant change is detected for the theoretical gain or the measured gain, the system can determine that a significant change is detected for at least one gain parameter. The determination can be represented logically by OR gate 827. The first output of hysteresis 825 can be logically high ("1") when significant change is detected in the theoretical gain, and can be logically low ("0") when significant change in the theoretical gain is not detected. The second output of hysteresis 825 can be logically high ("1") when significant change is detected in the measured gain, and can be logically low ("0") when significant change in the measured gain is not detected. The outputs of hysteresis 825 can be inputs to OR gate 827. Thus the output of OR gate 827 can be indicative of a significant change in one or both of the theoretical gain and the measured gain, which can be used as one of the triggering conditions for the coefficient learning algorithm (alternatively referred to as the hysteresis trigger). As described above, triggering learning based on the hysteresis in gain can be implemented, in some examples, only after a first cycle of the coefficient learning algorithm (i.e., after the coefficient learning algorithm generates at least a first set of updated coefficients).

Returning to FIG. 8A, the system can perform the coefficient learning algorithm at 806 when the triggering conditions discussed herein are satisfied. The system can learn new coefficients for the dynamic inertial model (e.g., as described with reference to step 642 in FIGS. 6C-6D). Specifically, the device can increase the scan rate of the force sensors as compared with the scan rate of the force sensors for other operations. For example, the device can begin scanning the force sensors with a scan frequency of 30 Hz to 240 Hz for the coefficient learning algorithm as compared with a scan frequency of 1 Hz to 30 Hz for other force sensing operations. The device can learn and apply, respectively, new coefficients to the dynamic inertial model for those force sensors that are out-of-specification, as described with reference to step 642 in FIGS. 6C-6D. In some examples, applying the new coefficients to the dynamic inertial model can include re-computing the error metric using the theoretical gain corresponding to the new coefficients instead of the old coefficients. When the error metric for the new coefficients is within the error metric threshold, the system can determine that the new coefficients produce acceptable results for the updated force sensors. When the error metric corresponding to the new coefficients do not produce acceptable results, the coefficient learning algorithm can be triggered again to generate new coefficients until acceptable results are achieved.

As discussed above, evaluating new coefficients for the dynamic inertial model can include comparing an updated error metric to the error metric threshold. In some examples, the error metric threshold for a force sensor can be static (i.e., the same for the sensor for all error metric evaluations). In some examples, the error metric threshold can be dynamic (i.e., different for the sensor depending on the error metric evaluation). For example, in order to facilitate a faster convergence when learning new coefficients, the system can use a relatively low error metric threshold when evaluating the error metric for new dynamic inertial model coefficients generated by the coefficient learning algorithm than when determining whether to trigger the coefficient learning algorithm. A relatively low error metric threshold can increase the convergence rate of the new coefficients to coefficients that accurately reflect the reality of the force sensor, and a relatively high error metric threshold for triggering the coefficient learning algorithm can prevent unnecessarily triggering the coefficient learning algorithm when the model coefficients are relatively close to the sensor specification.

Figure 8G:
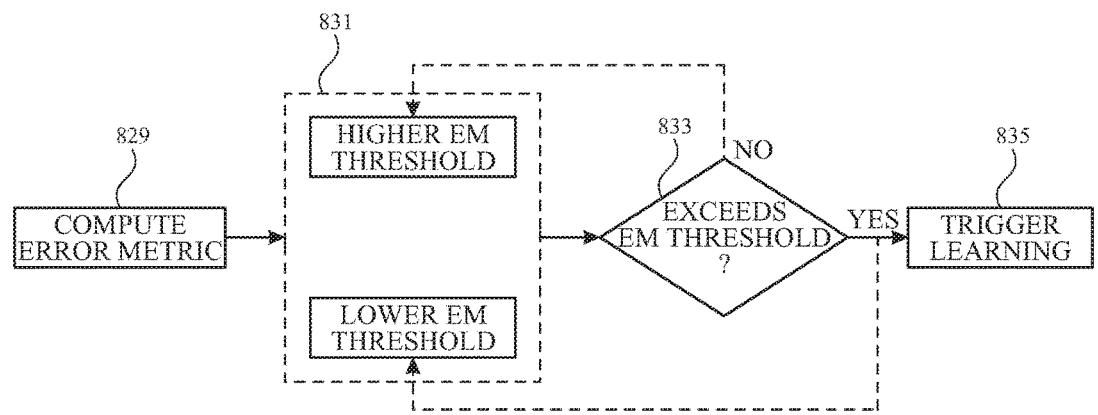
FIG. 8G illustrates exemplary dual error metric thresholds according to examples of the disclosure.

FIG. 8G illustrates exemplary dual error metric thresholds according to examples of the disclosure. FIG. 8G illustrates a higher error metric threshold and a lower error metric threshold that can be applied to error metric evaluations depending on the operation of the device. For example, at 829, the error metric can be computed. When the coefficient learning algorithm has not yet been triggered, the higher error metric threshold can be selected from among error metric thresholds 831. In other words, the higher error metric threshold for triggering the coefficient learning algorithm can be the default error metric threshold. At 833, the computed error metric can be compared with the selected higher error metric threshold. When the error metric does not exceed the higher error metric threshold (indicative of the force sensor remaining in specification), the high error metric threshold can remain selected. When the error metric does exceed the higher error metric threshold (indicative of the force sensor being out-of-specification), the coefficient learning algorithm can be triggered at 835, and the lower error metric threshold can be selected from among error metric thresholds 831. As the coefficient learning algorithm generates updated coefficients, an updated error metric can be computed at 829, and the error metric can be compared with the lower error metric threshold at 833. When the error metric does not exceed the lower error metric threshold (indicative of the force sensor being within in specification with the new coefficients), the high error metric threshold can be selected. When the error metric does exceed the lower error metric threshold (indicative of the force sensor still being out-of-specification with the new coefficients), the coefficient learning algorithm can be triggered again at 835, and the lower error metric threshold can be remain selected from among error metric thresholds 831.

Figure 8H:
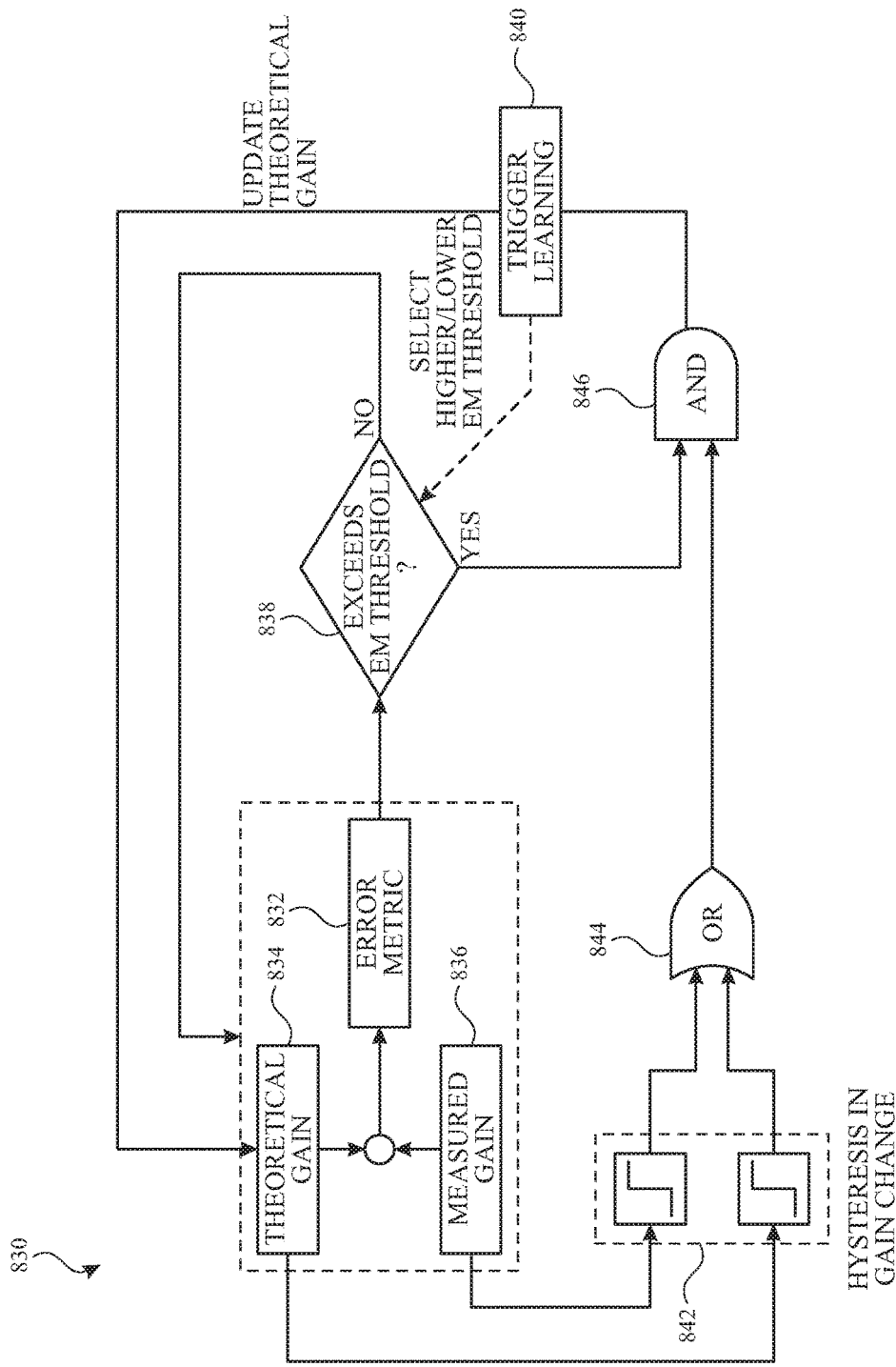
FIG. 8H illustrates an exemplary error metric tracking and coefficient learning process for a device including force sensors according to examples of the disclosure.

FIG. 8H illustrates an exemplary error metric tracking and coefficient learning process for a device including force sensors according to examples of the disclosure. As discussed herein, the device can perform error metric tracking when a steady-state condition is determined (e.g., as discussed with respect to step 802 in FIG. 8A). When the device is experiencing a steady state condition, the device can check whether the device's force sensors are operating within specifications. This check can include computing an error metric at 832. The error metric can be computed based on theoretical gain 834 and measured gain 836 (e.g., according to equation (24)). The measured gain 836 can be calculated from measured gap values of the force sensor at two different orientations (e.g., according to equations (25)). The theoretical gain can be stored in memory and/or calculated based on model coefficients (e.g., according to equation (26)). The error metric check can also include determining, at 838, whether the computed error metric exceeds an error metric threshold. When the computed error metric does not exceed the error metric threshold, the error metric tracking system can wait, for example, until a steady state condition is again satisfied to trigger another error metric check. When the computed error metric does exceed the error metric threshold, the error metric condition for triggering the coefficient learning algorithm can be satisfied. As described herein, satisfying the error metric condition for triggering the coefficient learning algorithm can require more than one detection of an error metric exceeding the error metric threshold.

When the system has not yet triggered the coefficient learning algorithm for the first time (i.e., the force sensors have never been determined to be out-of-specification), satisfying the error metric condition for triggering the coefficient learning algorithm can trigger the coefficient learning algorithm at 840. In some examples, once the coefficient learning algorithm is triggered at least once, the system can additionally require a significant change in a gain parameter to satisfy a hysteresis condition for triggering the coefficient learning algorithm. Hysteresis can be applied at 842 to the theoretical gain and measured gain (as described above, for example, with reference to FIG. 8F). When a significant changed is detected in the theoretical gain or measured gain (as indicated by OR gate 844), the hysteresis condition for triggering the coefficient learning algorithm can be satisfied. In such examples, satisfaction of the error metric trigger and hysteresis trigger can be required to trigger the coefficient learning algorithm (as indicated by AND gate 846).

When the device is determined to be out-of-specification (e.g., by satisfaction of the error metric trigger and/or the hysteresis trigger), the device can learn and apply, respectively, new coefficients to the dynamic inertial model for those force sensors that are out-of-specification, as described with reference to step 642 in FIGS. 6C-6D. In some examples, applying the new coefficients to the dynamic inertial model can include monitoring the dynamic inertial model with the new coefficients applied to determine whether the new coefficients produce acceptable results for the updated force sensors. If the new coefficients do not produce acceptable results, the new coefficients can continue to be iteratively updated until acceptable results are achieved. For example, as described above, the error metric can be recomputed, at 832, using the theoretical gain corresponding to the new coefficients. When the error metric does not exceed the error metric threshold at 838, the force sensors of the device can be determined to be within specification and the new coefficients can be acceptable. When the error metric exceeds the error metric threshold at 838, the coefficient learning algorithm can be triggered again (e.g., assuming the hysteresis trigger is satisfied) to generate new model coefficients and a new theoretical gain.

As discussed herein (e.g., with reference to FIG. 8G), the error metric threshold can be dynamically applied such that triggering the coefficient learning algorithm can cause a lower error metric threshold to be selected for error metric evaluation, and accepting the new coefficients (thereby concluding a cycle of the coefficient learning algorithm) can cause the higher error metric threshold to be selected.

In some examples, to save power, error tracking can be performed periodically rather than continuously. For example, the device can determine whether it has tracked the error metric for longer than a predetermined time period (e.g., 30 seconds) within a last predetermined time period (e.g., the last hour). In other words, the device can track the error metric for a maximum amount of time per interval of time to conserve power, because, in some examples, tracking the error metric can be a relatively power-intensive process. If the device has already reached its maximum error metric tracking time, the device can disable error tracking for a threshold period of time. If the device has not reached its maximum error metric tracking time, the device can continue error metric tracking when steady-state conditions are satisfied.

As discussed above, in some examples, error metric tracking and inertial model learning (as performed according to the coefficient learning algorithm) can be performed independently for each force sensor of the touch screen. However, in some examples, an individual force sensor may improperly determine that the device is out-of-specification and/or trigger the coefficient learning process for that force sensor, even though that force sensor may indeed be in-specification. For example, noise in a particular force sensor's output may erroneously cause the system to determine that the sensor is out-of-specification and/or trigger coefficient learning process for that force sensor. Unnecessary coefficient learning processes can consume power unnecessarily, which can be especially detrimental in battery-operated devices. In order to avoid erroneous triggering of coefficient learning processes, in some examples, error metric tracking can be performed on groups of force sensors on the touch screen rather than on individual force sensors.

Figure 8I:
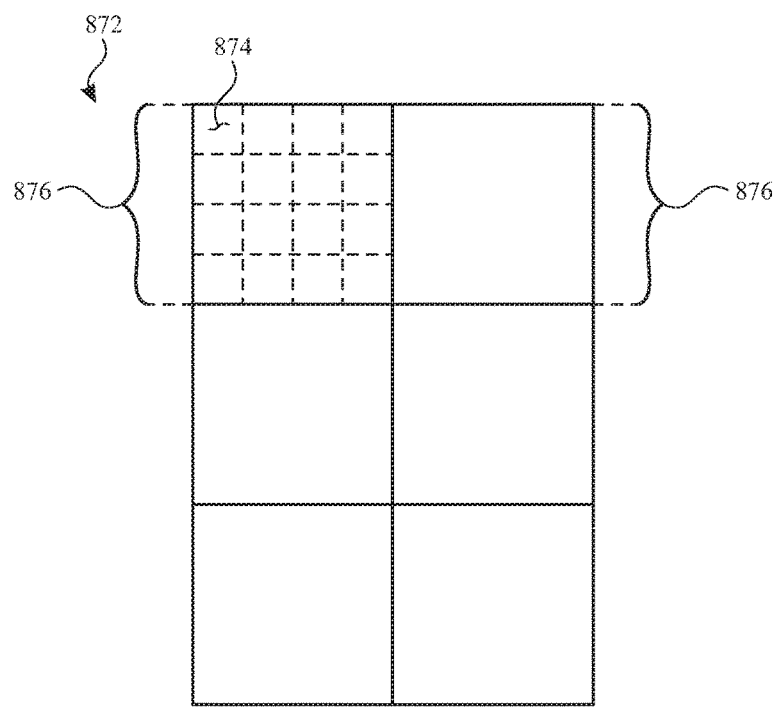
FIG. 8I illustrates an exemplary force sensor grouping configuration according to examples of the disclosure.

FIG. 8I illustrates an exemplary force sensor grouping configuration according to examples of the disclosure. Touch screen 872 can include force sensors 874, as previously described. In some examples, force sensors 874 can be organized into 4×4 force sensor groupings 876. In the example of FIG. 8I, touch screen 872 can include 12×8 force sensors 874 (only illustrated in the top-left force sensor grouping 876), and thus can include 3×2 force sensor groupings. It is understood that other grouping configurations in which at least two force sensors are grouped together are similarly within the scope of the disclosure, including contiguous or non-contiguous groups and symmetrical or non-symmetrical groups.

When tracking the error metric in touch screen 872 of FIG. 8I, rather than determining an individual error metric for each force sensor 874 on the touch screen, a group error metric can be determined for each grouping 876 of force sensors. The error metric for a grouping 876 of force sensors 874 can be determined in a manner similar to as described with reference to FIG. 8A and equation (24), except that the measured gain in equation (24) can be replaced with an average measured gain for all of the force sensors in the grouping. In particular, the measured gain for each force sensor 874 in the grouping 876 can be determined individually and then averaged, and the average measured gain can be used in equation (24). In some examples, a weighted average can be used rather than assigning each force sensor in the grouping an equal weight. In some examples, the weighting can be applied based on the proximity of the force sensor to the edge of the flex layer. Once the error metric for the grouping 876 has been determined using the average measured gain in equation (24), that error metric can be compared to an error metric threshold for the grouping. In some examples, different groupings 876 can have different error metric thresholds, similar to as described above with respect to individual force sensors. In some examples, different groupings 876 can have the same error metric thresholds. If the error metric for the grouping 876 exceeds the grouping's error metric threshold, coefficient learning can be triggered for all of the force sensors 874 in the grouping, and if the error metric for the grouping does not exceed the grouping's error metric threshold, coefficient learning may not be triggered for the force sensors in the grouping. The above determination can be performed for each grouping 876 of force sensors 874 on the touch screen. Because the error metric can be tracked for groups of force sensors 874 rather than individual force sensors, erroneous or outlier error metric determinations for any single force sensor on the touch screen may not unnecessarily trigger coefficient learning.

Figure 8J:
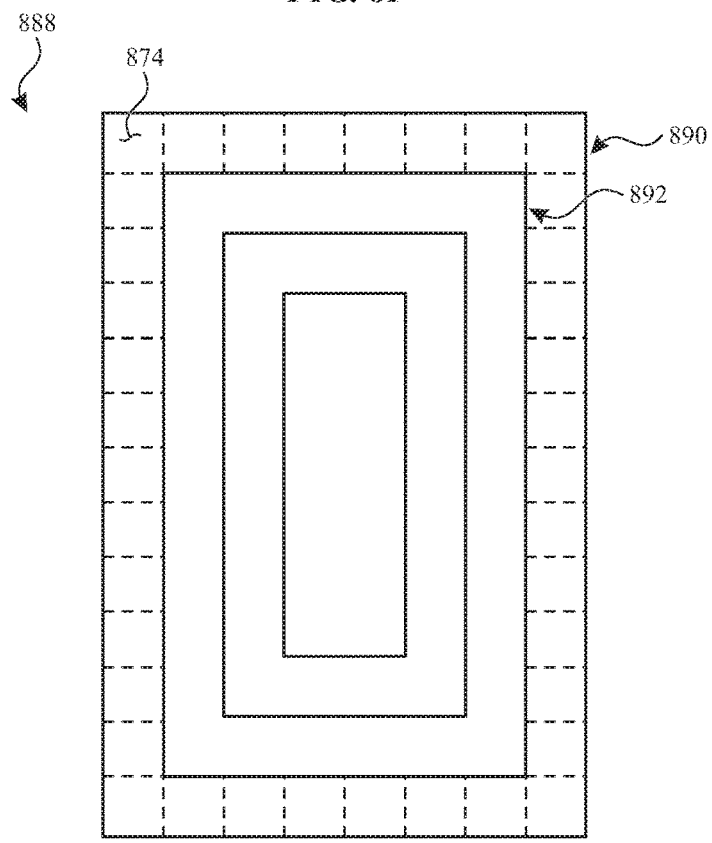
FIG. 8J illustrates another exemplary force sensor grouping configuration according to examples of the disclosure.

FIG. 8J illustrates another exemplary force sensor grouping configuration according to examples of the disclosure. In FIG. 8J, rather than being grouped into 4×4 force sensor groupings as in FIG. 8D, force sensors 874 can be grouped into concentric regions/rings on touch screen 888, as illustrated. In particular, force sensors 874 in an outermost region of touch screen 888 can be grouped into grouping 890, force sensors in the next inner region of the touch screen can be grouped into grouping 892, and so on. The force sensor grouping configuration of FIG. 8J can be advantageous in that the groupings can be composed of similarly-situated force sensors (e.g., force sensors at the edge of touch screen 888 can be grouped together, force sensors at the center of the touch screen can be grouped together, etc.). Because similarly-situated force sensors 874 on the touch screen can behave similarly, collectively tracking the error metric of such similarly-situated force sensors can provide improved error metric tracking performance.

In some examples, the force sensing and gain-based error metric tracking discussed above can be implemented by computing system 500 in FIG. 5. Specifically, in some examples, force controller 514 can implement the force sensing, gain-based error metric tracking and/or coefficient learning processes of the disclosure.

Therefore, according to the above, some examples of the disclosure are directed to an electronic device comprising: a touch sensor panel configured to detect an object touching the touch sensor panel; a plurality of force sensors coupled to the touch sensor panel and configured to detect an amount of force with which the object touches the touch sensor panel; and a processor coupled to the plurality of force sensors, the processor configured to: measure a first value from a first force sensor of the plurality of force sensors; measure a second value from a second force sensor of the plurality of force sensors, different from the first force sensor; and determine a motion characteristic of the electronic device based on the first value and the second value. Additionally or alternatively to one or more of the examples disclosed above, in some examples, the processor is configured to concurrently measure the first value from the first force sensor and the second value from the second force sensor. Additionally or alternatively to one or more of the examples disclosed above, in some examples, the motion characteristic comprises a translational motion characteristic of the electronic device. Additionally or alternatively to one or more of the examples disclosed above, in some examples, the motion characteristics comprises a rotational motion characteristic of the electronic device. Additionally or alternatively to one or more of the examples disclosed above, in some examples, measuring the first value from the first force sensor comprises determining a first baselined gap value with respect to a neutral state of the first force sensor, measuring the second value from the second force sensor comprises determining a second baselined gap value with respect to a neutral state of the second force sensor, and determining the motion characteristic of the electronic device is based on comparing the first baselined gap value and the second baselined gap value. Additionally or alternatively to one or more of the examples disclosed above, in some examples, the first force sensor and the second force sensor are separated by a first axis on the electronic device, and the processor is configured to determine the motion characteristic of the electronic device with respect to the first axis based on the first value and the second value. Additionally or alternatively to one or more of the examples disclosed above, in some examples, the processor is configured to: in accordance with a determination that the first value and the second value are indicative of opposing force sensor position measurements, determine that the electronic device is undergoing at least rotational movement with respect to the first axis; and in accordance with a determination that the first value and the second value are indicative of consistent force sensor position measurements, determine that the electronic device is undergoing at least translational movement with respect to the first axis. Additionally or alternatively to one or more of the examples disclosed above, in some examples, the first force sensor is part of a first group of a plurality of force sensors, the second force sensor is part of a second group of a plurality of force sensors, different from the first group, measuring the first value comprises measuring a first group value from the first group of force sensors, measuring the second value comprises measuring a second group value from the second group of force sensors, and determining the motion characteristic of the electronic device is based on comparing the first group value and the second group value. Additionally or alternatively to one or more of the examples disclosed above, in some examples, the first group value comprises a first average value of the force sensors in the first group of force sensors, and the second group value comprises a second average value of the force sensors in the second group of force sensors. Additionally or alternatively to one or more of the examples disclosed above, in some examples, the plurality of force sensors comprises a first row of force sensors and a second row of force sensors, the first group of force sensors comprises the first row of force sensors, and the second group of force sensors comprises the second row of force sensors. Additionally or alternatively to one or more of the examples disclosed above, in some examples, the plurality of force sensors comprises a first column of force sensors and a second column of force sensors, the first group of force sensors comprises the first column of force sensors, and the second group of force sensors comprises the second column of force sensors. Additionally or alternatively to one or more of the examples disclosed above, in some examples, the processor is configured to: after measuring the first value and the second value: measure a third value from a third force sensor of the plurality of force sensors, different from the first and second force sensors; measure a fourth value from a fourth force sensor of the plurality of force sensors, different from the first, second and third force sensors; and determine a second motion characteristic of the electronic device based on the third value and the fourth value.

Some examples of the disclosure are directed to a method comprising: measuring a first value from a first force sensor of a plurality of force sensors coupled to a touch sensor panel of an electronic device and configured to detect an amount of force with which an object touches the touch sensor panel; measuring a second value from a second force sensor of the plurality of force sensors, different from the first force sensor; and determining a motion characteristic of the electronic device based on the first value and the second value. Additionally or alternatively to one or more of the examples disclosed above, in some examples, the first value from the first force sensor and the second value from the second force sensor are measured concurrently. Additionally or alternatively to one or more of the examples disclosed above, in some examples, measuring the first value from the first force sensor comprises determining a first baselined gap value with respect to a neutral state of the first force sensor, measuring the second value from the second force sensor comprises determining a second baselined gap value with respect to a neutral state of the second force sensor, and determining the motion characteristic of the electronic device is based on comparing the first baselined gap value and the second baselined gap value. Additionally or alternatively to one or more of the examples disclosed above, in some examples, the first force sensor and the second force sensor are separated by a first axis on the electronic device, and the motion characteristic of the electronic device is determined with respect to the first axis based on the first value and the second value. Additionally or alternatively to one or more of the examples disclosed above, in some examples, the method further comprises: in accordance with a determination that the first value and the second value are indicative of opposing force sensor position measurements, determining that the electronic device is undergoing at least rotational movement with respect to the first axis; and in accordance with a determination that the first value and the second value are indicative of consistent force sensor position measurements, determining that the electronic device is undergoing at least translational movement with respect to the first axis. Additionally or alternatively to one or more of the examples disclosed above, in some examples, the first force sensor is part of a first group of a plurality of force sensors, the second force sensor is part of a second group of a plurality of force sensors, different from the first group, measuring the first value comprises measuring a first group value from the first group of force sensors, measuring the second value comprises measuring a second group value from the second group of force sensors, and determining the motion characteristic of the electronic device is based on comparing the first group value and the second group value. Additionally or alternatively to one or more of the examples disclosed above, in some examples, the first group value comprises a first average value of the force sensors in the first group of force sensors, and the second group value comprises a second average value of the force sensors in the second group of force sensors.

Some examples of the disclosure are directed to a non-transitory computer-readable medium storing instructions, which when executed by a processor of an electronic device, cause the processor to perform a method comprising: measuring a first value from a first force sensor of a plurality of force sensors coupled to a touch sensor panel of the electronic device and configured to detect an amount of force with which an object touches the touch sensor panel; measuring a second value from a second force sensor of the plurality of force sensors, different from the first force sensor; and determining a motion characteristic of the electronic device based on the first value and the second value. Additionally or alternatively to one or more of the examples disclosed above, in some examples, the first value from the first force sensor and the second value from the second force sensor are measured concurrently. Additionally or alternatively to one or more of the examples disclosed above, in some examples, measuring the first value from the first force sensor comprises determining a first baselined gap value with respect to a neutral state of the first force sensor, measuring the second value from the second force sensor comprises determining a second baselined gap value with respect to a neutral state of the second force sensor, and determining the motion characteristic of the electronic device is based on comparing the first baselined gap value and the second baselined gap value. Additionally or alternatively to one or more of the examples disclosed above, in some examples, the first force sensor and the second force sensor are separated by a first axis on the electronic device, and the motion characteristic of the electronic device is determined with respect to the first axis based on the first value and the second value. Additionally or alternatively to one or more of the examples disclosed above, in some examples, the method further comprises: in accordance with a determination that the first value and the second value are indicative of opposing force sensor position measurements, determining that the electronic device is undergoing at least rotational movement with respect to the first axis; and in accordance with a determination that the first value and the second value are indicative of consistent force sensor position measurements, determining that the electronic device is undergoing at least translational movement with respect to the first axis. Additionally or alternatively to one or more of the examples disclosed above, in some examples, the first force sensor is part of a first group of a plurality of force sensors, the second force sensor is part of a second group of a plurality of force sensors, different from the first group, measuring the first value comprises measuring a first group value from the first group of force sensors, measuring the second value comprises measuring a second group value from the second group of force sensors, and determining the motion characteristic of the electronic device is based on comparing the first group value and the second group value. Additionally or alternatively to one or more of the examples disclosed above, in some examples, the first group value comprises a first average value of the force sensors in the first group of force sensors, and the second group value comprises a second average value of the force sensors in the second group of force sensors.

Some examples of the disclosure are directed to an electronic device comprising: a touch sensor panel configured to detect one or more objects touching the touch sensor panel; a plurality of force sensors coupled to the touch sensor panel and configured to detect an amount of force with which the one or more objects touch the touch sensor panel, the force sensors comprising a flex layer having a first portion and a second portion; and a processor coupled to the plurality of force sensors, the processor configured to: in accordance with a determination that the first portion of the flex layer and the second portion of the flex layer have deflected in opposite directions from a neutral state, determine that the electronic device is undergoing at least rotational movement; and in accordance with a determination that the first portion of the flex layer and the second portion of the flex layer have deflected in consistent directions from the neutral state, determine that the electronic device is undergoing at least translational movement.

Some examples of the disclosure are directed to an electronic device comprising: a plurality of force sensors coupled to a touch sensor panel configured to detect an object touching the touch sensor panel, the plurality of force sensors configured to detect an amount of force with which the object touches the touch sensor panel; a processor coupled to the plurality of force sensors, the processor configured to: in accordance with a determination that an acceleration characteristic of the electronic device is greater than a threshold, determine an error metric for a first force sensor of the plurality of force sensors; and in accordance with a determination that the acceleration characteristic of the electronic device is not greater than the threshold, forgo determining the error metric for the first force sensor. Additionally or alternatively to one or more of the examples disclosed above, in some examples, the processor is further configured to: in accordance with a determination that the first error metric is greater than a first error metric threshold, update a first dynamics model for the first force sensor; and in accordance with a determination that the first error metric is not greater than the first error metric threshold, forgo updating the first dynamics model for the first force sensor. Additionally or alternatively to one or more of the examples disclosed above, in some examples, the processor is further configured to: determine an amount of force with which the object touches an area of the touch sensor panel corresponding to the first force sensor based on the first dynamics model for the first force sensor. Additionally or alternatively to one or more of the examples disclosed above, in some examples, the acceleration characteristic comprises a difference between a minimum of an envelope function of an acceleration of the electronic device and a maximum of the envelope function of the acceleration of the electronic device. Additionally or alternatively to one or more of the examples disclosed above, in some examples, the acceleration characteristic comprises translational acceleration. Additionally or alternatively to one or more of the examples disclosed above, in some examples, determining the error metric for the first force sensor of the plurality of force sensors comprises: in accordance with a determination that the touch sensor panel is in a no-touch condition while the acceleration characteristic of the electronic device is greater than the threshold, determining the error metric for the first force sensor; and in accordance with a determination that the touch sensor panel is not in the no-touch condition while the acceleration characteristic of the electronic device is greater than the threshold, forgoing determining the error metric for the first force sensor. Additionally or alternatively to one or more of the examples disclosed above, in some examples, determining the error metric for the first force sensor comprises: determining a first group error metric for a first group of a plurality of force sensors, the first group of force sensors including the first force sensor, and the electronic device including the first group of a plurality of force sensors and a second group of a plurality of force sensors, different from the first group of the plurality of force sensors, and the processor is further configured to determine a second group error metric for the second group of the plurality of force sensors. Additionally or alternatively to one or more of the examples disclosed above, in some examples, the processor is further configured to: after determining that the acceleration characteristic of the electronic device is greater than the threshold, increasing a force scan rate of the first force sensor, wherein the error metric for the first force sensor is determined while the first force sensor is operating at the increased force scan rate.

Some examples of the disclosure are directed to a method comprising: in accordance with a determination that an acceleration characteristic of an electronic device is greater than a threshold, determining an error metric for a first force sensor of a plurality of force sensors coupled to a touch sensor panel of the electronic device and configured to detect an amount of force with which an object touches the touch sensor panel; and in accordance with a determination that the acceleration characteristic of the electronic device is not greater than the threshold, forgoing determining the error metric for the first force sensor.

Some examples of the disclosure are directed to a non-transitory computer-readable medium storing instructions, which when executed by a processor of an electronic device, cause the processor to perform a method comprising: in accordance with a determination that an acceleration characteristic of the electronic device is greater than a threshold, determining an error metric for a first force sensor of a plurality of force sensors coupled to a touch sensor panel of the electronic device and configured to detect an amount of force with which an object touches the touch sensor panel; and in accordance with a determination that the acceleration characteristic of the electronic device is not greater than the threshold, forgoing determining the error metric for the first force sensor.

Some examples of the disclosure are directed to an electronic device comprising: a plurality of force sensors coupled to a touch sensor panel configured to detect an object touching the touch sensor panel, the plurality of force sensors configured to detect an amount of force with which the object touches the touch sensor panel; an accelerometer; and a processor coupled to the plurality of force sensors and the accelerometer, the processor configured to: determine a first estimated gap for a first force sensor of the plurality of force sensors based on acceleration data indicative of acceleration of the electronic device from the accelerometer, the first estimated gap determined using a first dynamics model corresponding to the first force sensor; measure a first measured gap for the first force sensor; determine a first error metric for the first force sensor comprising a difference between the first estimated gap and the first measured gap; and in accordance with a determination that the first error metric satisfies first learning criteria, update the first dynamics model for the first force sensor. Additionally or alternatively to one or more of the examples disclosed above, in some examples, the processor is further configured to: determine a second estimated gap for a second force sensor of the plurality of force sensors based on the acceleration data indicative of acceleration of the electronic device from the accelerometer, the second estimated gap determined using a second dynamics model corresponding to the second force sensor; measure a second measured gap for the second force sensor; determine a second error metric for the second force sensor comprising a difference between the second estimated gap and the second measured gap; and in accordance with a determination that the second error metric satisfies second learning criteria, update the second dynamics model for the second force sensor. Additionally or alternatively to one or more of the examples disclosed above, in some examples, the processor is further configured to: in accordance with a determination that the first error metric does not satisfy the first learning criteria, forgo updating the first dynamics model for the first force sensor; and in accordance with a determination that the second error metric does not satisfy the second learning criteria, forgo updating the second dynamics model for the second force sensor. Additionally or alternatively to one or more of the examples disclosed above, in some examples, the first force sensor is located at a first position on the touch sensor panel, the second force sensor is located at a second position on the touch sensor panel, different from the first position, and the first and second learning criteria comprise position-dependent learning criteria that correspond to the first and second position, respectively. Additionally or alternatively to one or more of the examples disclosed above, in some examples, the first learning criteria include a criterion that is satisfied when a difference between a minimum of an envelope function of the difference and a maximum of the envelope function of the difference is greater than a first error metric threshold. Additionally or alternatively to one or more of the examples disclosed above, in some examples, the first learning criteria comprise group learning criteria for a group of a plurality of force sensors including the first force sensor, and updating the first dynamics model for the first force sensor comprises updating respective dynamics models for the force sensors in the group of force sensors.

Some examples of the disclosure are directed to a method comprising: determining a first estimated gap for a first force sensor of a plurality of force sensors coupled to a touch sensor panel of an electronic device, the first estimated gap based on acceleration data indicative of acceleration of the electronic device from an accelerometer of the electronic device, the first estimated gap determined using a first dynamics model corresponding to the first force sensor; measuring a first measured gap for the first force sensor; determining a first error metric for the first force sensor comprising a difference between the first estimated gap and the first measured gap; and in accordance with a determination that the first error metric satisfies first learning criteria, updating the first dynamics model for the first force sensor.

Some examples of the disclosure are directed to a non-transitory computer-readable medium storing instructions, which when executed by a processor of an electronic device, cause the processor to perform a method comprising: determining a first estimated gap for a first force sensor of a plurality of force sensors coupled to a touch sensor panel of the electronic device, the first estimated gap based on acceleration data indicative of acceleration of the electronic device from an accelerometer of the electronic device, the first estimated gap determined using a first dynamics model corresponding to the first force sensor; measuring a first measured gap for the first force sensor; determining a first error metric for the first force sensor comprising a difference between the first estimated gap and the first measured gap; and in accordance with a determination that the first error metric satisfies first learning criteria, updating the first dynamics model for the first force sensor.

Some examples of the disclosure are directed to an electronic device comprising: a touch sensor panel configured to detect one or more objects touching the touch sensor panel; a plurality of force sensors coupled to the touch sensor panel and configured to detect an amount of force with which the one or more objects touch the touch sensor panel; and a processor coupled to the plurality of force sensors, the processor configured to: when a first object is touching the touch sensor panel for a first time with a given amount of force, determine that the first object is touching the touch sensor panel with a first amount of force; after the first object ceases touching the touch sensor panel and after the electronic device experiences a first acceleration while no object is touching the touch sensor panel, and when the first object is touching the touch sensor panel for a second time with the given amount of force: in accordance with a determination that the first acceleration comprises an acceleration characteristic of the electronic device that is greater than a threshold, determine that the first object is touching the touch sensor panel with a second amount of force, different from the first amount of force; and in accordance with a determination that the first acceleration comprises the acceleration characteristic of the electronic device that is not greater than the threshold, determine that the first object is touching the touch sensor panel with the first amount of force.

Some examples of the disclosure are directed to an electronic device. The electronic device can comprise a plurality of force sensors coupled to a touch sensor panel configured to detect an object touching the touch sensor panel, the plurality of force sensors configured to detect an amount of force with which the object touches the touch sensor panel; and a processor coupled to the plurality of force sensors. The processor can be capable of: in accordance with a determination that an acceleration characteristic of the electronic device is less than a threshold, determining an error metric for one or more force sensors of the plurality of force sensors; and in accordance with a determination that the acceleration characteristic of the electronic device is not less than the threshold, forgoing determining the error metric for the one or more force sensors of the plurality of force sensors. Additionally or alternatively to one or more of the examples disclosed above, in some examples, the processor can be further configured to: in accordance with a determination that the error metric of the one or more force sensors is greater than an error metric threshold, updating a dynamics model for the one or more force sensors; and in accordance with a determination that the error metric of the one or more force sensors is not greater than the error metric threshold, forgoing updating the dynamics model for the one or more force sensors. Additionally or alternatively to one or more of the examples disclosed above, in some examples, the processor can be further configured to: determining an amount of force with which the object touches an area of the touch sensor panel corresponding to the one or more force sensors based on the dynamics model for the one or more force sensors. Additionally or alternatively to one or more of the examples disclosed above, in some examples, the error metric threshold corresponding to each of the one or more force sensors can be based on the location of the force sensor in a force sensor array. Additionally or alternatively to one or more of the examples disclosed above, in some examples, the processor can further configured to: determining an updated error metric for the one or more force sensors based on the updated dynamics model; in accordance with a determination that the updated error metric of the one or more force sensors is greater than a reduced error metric threshold, updating the dynamics model for the one or more force sensors; and in accordance with a determination that the updated error metric of the one or more force sensors is not greater than the reduced error metric threshold, accepting the updated the dynamics model for the one or more force sensors. Additionally or alternatively to one or more of the examples disclosed above, in some examples, the acceleration characteristic can comprise a difference between a minimum of an envelope function of the acceleration and a maximum of the envelope function. Additionally or alternatively to one or more of the examples disclosed above, in some examples, determining the error metric for the one or more force sensors of the plurality of force sensors can comprise: in accordance with a determination that the touch sensor panel is in a no-touch condition while the acceleration characteristic of the electronic device is less than the threshold, determining the error metric for the one or more force sensors; and in accordance with a determination that the touch sensor panel is not in the no-touch condition while the acceleration characteristic of the electronic device is less than the threshold, forgoing determining the error metric for the one or more force sensors. Additionally or alternatively to one or more of the examples disclosed above, in some examples, determining the error metric for the one or more force sensors can comprise: determining a group error metric for a group of the plurality of force sensors; and the processor can be further capable of: in accordance with a determination that the group error metric of the group of force sensors is greater than a group error metric threshold, updating a dynamics model for force sensors in the group of force sensors; and in accordance with a determination that the group error metric of the group of force sensors is not greater than the group error metric threshold, forgoing updating the first dynamics model for force sensors in the group of force sensors.

Some examples of the disclosure are directed to a method. The method can comprise: at an electronic device including a plurality of force sensors configured to detect an amount of force with which an object touches a touch sensor and a processor: in accordance with a determination that an acceleration characteristic of the electronic device is less than a threshold, determining an error metric for one or more force sensors of the plurality of force sensors; and in accordance with a determination that the acceleration characteristic of the electronic device is not less than the threshold, forgoing determining the error metric for the one or more force sensors of the plurality of force sensors.

Some examples of the disclosure are directed to a non-transitory computer-readable medium storing instructions, which when executed by a processor of an electronic device, the electronic device including a plurality of force sensors configured to detect an amount of force with which an object touches a touch sensor panel, cause the processor to perform a method comprising: in accordance with a determination that an acceleration characteristic of the electronic device is less than a threshold, determining an error metric for one or more force sensors of the plurality of force sensors; and in accordance with a determination that the acceleration characteristic of the electronic device is not less than the threshold, forgoing determining the error metric for the one or more force sensors of the plurality of force sensors.

Some examples of the disclosure are directed to an electronic device. The electronic device can comprise a plurality of force sensors coupled to a touch sensor panel configured to detect an object touching the touch sensor panel, the plurality of force sensors configured to detect an amount of force with which the object touches the touch sensor panel; an accelerometer; and a processor coupled to the plurality of force sensors and the accelerometer. The processor can be capable of: determining a measured gain for one or more of the plurality of force sensors; determining an error metric for the one or more of the plurality of force sensors based on the measured gain and a theoretical gain; and determining a state of the one or more force sensors based on the error metric. Additionally or alternatively to one or more of the examples disclosed above, in some examples, determining the measured gain for the one or more of the plurality of sensors can comprise: measuring a first measured gap for the one or more of the plurality of force sensors at a first orientations; measuring a second measured gap for the one or more of the plurality of force sensors at a second orientation, the second orientation different than the first orientation; and determining the measured gain based on a difference between he first measured gap and the second measured gap, and based on a difference between a first acceleration corresponding to the first orientation and a second acceleration corresponding to the second orientation. Additionally or alternatively to one or more of the examples disclosed above, in some examples, determining the error metric for the one or more of the plurality of force sensors can comprise: determining the theoretical gain for the one or more of the plurality of force sensors based on a dynamics model corresponding to the one or more force sensor; and determining the error metric for the one or more of the plurality of force sensors based on a difference between the measured gain and the theoretical gain. Additionally or alternatively to one or more of the examples disclosed above, in some examples, the processor can be further capable of: in accordance with a determination that one or more learning criteria are satisfied, updating the dynamics model for the one or more of the plurality of force sensors; and in accordance with a determination that the one or more learning criteria are not satisfied, forgoing updating the dynamics model for the one or more of the plurality of force sensors. Additionally or alternatively to one or more of the examples disclosed above, in some examples, the one or more learning criteria can include a criterion that is satisfied when the error metric for the one or more of the plurality of force sensors exceeds an error metric threshold. Additionally or alternatively to one or more of the examples disclosed above, in some examples, the error metric threshold corresponding to each of the one or more force sensors can be based on the location of the force sensor in a force sensor array. Additionally or alternatively to one or more of the examples disclosed above, in some examples, the one or more learning criteria can include a criterion that is satisfied when a difference between a minimum of an envelope function of the error metric and a maximum of the envelope function of the error metric is greater than an error metric threshold. Additionally or alternatively to one or more of the examples disclosed above, in some examples, the one or more learning criteria can include a criterion that is satisfied when hysteresis in the theoretical gain or the measured gain indicates a threshold change in the theoretical gain or measured gain.

Some examples of the disclosure are directed to a method. The method can comprise: at an electronic device including a plurality of force sensors configured to detect an amount of force with which an object touches a touch sensor panel, an accelerometer, and a processor: determining a measured gain for one or more of the plurality of force sensors; determining an error metric for the one or more of the plurality of force sensors based on the measured gain and a theoretical gain; and determining a state of the one or more force sensors based on the error metric.

Some examples of the disclosure are directed to a non-transitory computer-readable medium storing instructions, which when executed by a processor of an electronic device, the electronic device including a plurality of force sensors configured to detect an amount of force with which an object touches a touch sensor panel, cause the processor to perform a method comprising: determining a measured gain for one or more of the plurality of force sensors; determining an error metric for the one or more of the plurality of force sensors based on the measured gain and a theoretical gain; and determining a state of the one or more force sensors based on the error metric.

Some examples of the disclosure are directed to an electronic device. The electronic device can comprise a touch sensor panel configured to detect an object touching the touch sensor panel; a plurality of force sensors coupled to the touch sensor panel and configured to detect an amount of force with which the object touches the touch sensor panel; and a processor coupled to the plurality of force sensors. The processor can be capable of: when a first object is touching the touch sensor panel for a first time with a given amount of force, determine that the first object is touching the touch sensor panel with a first amount of force; after the first object ceases touching the touch sensor panel and after the electronic device experiences a change in orientation while no object is touching the touch sensor panel, and when the first object is touching the touch sensor panel for a second time with the given amount of force: in accordance with a determination that an acceleration characteristic of the electronic device is less than a threshold, determine that the first object is touching the touch sensor panel with a second amount of force, different from the first amount of force; and in accordance with a determination that the acceleration characteristic of the electronic device is not less than the threshold, determine that the first object is touching the touch sensor panel with the first amount of force.

Although examples of this disclosure have been fully described with reference to the accompanying drawings, it is to be noted that various changes and modifications will become apparent to those skilled in the art. Such changes and modifications are to be understood as being included within the scope of examples of this disclosure as defined by the appended claims.

The invention claimed is:

1. An electronic device comprising:
a touch sensor panel configured to detect an object touching the touch sensor panel;
a plurality of force sensors coupled to the touch sensor panel and configured to detect an amount of force with which the object touches the touch sensor panel; and
a processor coupled to the plurality of force sensors, the processor configured to:
measure a first value from a first force sensor of the plurality of force sensors, wherein measuring the first value from the first force sensor comprises determining a first gap value with respect to a neutral state of the first force sensor;
measure a second value from a second force sensor of the plurality of force sensors, the second force sensor different from the first force sensor and separated from the first sensor by a first axis on the electronic device, wherein measuring the second value from the second force sensor comprises determining a second gap value with respect to a neutral state of the second force sensor; and
determine a motion characteristic of the electronic device with respect to the first axis based on the first value and the second value, wherein determining the motion characteristic comprises:
comparing the first value and the second value;
in accordance with a determination that the first value and the second value are indicative of force sensor position measurements in opposing directions, determine that the electronic device is undergoing at least rotational movement with respect to the first axis; and
in accordance with a determination that the first value and the second value are indicative of force sensor position measurements in a same direction, determine that the electronic device is undergoing at least translational movement with respect to the first axis.

2. The electronic device of claim 1, wherein the processor is configured to concurrently measure the first value from the first force sensor and the second value from the second force sensor.

3. The electronic device of claim 1, wherein the motion characteristic comprises a translational motion characteristic of the electronic device.

4. The electronic device of claim 1, wherein the motion characteristic comprises a rotational motion characteristic of the electronic device.

5. The electronic device of claim 1, wherein:
the first force sensor is part of a first group of the plurality of force sensors,
the second force sensor is part of a second group of the plurality of force sensors, different from the first group, measuring the first value comprises measuring a first group value from the first group of force sensors, measuring the second value comprises measuring a second group value from the second group of force sensors, and determining the motion characteristic of the electronic device is based on comparing the first group value and the second group value.

6. The electronic device of claim 5, wherein the first group value comprises a first average value of the force sensors in the first group of force sensors, and the second group value comprises a second average value of the force sensors in the second group of force sensors.

7. The electronic device of claim 5, wherein the plurality of force sensors comprises a first row of force sensors and a second row of force sensors, the first group of force sensors comprises the first row of force sensors, and the second group of force sensors comprises the second row of force sensors.

8. The electronic device of claim 5, wherein the plurality of force sensors comprises a first column of force sensors and a second column of force sensors, the first group of force sensors comprises the first column of force sensors, and the second group of force sensors comprises the second column of force sensors.

9. The electronic device of claim 1, wherein the processor is configured to:
after measuring the first value and the second value:
measure a third value from a third force sensor of the plurality of force sensors, different from the first and second force sensors;
measure a fourth value from a fourth force sensor of the plurality of force sensors, different from the first, second and third force sensors; and
determine a second motion characteristic of the electronic device based on the third value and the fourth value.

10. A method comprising:
measuring a first value from a first force sensor of a plurality of force sensors coupled to a touch sensor panel of an electronic device and configured to detect an amount of force with which an object touches the touch sensor panel, wherein measuring the first value from the first force sensor comprises determining a first gap value with respect to a neutral state of the first force sensor;
measuring a second value from a second force sensor of the plurality of force sensors, the second force sensor different from the first force sensor and separated from the first sensor by a first axis on the electronic device, wherein measuring the second value from the second force sensor comprises determining a second gap value with respect to a neutral state of the second force sensor; and
determining a motion characteristic of the electronic device with respect to the first axis based on the first value and the second value, wherein determining the motion characteristic comprises:
comparing the first value and the second value;
in accordance with a determination that the first value and the second value are indicative of force sensor position measurements in opposing directions, determine that the electronic device is undergoing at least rotational movement with respect to the first axis; and
in accordance with a determination that the first value and the second value are indicative of force sensor position measurements in a same direction, determine that the electronic device is undergoing at least translational movement with respect to the first axis.

11. The method of claim 10, wherein the first value from the first force sensor and the second value from the second force sensor are measured concurrently.

12. The method of claim 10, wherein:
the first force sensor is part of a first group of the plurality of force sensors,
the second force sensor is part of a second group of the plurality of force sensors, different from the first group,
measuring the first value comprises measuring a first group value from the first group of force sensors,
measuring the second value comprises measuring a second group value from the second group of force sensors, and
determining the motion characteristic of the electronic device is based on comparing the first group value and the second group value.

13. The method of claim 12, wherein the first group value comprises a first average value of the force sensors in the first group of force sensors, and the second group value comprises a second average value of the force sensors in the second group of force sensors.

14. A non-transitory computer-readable medium storing instructions, which when executed by a processor of an electronic device, cause the processor to perform a method comprising:
measuring a first value from a first force sensor of a plurality of force sensors coupled to a touch sensor panel of an electronic device and configured to detect an amount of force with which an object touches the touch sensor panel, wherein measuring the first value from the first force sensor comprises determining a first gap value with respect to a neutral state of the first force sensor;
measuring a second value from a second force sensor of the plurality of force sensors, the second force sensor different from the first force sensor and separated from the first sensor by a first axis on the electronic device, wherein measuring the second value from the second force sensor comprises determining a second gap value with respect to a neutral state of the second force sensor; and
determining a motion characteristic of the electronic device with respect to the first axis based on the first value and the second value, wherein determining the motion characteristic comprises:
comparing the first value and the second value;
in accordance with a determination that the first value and the second value are indicative of force sensor position measurements in opposing directions, determine that the electronic device is undergoing at least rotational movement with respect to the first axis; and
in accordance with a determination that the first value and the second value are indicative of force sensor position measurements in a same direction, determine that the electronic device is undergoing at least translational movement with respect to the first axis.

15. The computer-readable medium of claim 14, wherein the first value from the first force sensor and the second value from the second force sensor are measured concurrently.

16. The computer-readable medium of claim 14, wherein:
the first force sensor is part of a first group of the plurality of force sensors, the second force sensor is part of a second group of the plurality of force sensors, different from the first group, measuring the first value comprises measuring a first group value from the first group of force sensors, measuring the second value comprises measuring a second group value from the second group of force sensors, and determining the motion characteristic of the electronic device is based on comparing the first group value and the second group value.

17. An electronic device comprising:
a touch sensor panel configured to detect one or more objects touching the touch sensor panel;
a plurality of force sensors coupled to the touch sensor panel and configured to detect an amount of force with which the one or more objects touch the touch sensor panel, the force sensors comprising a flex layer having a first portion and a second portion; and
a processor coupled to the plurality of force sensors, the processor configured to:
  in accordance with a determination that the first portion of the flex layer and the second portion of the flex layer have deflected in opposite directions from a neutral state, determine that the electronic device is undergoing at least rotational movement; and
  in accordance with a determination that the first portion of the flex layer and the second portion of the flex layer have deflected in a same direction from the neutral state, determine that the electronic device is undergoing at least translational movement.

* * * * *